United States Patent
Patel

(10) Patent No.: US 12,548,018 B2
(45) Date of Patent: *Feb. 10, 2026

(54) DEVICE AND METHOD FOR PROVIDING EXTERNAL ACCESS TO MULTI-DROP BUS PERIPHERAL DEVICES

(71) Applicant: PAYRANGE INC., Portland, OR (US)

(72) Inventor: Paresh K. Patel, Camas, WA (US)

(73) Assignee: PAYRANGE LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,033

(22) Filed: Mar. 19, 2024

(65) Prior Publication Data

US 2024/0338693 A1 Oct. 10, 2024

Related U.S. Application Data

(63) Continuation of application No. 17/443,802, filed on Jul. 27, 2021, now Pat. No. 11,935,051, which is a
(Continued)

(51) Int. Cl.
*G06Q 20/40* (2012.01)
*G06F 13/00* (2006.01)
(Continued)

(52) U.S. Cl.
CPC .............. *G06Q 20/40* (2013.01); *G06F 13/00* (2013.01); *G06Q 20/18* (2013.01); *G06Q 20/32* (2013.01);
(Continued)

(58) Field of Classification Search
CPC ........ G06Q 20/40; G06Q 20/18; G06Q 20/32; G06Q 20/322; G06Q 20/3226;
(Continued)

(56) References Cited

U.S. PATENT DOCUMENTS 309,219 A 12/1884 Fruen
3,457,391 A 7/1969 Yamamoto
(Continued)

FOREIGN PATENT DOCUMENTS

AU 2015327722 A1 4/2017
AU 2021107597 A4 1/2022
(Continued)

OTHER PUBLICATIONS

Patel, Notice of Allowance, U.S. Appl. No. 18/643,979, filed Aug. 21, 2024, 12 pgs.
(Continued)

*Primary Examiner* — Henry Tsai
*Assistant Examiner* — Aurangzeb Hassan
(74) *Attorney, Agent, or Firm* — Morgan, Lewis & Bockius LLP

(57) ABSTRACT

An electronic device includes a slave interface configured for coupling to a machine controller of a machine via a multi-drop bus (MDB), a host interface configured for coupling to a first peripheral device of the machine, and memory storing one or more programs to be executed by the one or more processors and comprising instructions for: registering the electronic device as a slave to the machine controller, registering the first peripheral device as a slave to the electronic device, receiving from a mobile device a request to access signals generated by the first peripheral device, validating the request, and sending a reset command to the first peripheral device via the host interface, the reset command including a directive to update a signal destination
(Continued)

address of the first peripheral device from a controller address of the machine controller to a device address of the electronic device.

20 Claims, 42 Drawing Sheets

Related U.S. Application Data continuation of application No. 16/934,933, filed on Jul. 21, 2020, now Pat. No. 11,074,580, which is a continuation-in-part of application No. 16/029,483, filed on Jul. 6, 2018, now Pat. No. 10,963,905, and a continuation-in-part of application No. 15/893,514, filed on Feb. 9, 2018, now Pat. No. 11,966,895, which is a continuation of application No. PCT/US2017/015676, filed on Jan. 30, 2017, said application No. 16/934,933 is a continuation-in-part of application No. 15/406,492, filed on Jan. 13, 2017, now Pat. No. 10,719,833, said application No. 15/893,514 is a continuation-in-part of application No. 14/641,236, filed on Mar. 6, 2015, now abandoned, said application No. 16/029,483 is a continuation of application No. 14/611,065, filed on Jan. 30, 2015, now Pat. No. 10,019,724, said application No. 15/406,492 is a continuation of application No. 14/335,762, filed on Jul. 18, 2014, now Pat. No. 9,547,859, said application No. 14/641,236 is a continuation-in-part of application No. 14/320,534, filed on Jun. 30, 2014, now abandoned, said application No. 14/335,762 is a continuation of application No. 14/214,644, filed on Mar. 14, 2014, said application No. 14/320,534 is a continuation-in-part of application No. 14/214,644, filed on Mar. 14, 2014, which is a continuation-in-part of application No. 29/477,025, filed on Dec. 18, 2013, now Pat. No. Des. 755,183.

(60) Provisional application No. 62/289,158, filed on Jan. 29, 2016, provisional application No. 62/081,492, filed on Nov. 18, 2014, provisional application No. 61/917,936, filed on Dec. 18, 2013.

(51) Int. Cl.
```
G06Q 20/18      (2012.01)
G06Q 20/32      (2012.01)
G06Q 20/36      (2012.01)
G06Q 20/38      (2012.01)
G06Q 30/06      (2023.01)
G07F 9/00       (2006.01)
G07F 9/02       (2006.01)
```

(52) U.S. Cl.
CPC ....... *G06Q 20/322* (2013.01); *G06Q 20/3226* (2013.01); *G06Q 20/327* (2013.01); *G06Q 20/3278* (2013.01); *G06Q 20/36* (2013.01); *G06Q 20/38* (2013.01); *G06Q 20/3821* (2013.01); *G06Q 20/3823* (2013.01); *G06Q 20/3829* (2013.01); *G06Q 20/401* (2013.01); *G06Q 20/405* (2013.01); *G06Q 30/06* (2013.01); *G07F 9/002* (2020.05); *G07F 9/023* (2013.01); *G06Q 2220/00* (2013.01)

(58) Field of Classification Search
CPC .. G06Q 20/327; G06Q 20/3278; G06Q 20/36; G06Q 20/38; G06Q 20/3821; G06Q 20/3823; G06Q 20/3829; G06Q 20/401; G06Q 20/405; G06F 13/00

USPC .......................................................... 710/8
See application file for complete search history.

(56) References Cited

U.S. PATENT DOCUMENTS

| | | |
|---|---|---|
| 3,931,497 A | 1/1976 | Gentile et al. |
| 4,374,557 A | 2/1983 | Sugimoto et al. |
| 5,479,602 A | 12/1995 | Baecker et al. |
| 5,734,150 A | 3/1998 | Brown et al. |
| 5,844,808 A | 12/1998 | Konsmo et al. |
| 5,854,994 A | 12/1998 | Canada et al. |
| 5,880,733 A | 3/1999 | Horvitz et al. |
| 5,892,900 A | 4/1999 | Ginter et al. |
| 5,955,718 A | 9/1999 | Levasseur |
| 6,056,194 A | 5/2000 | Kolls |
| 6,332,127 B1 | 12/2001 | Bandera et al. |
| 6,390,269 B1 | 5/2002 | Billington |
| 6,462,644 B1 | 10/2002 | Howell |
| 6,505,095 B1 | 1/2003 | Kolls |
| 6,584,309 B1 | 6/2003 | Whigham |
| 6,594,759 B1 * | 7/2003 | Wang ................... G06Q 20/327 |
| | | 713/172 |
| 6,743,095 B2 | 6/2004 | Cole et al. |
| 6,793,134 B2 | 9/2004 | Clark |
| 6,810,234 B1 | 10/2004 | Rasanen |
| 6,840,860 B1 | 1/2005 | Okuniewicz |
| 7,085,556 B2 | 8/2006 | Offer |
| 7,110,954 B2 | 9/2006 | Yung et al. |
| 7,127,236 B2 | 10/2006 | Khan et al. |
| 7,131,575 B1 | 11/2006 | Kolls |
| 7,455,223 B1 | 11/2008 | Wilson |
| 7,458,510 B1 | 12/2008 | Zhou |
| 7,464,867 B1 | 12/2008 | Kolls |
| 7,493,288 B2 * | 2/2009 | Biship ................... G07F 7/0833 |
| | | 705/50 |
| 7,513,419 B1 | 4/2009 | Crews et al. |
| 7,672,680 B1 | 3/2010 | Lee et al. |
| 7,690,495 B1 | 4/2010 | Kolls |
| 7,721,958 B2 | 5/2010 | Belfer et al. |
| 7,848,980 B2 | 12/2010 | Carlson |
| 7,962,369 B2 | 6/2011 | Rosenberg |
| 7,965,693 B2 | 6/2011 | Jiang et al. |
| 7,983,670 B1 | 7/2011 | Elliott |
| 8,020,763 B1 | 9/2011 | Kowalchyk |
| 8,059,101 B2 | 11/2011 | Westerman |
| 8,157,167 B2 | 4/2012 | Cost et al. |
| 8,201,736 B2 | 6/2012 | Majer |
| 8,255,323 B1 | 8/2012 | Casey et al. |
| D669,899 S | 10/2012 | Cheng et al. |
| 8,346,670 B2 | 1/2013 | Hasson et al. |
| 8,356,754 B2 | 1/2013 | Johnson et al. |
| 8,376,227 B2 | 2/2013 | Hammad et al. |
| 8,396,589 B2 | 3/2013 | Katzenstein Garibaldi |
| 8,412,626 B2 | 4/2013 | Hirson et al. |
| 8,438,066 B1 | 5/2013 | Yuen |
| 8,479,190 B2 | 7/2013 | Sueyoshi et al. |
| 8,489,140 B2 | 7/2013 | Weiner et al. |
| 8,496,168 B1 | 7/2013 | Miller et al. |
| 8,514,775 B2 | 8/2013 | Frecassetti et al. |
| 8,517,766 B2 | 8/2013 | Golko et al. |
| 8,548,426 B2 | 10/2013 | Smith |
| 8,577,734 B2 | 11/2013 | Treyz |
| 8,583,496 B2 | 11/2013 | You et al. |
| 8,596,528 B2 | 12/2013 | Fernandes et al. |
| 8,596,529 B1 | 12/2013 | Kolls |
| 8,600,899 B1 | 12/2013 | Davis |
| 8,606,702 B2 | 12/2013 | Ruckart |
| 8,615,445 B2 | 12/2013 | Dorsey et al. |
| 8,645,971 B2 | 2/2014 | Carlson et al. |
| 8,700,530 B2 | 4/2014 | Smith |
| 8,707,276 B2 | 4/2014 | Hill et al. |
| 8,712,893 B1 | 4/2014 | Brandmaier |
| 8,761,809 B2 | 6/2014 | Faith et al. |
| 8,769,643 B1 | 7/2014 | Ben Ayed |
| 8,788,341 B1 | 7/2014 | Patel |
| 8,794,734 B2 | 8/2014 | Drummond |

(56) References Cited

U.S. PATENT DOCUMENTS

| | | | |
|---|---|---|---|
| 8,810,430 B2 | 8/2014 | Proud | |
| 8,819,659 B2 | 8/2014 | Ramer et al. | |
| 8,831,677 B2 * | 9/2014 | Villa-Real | G07F 7/0886 |
| | | | 455/552.1 |
| 8,838,481 B2 | 9/2014 | Moshfeghi | |
| 8,840,016 B1 | 9/2014 | Schott et al. | |
| 8,850,421 B2 | 9/2014 | Proud | |
| 8,856,045 B1 | 10/2014 | Patel et al. | |
| 8,881,975 B1 | 11/2014 | Matthews | |
| 8,898,620 B2 | 11/2014 | Eizenman et al. | |
| 8,903,737 B2 | 12/2014 | Cameron et al. | |
| 8,958,846 B2 | 2/2015 | Freeny, Jr. | |
| 8,976,947 B2 | 3/2015 | Joyce et al. | |
| 9,001,047 B2 | 4/2015 | Forstall | |
| 9,037,492 B2 | 5/2015 | White | |
| 9,047,639 B1 | 6/2015 | Quintilian et al. | |
| 9,092,768 B2 | 7/2015 | Breitenbach et al. | |
| 9,098,961 B1 | 8/2015 | Block et al. | |
| 9,210,247 B2 | 12/2015 | Vance et al. | |
| 9,262,771 B1 | 2/2016 | Patel | |
| 9,272,713 B1 | 3/2016 | Dvoskin et al. | |
| 9,395,888 B2 | 7/2016 | Schiplacoff et al. | |
| 9,424,603 B2 | 8/2016 | Hammad | |
| 9,483,763 B2 | 11/2016 | Van Os et al. | |
| 9,547,859 B2 | 1/2017 | Patel | |
| 9,659,296 B2 | 5/2017 | Patel | |
| 9,875,473 B2 | 1/2018 | Patel | |
| 9,898,884 B1 | 2/2018 | Arora et al. | |
| 9,911,290 B1 | 3/2018 | Zalewski et al. | |
| 9,922,370 B2 | 3/2018 | Kobres et al. | |
| 10,121,318 B2 | 11/2018 | LeMay et al. | |
| 10,163,292 B1 | 12/2018 | Romero | |
| 10,210,501 B2 | 2/2019 | Low et al. | |
| 10,217,151 B1 | 2/2019 | Greiner et al. | |
| 10,304,057 B1 | 5/2019 | Powell | |
| 10,380,573 B2 | 8/2019 | Lin et al. | |
| 10,410,194 B1 | 9/2019 | Grassadonia | |
| 10,423,949 B2 | 9/2019 | Lyons et al. | |
| 10,438,208 B2 | 10/2019 | Patel et al. | |
| 10,467,604 B1 | 11/2019 | Dorsch et al. | |
| 10,528,944 B2 | 1/2020 | Khan | |
| 10,538,220 B1 | 1/2020 | Tyagi et al. | |
| 10,607,465 B1 | 3/2020 | Subramanian et al. | |
| 10,719,833 B2 | 7/2020 | Patel et al. | |
| 10,824,828 B2 | 11/2020 | Ostri | |
| 10,891,608 B2 | 1/2021 | Patel | |
| 10,891,614 B2 | 1/2021 | Patel | |
| 10,964,185 B1 | 3/2021 | Subramanian et al. | |
| 10,977,642 B2 | 4/2021 | Khan | |
| 11,010,759 B1 | 5/2021 | Maeng | |
| 11,042,852 B1 | 6/2021 | Wadhwa | |
| 11,074,577 B1 | 7/2021 | Soccorsy et al. | |
| 11,074,580 B2 | 7/2021 | Patel | |
| 11,182,794 B1 | 11/2021 | Aument | |
| 11,227,275 B2 | 1/2022 | Van Heerden et al. | |
| 11,308,462 B2 | 4/2022 | Berman et al. | |
| 11,373,147 B1 | 6/2022 | Moore | |
| 11,481,772 B2 | 10/2022 | Patel | |
| 11,488,174 B2 | 11/2022 | Patel | |
| 11,495,104 B1 | 11/2022 | Subramanian et al. | |
| 11,501,296 B2 | 11/2022 | Patel | |
| 11,564,266 B1 | 1/2023 | Kahn | |
| 11,935,051 B2 | 3/2024 | Patel | |
| 11,938,692 B2 | 3/2024 | Hockings | |
| 11,961,107 B2 | 4/2024 | Patel | |
| 11,966,895 B2 | 4/2024 | Patel et al. | |
| 11,966,898 B2 | 4/2024 | Patel | |
| 11,966,920 B2 | 4/2024 | Patel | |
| 11,966,926 B2 | 4/2024 | Patel et al. | |
| 11,972,423 B2 | 4/2024 | Patel | |
| 12,008,875 B1 | 6/2024 | Subramanian et al. | |
| 12,093,963 B2 | 9/2024 | Patel | |
| 12,124,881 B2 | 10/2024 | Talavera | |
| 12,399,958 B2 | 8/2025 | Patel | |
| 2002/0016740 A1 | 2/2002 | Ogasawara | |
| 2002/0152123 A1 | 10/2002 | Giordano et al. | |
| 2002/0164953 A1 | 11/2002 | Curtis | |
| 2003/0009385 A1 | 1/2003 | Tucciarone | |
| 2003/0089767 A1 | 5/2003 | Kiyomatsu | |
| 2003/0101096 A1 | 5/2003 | Suzuki et al. | |
| 2003/0110097 A1 | 6/2003 | Lei | |
| 2003/0130902 A1 | 7/2003 | Athwal | |
| 2003/0158891 A1 | 8/2003 | Lei et al. | |
| 2003/0172028 A1 | 9/2003 | Abell et al. | |
| 2003/0191811 A1 | 10/2003 | Hashem | |
| 2003/0206542 A1 | 11/2003 | Holder | |
| 2003/0236872 A1 | 12/2003 | Atkinson | |
| 2004/0029569 A1 | 2/2004 | Khan et al. | |
| 2004/0049454 A1 | 3/2004 | Kanno et al. | |
| 2004/0117262 A1 | 6/2004 | Berger et al. | |
| 2004/0122685 A1 | 6/2004 | Bunce et al. | |
| 2004/0133653 A1 | 7/2004 | Defosse | |
| 2005/0021459 A1 * | 1/2005 | Bell | G07F 7/08 |
| | | | 705/40 |
| 2005/0043011 A1 | 2/2005 | Murray | |
| 2005/0080510 A1 | 4/2005 | Bates | |
| 2005/0101295 A1 | 5/2005 | Rupp | |
| 2005/0177798 A1 | 8/2005 | Thomson et al. | |
| 2005/0181804 A1 | 8/2005 | Misikangas et al. | |
| 2005/0232421 A1 | 10/2005 | Simons et al. | |
| 2005/0234776 A1 | 10/2005 | Jacoves | |
| 2006/0043175 A1 * | 3/2006 | Fu | G06Q 20/3276 |
| | | | 235/383 |
| 2006/0052157 A1 | 3/2006 | Walker et al. | |
| 2006/0123335 A1 | 6/2006 | Sanchez et al. | |
| 2007/0050083 A1 | 3/2007 | Signorelli et al. | |
| 2007/0083287 A1 | 4/2007 | Defosse et al. | |
| 2007/0095901 A1 | 5/2007 | Illingworth | |
| 2007/0119680 A1 | 5/2007 | Saltsov et al. | |
| 2007/0159994 A1 | 7/2007 | Brown et al. | |
| 2007/0186105 A1 | 8/2007 | Bailey et al. | |
| 2007/0187491 A1 | 8/2007 | Godwin et al. | |
| 2007/0227856 A1 | 10/2007 | Gopel | |
| 2007/0250920 A1 | 10/2007 | Lindsay | |
| 2007/0255653 A1 | 11/2007 | Tumminaro | |
| 2008/0010190 A1 | 1/2008 | Rackley, III et al. | |
| 2008/0010193 A1 | 1/2008 | Rackley, III et al. | |
| 2008/0033880 A1 | 2/2008 | Fiebiger et al. | |
| 2008/0040265 A1 | 2/2008 | Rackley, III et al. | |
| 2008/0126213 A1 | 5/2008 | Robertson et al. | |
| 2008/0141033 A1 | 6/2008 | Ginter et al. | |
| 2008/0154727 A1 | 6/2008 | Carlson | |
| 2008/0154735 A1 | 6/2008 | Carlson | |
| 2008/0163257 A1 | 7/2008 | Carlson et al. | |
| 2008/0167017 A1 | 7/2008 | Wentker et al. | |
| 2008/0167991 A1 | 7/2008 | Carlson et al. | |
| 2008/0183480 A1 | 7/2008 | Carlson et al. | |
| 2008/0201226 A1 | 8/2008 | Carlson et al. | |
| 2008/0208762 A1 | 8/2008 | Arthur et al. | |
| 2008/0249658 A1 | 10/2008 | Walker | |
| 2008/0254853 A1 | 10/2008 | Wright et al. | |
| 2008/0255947 A1 | 10/2008 | Friedman | |
| 2008/0319913 A1 | 12/2008 | Wiechers | |
| 2009/0006196 A1 | 1/2009 | Barkan et al. | |
| 2009/0037284 A1 | 2/2009 | Lewis et al. | |
| 2009/0076896 A1 | 3/2009 | Dewitt | |
| 2009/0099961 A1 | 4/2009 | Ogilvy | |
| 2009/0106160 A1 | 4/2009 | Skowronek | |
| 2009/0119190 A1 | 5/2009 | Realini | |
| 2009/0157515 A1 | 6/2009 | LaFauci et al. | |
| 2009/0171682 A1 | 7/2009 | Dixon et al. | |
| 2009/0287349 A1 | 11/2009 | Mardiks | |
| 2009/0288173 A1 | 11/2009 | Mardiks | |
| 2009/0303982 A1 | 12/2009 | Blachman et al. | |
| 2009/0306818 A1 | 12/2009 | Slagley et al. | |
| 2009/0306819 A1 | 12/2009 | Insolia | |
| 2009/0313125 A1 | 12/2009 | Roh et al. | |
| 2009/0313132 A1 | 12/2009 | Kenna et al. | |
| 2009/0327089 A1 | 12/2009 | Kanno et al. | |
| 2010/0061294 A1 | 3/2010 | Proctor, Jr. | |
| 2010/0082485 A1 | 4/2010 | Lin et al. | |
| 2010/0094456 A1 | 4/2010 | Simpkins et al. | |
| 2010/0105454 A1 | 4/2010 | Weber et al. | |
| 2010/0198400 A1 | 8/2010 | Pascal | |

(56) References Cited

U.S. PATENT DOCUMENTS

| | | |
|---|---|---|
| 2010/0227671 A1 | 9/2010 | Laaroussi et al. |
| 2010/0276484 A1 | 11/2010 | Banerjee |
| 2010/0280956 A1 | 11/2010 | Chutorash |
| 2010/0312692 A1 | 12/2010 | Teicher |
| 2010/0320266 A1 | 12/2010 | White |
| 2010/0329285 A1 | 12/2010 | Stanton |
| 2011/0029405 A1 | 2/2011 | Cronin |
| 2011/0040686 A1 | 2/2011 | Carlson |
| 2011/0125561 A1 | 5/2011 | Marcus |
| 2011/0153436 A1 | 6/2011 | Krampe |
| 2011/0153442 A1 | 6/2011 | Krampe |
| 2011/0153495 A1 | 6/2011 | Dixon et al. |
| 2011/0172848 A1 | 7/2011 | Breitenbach et al. |
| 2011/0178883 A1 | 7/2011 | Granbery |
| 2011/0225067 A1 | 9/2011 | Dunwoody |
| 2011/0238476 A1 | 9/2011 | Carr |
| 2011/0244799 A1 | 10/2011 | Roberts et al. |
| 2011/0251892 A1 | 10/2011 | Laracey |
| 2011/0251910 A1 | 10/2011 | Dimmick |
| 2011/0276636 A1 | 11/2011 | Cheng et al. |
| 2011/0289023 A1 | 11/2011 | Forster et al. |
| 2012/0011024 A1 | 1/2012 | Dorsey et al. |
| 2012/0016731 A1 | 1/2012 | Smith et al. |
| 2012/0029691 A1 | 2/2012 | Mockus et al. |
| 2012/0030047 A1 | 2/2012 | Fuentes |
| 2012/0036045 A1 | 2/2012 | Lowe et al. |
| 2012/0066096 A1 | 3/2012 | Penide |
| 2012/0078735 A1 | 3/2012 | Bauer et al. |
| 2012/0108173 A1 | 5/2012 | Hahm et al. |
| 2012/0122585 A1 | 5/2012 | Nguyen |
| 2012/0136478 A1 | 5/2012 | Anand |
| 2012/0150742 A1 | 6/2012 | Poon et al. |
| 2012/0158172 A1 | 6/2012 | Wencslao |
| 2012/0158528 A1 | 6/2012 | Hsu et al. |
| 2012/0160912 A1 | 6/2012 | Laracey |
| 2012/0173325 A1 | 7/2012 | Johri |
| 2012/0197740 A1 | 8/2012 | Grigg et al. |
| 2012/0203666 A1 | 8/2012 | Torossian et al. |
| 2012/0231844 A1 | 9/2012 | Coppinger |
| 2012/0246074 A1 | 9/2012 | Annamalai et al. |
| 2012/0253852 A1 | 10/2012 | Pourfallah |
| 2012/0254631 A1 | 10/2012 | Skillman et al. |
| 2012/0255653 A1 | 10/2012 | Chin |
| 2012/0258773 A1 | 10/2012 | Alvarez Rivera |
| 2012/0276845 A1 | 11/2012 | Wikander |
| 2012/0280789 A1 | 11/2012 | Gerhardt et al. |
| 2012/0290472 A1 | 11/2012 | Mullen et al. |
| 2012/0296826 A1 | 11/2012 | Bergdale et al. |
| 2012/0303528 A1 | 11/2012 | Weiner et al. |
| 2012/0316963 A1 | 12/2012 | Moshfeghi |
| 2012/0330764 A1 | 12/2012 | Nahidipour |
| 2012/0330769 A1 | 12/2012 | Arceo |
| 2012/0330844 A1 | 12/2012 | Kaufman |
| 2013/0030931 A1 | 1/2013 | Moshfeghi |
| 2013/0054016 A1 | 2/2013 | Canter et al. |
| 2013/0054336 A1 | 2/2013 | Graylin |
| 2013/0054395 A1 | 2/2013 | Cyr et al. |
| 2013/0067365 A1 | 3/2013 | Shrufi et al. |
| 2013/0085835 A1 | 4/2013 | Horowitz |
| 2013/0087050 A1 | 4/2013 | Studor et al. |
| 2013/0100886 A1 | 4/2013 | Cherian |
| 2013/0102246 A1 | 4/2013 | Gagne et al. |
| 2013/0110296 A1 | 5/2013 | Khoo |
| 2013/0117490 A1 | 5/2013 | Harriman |
| 2013/0117738 A1 | 5/2013 | Livingston et al. |
| 2013/0124289 A1 | 5/2013 | Fisher |
| 2013/0126607 A1 | 5/2013 | Behjat |
| 2013/0143498 A1 | 6/2013 | Niemi |
| 2013/0166448 A1 | 6/2013 | Narayanan |
| 2013/0185150 A1 | 7/2013 | Crum |
| 2013/0191213 A1 | 7/2013 | Beck et al. |
| 2013/0191789 A1 | 7/2013 | Calman |
| 2013/0210461 A1 | 8/2013 | Moldavsky et al. |
| 2013/0217333 A1 | 8/2013 | Sprigg et al. |
| 2013/0246171 A1 | 9/2013 | Carapelli |
| 2013/0246364 A1 | 9/2013 | Bhavith |
| 2013/0267121 A1 | 10/2013 | Hsu |
| 2013/0267176 A1 | 10/2013 | Hertel et al. |
| 2013/0275303 A1 | 10/2013 | Fiore |
| 2013/0275305 A1 | 10/2013 | Duplan |
| 2013/0278622 A1 | 10/2013 | Sun et al. |
| 2013/0282590 A1 | 10/2013 | Rajarethnam et al. |
| 2013/0284806 A1 | 10/2013 | Margalit |
| 2013/0297422 A1 | 11/2013 | Hunter et al. |
| 2013/0311379 A1 | 11/2013 | Smith |
| 2013/0311382 A1 | 11/2013 | Fosmark et al. |
| 2013/0331985 A1 | 12/2013 | Felique |
| 2013/0332293 A1 | 12/2013 | Ran |
| 2013/0346302 A1 | 12/2013 | Purves et al. |
| 2013/0346305 A1 | 12/2013 | Mendes |
| 2014/0006451 A1 | 1/2014 | Mullis et al. |
| 2014/0012414 A1 | 1/2014 | Pérez et al. |
| 2014/0019367 A1 | 1/2014 | Khan et al. |
| 2014/0025958 A1 | 1/2014 | Calman |
| 2014/0032410 A1 | 1/2014 | Georgiev et al. |
| 2014/0032413 A1 | 1/2014 | Low |
| 2014/0040028 A1 | 2/2014 | King et al. |
| 2014/0040117 A1 | 2/2014 | Jain |
| 2014/0046842 A1 | 2/2014 | Irudayam et al. |
| 2014/0052463 A1 | 2/2014 | Cashman et al. |
| 2014/0052524 A1 | 2/2014 | Andersen |
| 2014/0052607 A1 | 2/2014 | Park |
| 2014/0064116 A1 | 3/2014 | Linde et al. |
| 2014/0067542 A1 | 3/2014 | Everingham |
| 2014/0074714 A1 | 3/2014 | Melone et al. |
| 2014/0074723 A1 | 3/2014 | Kamat |
| 2014/0085046 A1 | 3/2014 | Shin et al. |
| 2014/0085109 A1 | 3/2014 | Stefik |
| 2014/0089016 A1 | 3/2014 | Smullin |
| 2014/0089185 A1 | 3/2014 | Desai et al. |
| 2014/0100977 A1 | 4/2014 | Davis |
| 2014/0108108 A1 | 4/2014 | Artman |
| 2014/0122298 A1 | 5/2014 | Oyer |
| 2014/0136301 A1 | 5/2014 | Valdes |
| 2014/0136411 A1 | 5/2014 | Cho |
| 2014/0143055 A1 | 5/2014 | Johnson |
| 2014/0143074 A1 | 5/2014 | Kolls |
| 2014/0143137 A1 | 5/2014 | Carlson |
| 2014/0172179 A1 | 6/2014 | Baudin |
| 2014/0180852 A1 | 6/2014 | Kamat |
| 2014/0188708 A1 | 7/2014 | Govindarajan et al. |
| 2014/0201066 A1 | 7/2014 | Roux et al. |
| 2014/0249995 A1 | 9/2014 | Ogilvy |
| 2014/0278989 A1 | 9/2014 | Calman |
| 2014/0279008 A1 | 9/2014 | Calman |
| 2014/0279101 A1 | 9/2014 | Duplan et al. |
| 2014/0279426 A1 | 9/2014 | Holman et al. |
| 2014/0279537 A1 | 9/2014 | Cicoretti |
| 2014/0279556 A1 | 9/2014 | Priebatsch |
| 2014/0289047 A1 | 9/2014 | Yee |
| 2014/0317611 A1 | 10/2014 | Wojcik et al. |
| 2014/0324627 A1 | 10/2014 | Haver |
| 2014/0337235 A1 | 11/2014 | Van Heerden et al. |
| 2014/0351099 A1 | 11/2014 | Zhu |
| 2014/0361872 A1 | 12/2014 | Garcia et al. |
| 2014/0378057 A1 | 12/2014 | Ramon et al. |
| 2015/0006421 A1 | 1/2015 | Pearson |
| 2015/0019433 A1 | 1/2015 | Leger |
| 2015/0051977 A1 | 2/2015 | Lyman |
| 2015/0073980 A1 | 3/2015 | Griffin et al. |
| 2015/0081462 A1 | 3/2015 | Ozvat et al. |
| 2015/0088698 A1 | 3/2015 | Ackerman |
| 2015/0100152 A1 | 4/2015 | Trevino et al. |
| 2015/0105901 A1 | 4/2015 | Joshi et al. |
| 2015/0120546 A1 | 4/2015 | Fernandes |
| 2015/0120555 A1 | 4/2015 | Jung |
| 2015/0149992 A1 | 5/2015 | Wade et al. |
| 2015/0154579 A1 | 6/2015 | Teicher |
| 2015/0169312 A1 | 6/2015 | Patel |
| 2015/0170131 A1 | 6/2015 | Patel |
| 2015/0170132 A1 | 6/2015 | Patel |
| 2015/0170136 A1 | 6/2015 | Patel |
| 2015/0178702 A1 | 6/2015 | Patel |
| 2015/0206128 A1 | 7/2015 | Torossian et al. |

(56) References Cited

U.S. PATENT DOCUMENTS

| | | |
|---|---|---|
| 2015/0220381 A1 | 8/2015 | Horagan et al. |
| 2015/0235202 A1 | 8/2015 | Zabala |
| 2015/0278811 A1 | 10/2015 | Lalchandani |
| 2015/0286209 A1 | 10/2015 | Kreuzer et al. |
| 2015/0287085 A1 | 10/2015 | Windmueller |
| 2015/0302377 A1 | 10/2015 | Sweitzer |
| 2015/0302411 A1 | 10/2015 | Bondesen et al. |
| 2015/0317720 A1 | 11/2015 | Ramaratnam |
| 2015/0332029 A1 | 11/2015 | Coxe |
| 2015/0346994 A1 | 12/2015 | Chanyontpatanakul |
| 2015/0373537 A1 | 12/2015 | Toksvig |
| 2015/0379491 A1 | 12/2015 | Ma et al. |
| 2016/0012465 A1 | 1/2016 | Sharp |
| 2016/0019604 A1 | 1/2016 | Kobayashi |
| 2016/0063476 A1 | 3/2016 | Baldie |
| 2016/0086145 A1 | 3/2016 | Tsutsui |
| 2016/0092859 A1 | 3/2016 | Klingen |
| 2016/0098690 A1 | 4/2016 | Silvia et al. |
| 2016/0132870 A1 | 5/2016 | Xu et al. |
| 2016/0196220 A1 | 7/2016 | Perez et al. |
| 2016/0232515 A1 | 8/2016 | Jhas |
| 2016/0260081 A1 | 9/2016 | Zermeño |
| 2016/0292469 A1 | 10/2016 | Ianni |
| 2016/0335620 A1 | 11/2016 | Lyons et al. |
| 2016/0350744 A1 | 12/2016 | Tang et al. |
| 2017/0006656 A1 | 1/2017 | Nacer et al. |
| 2017/0017958 A1 | 1/2017 | Scott et al. |
| 2017/0083882 A1 | 3/2017 | Kim et al. |
| 2017/0092062 A1 | 3/2017 | Tsutsui |
| 2017/0148009 A1 | 5/2017 | Lafuente |
| 2017/0161728 A1 | 6/2017 | Satyanarayan et al. |
| 2017/0178116 A1 | 6/2017 | Savolainen et al. |
| 2017/0193478 A1 | 7/2017 | Dhurka |
| 2017/0193479 A1 | 7/2017 | Kamat |
| 2017/0193508 A1 | 7/2017 | Patel et al. |
| 2017/0330164 A1 | 11/2017 | Suelberg et al. |
| 2018/0005220 A1 | 1/2018 | Laracey |
| 2018/0096323 A1 | 4/2018 | Barber et al. |
| 2018/0096554 A1 | 4/2018 | Hough et al. |
| 2018/0165908 A1 | 6/2018 | Patel et al. |
| 2018/0197167 A1 | 7/2018 | Ganesan et al. |
| 2018/0240096 A1 | 8/2018 | Patel |
| 2018/0276674 A1 | 9/2018 | Ramatchandirane et al. |
| 2018/0293573 A1 | 10/2018 | Ortiz et al. |
| 2018/0315271 A1 | 11/2018 | Gharabegian et al. |
| 2018/0374076 A1 | 12/2018 | Wheeler et al. |
| 2019/0213832 A1 | 7/2019 | Tsutsui |
| 2019/0236586 A1 | 8/2019 | Mei et al. |
| 2019/0244205 A1 | 8/2019 | Fieglein |
| 2019/0244465 A1 | 8/2019 | Saunders et al. |
| 2019/0272539 A1 | 9/2019 | Bogaard |
| 2019/0340604 A1 | 11/2019 | Nadella et al. |
| 2020/0126059 A1 | 4/2020 | Kudssi et al. |
| 2020/0250948 A1 | 8/2020 | Ball |
| 2020/0342507 A1 | 10/2020 | Hubbard et al. |
| 2020/0351477 A1 | 11/2020 | Rabinowitz et al. |
| 2020/0387881 A1 | 12/2020 | Smith et al. |
| 2021/0012318 A1 | 1/2021 | Ducoulombier |
| 2021/0056552 A1 | 2/2021 | Murray |
| 2021/0158309 A1 | 5/2021 | Mcginlay et al. |
| 2021/0312440 A1 | 10/2021 | Badal Badalian et al. |
| 2021/0334925 A1 | 10/2021 | Peacock et al. |
| 2021/0357932 A1 | 11/2021 | Patel |
| 2021/0375094 A1 | 12/2021 | Thomas et al. |
| 2021/0406970 A1 | 12/2021 | Patel et al. |
| 2022/0024014 A1 | 1/2022 | Obermann et al. |
| 2022/0172549 A1 | 6/2022 | Chung et al. |
| 2022/0263886 A1 | 8/2022 | Rose |
| 2022/0292543 A1 | 9/2022 | Henderson |
| 2022/0405733 A1 | 12/2022 | Yao et al. |
| 2023/0042066 A1 | 2/2023 | Liff et al. |
| 2023/0222506 A1 | 7/2023 | Patel et al. |
| 2023/0222507 A1 | 7/2023 | Patel et al. |
| 2023/0274274 A1 | 8/2023 | Patel |
| 2023/0281621 A1 | 9/2023 | Patel |
| 2023/0289811 A1 | 9/2023 | Patel et al. |
| 2023/0297987 A1 | 9/2023 | Patel |
| 2024/0257093 A1 | 8/2024 | Wulff et al. |
| 2024/0257100 A1 | 8/2024 | Bimolaksono et al. |
| 2024/0273498 A1 | 8/2024 | Patel |
| 2024/0273526 A1 | 8/2024 | Patel |
| 2024/0273527 A1 | 8/2024 | Patel |
| 2024/0273528 A1 | 8/2024 | Patel |
| 2024/0273541 A1 | 8/2024 | Patel |
| 2024/0330974 A1 | 10/2024 | Patel |
| 2025/0014044 A1 | 1/2025 | Patel et al. |
| 2025/0094977 A1 | 3/2025 | Patel et al. |
| 2025/0148891 A1 | 5/2025 | Patel |
| 2025/0209467 A1 | 6/2025 | Patel et al. |
| 2025/0315809 A1 | 10/2025 | Patel |
| 2025/0315838 A1 | 10/2025 | Patel et al. |

FOREIGN PATENT DOCUMENTS

| | | |
|---|---|---|
| CA | 3028753 A1 | 7/2019 |
| CA | 2844231 C | 4/2020 |
| CN | 1561508 A | 1/2005 |
| CN | 103688252 A | 3/2014 |
| CN | 104050747 A | 9/2014 |
| CN | 106104600 A | 1/2015 |
| CN | 104603809 A | 5/2015 |
| CN | 204375056 U | 6/2015 |
| CN | 105139196 A | 12/2015 |
| CN | 105989466 A | 10/2016 |
| CN | 106803175 A | 6/2017 |
| CN | 107480975 A | 12/2017 |
| CN | 104680361 B | 5/2018 |
| CN | 207663510 U | 7/2018 |
| CN | 108367497 A | 8/2018 |
| CN | 109389755 A | 2/2019 |
| CN | 111316301 A | 6/2020 |
| CN | 107408253 B | 8/2021 |
| CN | 108352094 A | 9/2021 |
| CN | 115485782 A | 12/2022 |
| CN | 113379401 B | 5/2024 |
| EP | 1571607 A2 | 9/2005 |
| EP | 2061001 A1 | 5/2009 |
| EP | 3901880 A1 | 10/2021 |
| EP | 3289548 B2 | 11/2021 |
| GB | 2504922 A | 2/2014 |
| JP | H1125320 A | 1/1999 |
| JP | 2002-183812 A | 6/2002 |
| JP | 2003-242401 A | 8/2003 |
| JP | 2003-323662 A | 11/2003 |
| JP | 2004-252640 A | 9/2004 |
| JP | 2004310740 A | 11/2004 |
| JP | WO2003017157 A | 12/2004 |
| JP | 2005-526325 T | 9/2005 |
| JP | 2009-259226 A | 11/2009 |
| JP | 2010528716 A | 8/2010 |
| JP | 4586607 B2 | 11/2010 |
| JP | 2012-504273 T | 2/2012 |
| JP | 7289565 B2 | 6/2023 |
| KR | 20130138637 A | 12/2013 |
| KR | 20160076081 A | 6/2016 |
| KR | 20170140189 A | 12/2017 |
| WO | WO2003/098561 A1 | 11/2003 |
| WO | WO2006/020692 A2 | 2/2006 |
| WO | WO2006021825 A1 | 3/2006 |
| WO | WO2007/015610 A1 | 2/2007 |
| WO | WO2008/083022 A1 | 7/2008 |
| WO | WO2008/083025 A2 | 7/2008 |
| WO | WO2008/083078 A2 | 7/2008 |
| WO | WO2008/083089 A1 | 7/2008 |
| WO | WO2008/083105 A2 | 7/2008 |
| WO | WO2008/083115 A1 | 7/2008 |
| WO | WO2008/083119 A1 | 7/2008 |
| WO | WO2009/070430 A2 | 6/2009 |
| WO | WO2009089163 A1 | 7/2009 |
| WO | WO2013/132995 A1 | 9/2013 |
| WO | WO2013/177416 A2 | 11/2013 |
| WO | WO2014/093857 A1 | 6/2014 |
| WO | WO2015123378 A1 | 8/2015 |
| WO | WO2015/186141 A1 | 12/2015 |

(56) References Cited

FOREIGN PATENT DOCUMENTS

| WO | WO2016/123545 A1 | 8/2016 |
|---|---|---|
| WO | WO2016137271 A1 | 9/2016 |
| WO | WO2016158748 A1 | 10/2016 |
| WO | WO2017/010936 A1 | 1/2017 |
| WO | WO2017/143079 A1 | 8/2017 |
| WO | WO2023037112 A1 | 3/2023 |

OTHER PUBLICATIONS

Premier Food Service Selects USA Technologies as a Strategic Partner as They Move toward Connecting 100% of Their Machines to Cashless Payment, Business Wire, New York, Sep. 18, 2017, 4 pgs.
Patel, Notice of Allowance, U.S. Appl. No. 18/643,975, filed Aug. 21, 2024, 11 pgs.
Patel, Notice of Allowance, U.S. Appl. No. 18/643,961, filed Aug. 29, 2024, 38 pgs.
Patel, Notice of Allowance, U.S. Appl. No. 17/985,832, filed Aug. 29, 2024, 12 pgs.
Patel, Notice of Allowance, U.S. Appl. No. 18/643,968, filed Sep. 18, 2024, 10 pgs.
Patel, Final Office Action, U.S. Appl. No. 18/643,965, filed Nov. 7, 2024, 15 pgs.
Narongrit Waraporn et al., "Virtual Credit Cards on Mobile for M-Commerce Payment", 2009 IEEE International Conference on e-Business Engineering, Dec. 1, 2009, 6 pgs.
Patel, Notice of Allowance, U.S. Appl. No. 18/888,102, filed Nov. 20, 2024, 16 pgs.
Patel, Corrected Notice of Allowability, U.S. Appl. No. 18/643,979, filed Nov. 22, 2024, 3 pgs.
Patel, Non-Final Office Action, U.S. Appl. No. 18/888,036, filed Nov. 26, 2024, 10 pgs.
Patel, Corrected Notice of Allowability, U.S. Appl. No. 17/985,832, filed Nov. 27, 2024, 3 pgs.
Patel, Corrected Notice of Allowability, U.S. Appl. No. 18/643,975, filed Nov. 27, 2024, 3 pgs.
Patel, Corrected Notice of Allowability, U.S. Appl. No. 18/643,961, filed Dec. 3, 2024, 2 pgs.
RobocopyEs, posted Oct. 11, 2014, retrieved Feb. 13, 2018, <URL:https://twitter.com/robocopyes> 2 pgs.
Adams, How can stationary kiosks thrive in a mobile world?, American Banker, 2012.
Balan et al., mFerio: the design and evaluation of a peer-to-peer mobile payment system, Jun. 2009, 14 pgs.
Balfe et al., e-EMV: emulating EMV for internet payments with trusted computing Technologies, Oct. 2008, 12 pgs.
Bing, Bing Images Search: "dongle", http://www.bing.com/images/search?q=dongleFORM+HDRSC2, Dec. 5, 2013, 8 pgs.
Carlson, Specification, U.S. Appl. No. 60/871,898, filed Dec. 26, 2006, 169 pgs.
Frolick, Assessing M-Commerce Opportunities, Auerbach Publications Inc., Information Systems Management, Spring 2004.
Google, Chromecast, http://www.google.com/intl/devices/chromecast/, Dec. 12, 2013, 4 pgs.
How to Pay the New Way, YouTube, Apr. 5, 2018, 4 pgs.
How will Apple's new mobile wallet Passbook impact other mobile wallets?, posted Jun. 13, 2012, retrieved Feb. 13, 2018 from <URL:https://www.quora.com/How-will-Apples-new-mobile-wallet-Passbook-impact-other-mobile-wallets>, 5 pgs.
Kadambi et al., Near-Field Communication-based Secure Mobile Payment Service, Aug. 2009, 10 pgs.
When the Future Feels Worse Than the Past: A Temporal Inconsistency in Moral Judgment, 15 pgs. (Year: 2010) https://citeseerx.ist.psu.edu/viewdoc/download?doi=10.1.1.675.3584&rep=rep1&type=pdf.
Novotny, Applying RFID technology in the retail industry-benefits and concerns from the consumer's perspective, Institute of Economic Science, Eszterhazy Karoly College, Eger, Hungary, Retail Technologies for the 21 Century, innovation and competitiveness in the retail industry, 2015.
Nurel, "Recent Developments in Wireless Network Systems", Izmir Institute of Technology, Sep. 2001, 280 pages (Year: 2001).
Patel, Office Action, U.S. Appl. No. 14/320,534, filed Mar. 2, 2018, 26 pgs.
Patel, Final Office Action, U.S. Appl. No. 14/320,534, filed Apr. 16, 2015, 21 pgs.
Patel, Final Office Action, U.S. Appl. No. 14/320,534, filed Nov. 30, 2016, 24 pgs.
Patel, Final Office Action, U.S. Appl. No. 14/321,717, filed Jun. 18, 2015, 22 pgs.
Patel, Final Office Action, U.S. Appl. No. 14/321,724, filed Oct. 8, 2015, 19 pgs.
Patel, Final Office Action, U.S. Appl. No. 14/321,724, filed Dec. 13, 2017, 22 pgs.
Patel, Final Office Action, U.S. Appl. No. 14/321,733, filed Nov. 14, 2014, 11 pgs.
Patel, Final Office Action, U.S. Appl. No. 14/335,762, filed Jun. 9, 2016, 15 pgs.
Patel, Final Office Action, U.S. Appl. No. 14/456,683, filed Jun. 8, 2015, 14 pgs.
Patel, Final Office Action, U.S. Appl. No. 14/458,192, filed Sep. 16, 2015, 26 pgs.
Patel, Final Office Action, U.S. Appl. No. 14/458,199, filed Jun. 24, 2015, 8 pgs.
Patel, Final Office Action, U.S. Appl. No. 14/641,236, filed Mar. 11, 2016, 16 pgs.
Patel, Final Office Action, U.S. Appl. No. 14/968,703, filed Feb. 12, 2019, 22 pgs.
Patel, Final Office Action, U.S. Appl. No. 15/435,228, filed Oct. 2, 2020, 24 pgs.
Patel, Final Office Action, U.S. Appl. No. 15/893,514, filed Jul. 22, 2021, 12 pgs.
Patel, Final Office Action, U.S. Appl. No. 15/956,741, filed Oct. 2, 2020, 12 pgs.
Patel, Notice of Allowance, U.S. Appl. No. 14/214,644, filed Jun. 10, 2014, 9 pgs.
Patel, Notice of Allowance, U.S. Appl. No. 14/321,733, filed Jun. 22, 2015, 8 pgs.
Patel, Notice of Allowance, U.S. Appl. No. 14/321,733, filed Feb. 27, 2015, 9 pgs.
Patel, Notice of Allowance, U.S. Appl. No. 14/335,762, filed Oct. 3, 2016, 8 pgs.
Patel, Notice of Allowance, U.S. Appl. No. 14/335,762, filed Mar. 30, 2015, 9 pgs.
Patel, Notice of Allowance, U.S. Appl. No. 14/456,683, filed Oct. 8, 2015, 15 pgs.
Patel, Notice of Allowance, U.S. Appl. No. 14/458,192, filed Oct. 12, 2017, 8 pgs.
Patel, Notice of Allowance, U.S. Appl. No. 14/458,199, filed Jan. 20, 2017, 9 pgs.
Patel, Notice of Allowance, U.S. Appl. No. 14/611,065, filed Mar. 26, 2018, 18 pgs.
Patel, Notice of Allowance, U.S. Appl. No. 14/614,336, filed Dec. 11, 2015, 8 pgs.
Patel, Notice of Allowance, U.S. Appl. No. 14/614,336, filed Nov. 25, 2015, 13 pgs.
Patel, Notice of Allowance, U.S. Appl. No. 14/968,703, filed Jun. 27, 2019, 10 pgs.
Patel, Notice of Allowance, U.S. Appl. No. 15/406,492, filed Mar. 11, 2020, 10 pgs.
Patel, Notice of Allowance, U.S. Appl. No. 15/435,228, filed Aug. 12, 2021, 9 pgs.
Patel, Notice of Allowance, U.S. Appl. No. 15/603,400, filed Dec. 18, 2019, 9 pgs.
Patel, Notice of Allowance, U.S. Appl. No. 15/603,400, filed Jun. 18, 2020, 5 pgs.
Patel, Notice of Allowance, U.S. Appl. No. 15/878,352, filed Oct. 23, 2020, 9 pgs.
Patel, Notice of Allowance, U.S. Appl. No. 16/029,483, filed Dec. 23, 2020, 23 pgs.

(56) References Cited

OTHER PUBLICATIONS

Patel, Notice of Allowance, U.S. Appl. No. 16/748,727, filed May 9, 2022, 18 pgs.
Patel, Notice of Allowance, U.S. Appl. No. 16/748,727, filed Jan. 20, 2022, 17 pgs.
Patel, Notice of Allowance, U.S. Appl. No. 16/750,477, filed Jan. 26, 2022, 17 pgs.
Patel, Notice of Allowance, U.S. Appl. No. 16/934,933, filed Mar. 31, 2021, 9 pgs.
Patel, Notice of Allowance, U.S. Appl. No. 16/681,673, filed Aug. 17, 2022, 22 pgs.
Patel, Notice of Allowability, U.S. Appl. No. 16/934,392, filed Sep. 28, 2022, 2 pgs.
Patel, Notice of Allowance, U.S. Appl. No. 17/529,111, filed Sep. 22, 2022, 10 pgs.
Patel, Notice of Allowance, U.S. Appl. No. 17/654,732, filed Sep. 16, 2022, 9 pgs.
Patel, Non-Final Office Action, U.S. Appl. No. 14/320,534, filed Apr. 8, 2016, 21 pgs.
Patel, Non-Final Office Action, U.S. Appl. No. 14/320,534, filed Oct. 29, 2014, 18 pgs.
Patel, Non-Final Office Action, U.S. Appl. No. 14/321,717, filed Dec. 19, 2014, 16 pgs.
Patel, Non-Final Office Action, U.S. Appl. No. 14/321,724, filed Mar. 13, 2017, 21 pgs.
Patel, Non-Final Office Action, U.S. Appl. No. 14/321,724, filed May 15, 2015, 19 pgs.
Patel, Non-Final Office Action, U.S. Appl. No. 14/321,733, filed Aug. 21, 2014, 9 pgs.
Patel, Non-Final Office Action, U.S. Appl. No. 14/335,762, filed Dec. 10, 2014, 7 pgs.
Patel, Non-Final Office Action, U.S. Appl. No. 14/335,762, filed Sep. 18, 2015, 13 pgs.
Patel, Non-Final Office Action, U.S. Appl. No. 14/456,683, filed Jan. 2, 2015, 10 pgs.
Patel, Non-Final Office Action, U.S. Appl. No. 14/458,192, filed Mar. 23, 2017, 26 pgs.
Patel, Non-Final Office Action, U.S. Appl. No. 14/458,192, filed Jan. 30, 2015, 24 pgs.
Patel, Non-Final Office Action, U.S. Appl. No. 14/458,199, filed Jan. 5, 2015, 7 pgs.
Patel, Non-Final Office Action, U.S. Appl. No. 14/458,199, filed Mar. 28, 2016, 8 pgs.
Patel, Non-Final Office Action, U.S. Appl. No. 14/611,065, filed Oct. 3, 2016, 19 pgs.
Patel, Non-Final Office Action, U.S. Appl. No. 14/611,065, filed Jun. 13, 2017, 17 pgs.
Patel, Non-Final Office Action, U.S. Appl. No. 14/614,336, filed May 27, 2015, 17 pgs.
Patel, Non-Final Office Action, U.S. Appl. No. 14/641,236, filed Feb. 7, 2018, 19 pgs.
Patel, Non-Final Office Action, U.S. Appl. No. 14/641,236, filed May 29, 2015, 10 pgs.
Patel, Non-Final Office Action, U.S. Appl. No. 14/968,703, filed Aug. 7, 2018, 31 pgs.
Patel, Non-Final Office Action, U.S. Appl. No. 15/406,492, filed Jul. 25, 2019, 17 pgs.
Patel, Non-Final Office Action, U.S. Appl. No. 15/435,228, filed Mar. 26, 2020, 21 pgs.
Patel, Non-Final Office Action, U.S. Appl. No. 15/603,400, filed Jun. 12, 2019, 11 pgs.
Patel, Non-Final Office Action, U.S. Appl. No. 15/878,352, filed Jan. 24, 2020, 13 pgs.
Patel, Non-Final Office Action, U.S. Appl. No. 15/893,514, filed Oct. 29, 2020, 17 pgs.
Patel, Non-Final Office Action, U.S. Appl. No. 15/956,741, filed Apr. 22, 2020, 10 pgs.
Patel, Non-Final Office Action, U.S. Appl. No. 15/956,741, filed Dec. 27, 2021, 10 pgs.
Patel, Non-Final Office Action, U.S. Appl. No. 16/029,483, filed Apr. 27, 2020, 28 pgs.
Patel, Non-Final Office Action, U.S. Appl. No. 16/681,673, filed Dec. 24, 2021, 21 pgs.
Patel, Non-Final Office Action, U.S. Appl. No. 16/934,933, filed Oct. 28, 2020, 10 pgs.
Patel, Non-Final Office Action, U.S. Appl. No. 17/216,399, filed Apr. 8, 2022, 15 pgs.
Patel, Non-Final Office Action, U.S. Appl. No. 15/893,514, filed Sep. 30, 2022, 8 pgs.
Pay Range Inc., Communication Pursuant to Article 94(3), EP14828617.2, Dec. 19, 2017, 6 pgs.
Pay Range Inc., Communication Pursuant to Article 94(3), EP16706931.9, Jun. 29, 2018, 8 pgs.
Pay Range Inc., Communication Pursuant to Rules 161(1) and 162, EP14828617.2, Sep. 21, 2016, 2 pgs.
Pay Range Inc., Communication Pursuant to Rules 161(1) and 162, EP16706931.9, Sep. 21, 2017, 2 pgs.
PayRange Inc., Communication under Rule 71(3) EPC, EP14828617.2, Nov. 19, 2020, 7 pgs.
Pay Range Inc., Communication under Rule 71(3) EPC, EP17708929.9, Jun. 12, 2020, 7 pgs.
Pay Range Inc., European Search Report, EP20203134.0, Mar. 1, 2021, 7 pgs.
Pay Range Inc., European Search Report, EP21165692.1, Sep. 14, 2021, 10 pgs.
Pay Range Inc., IPRP, PCT/US2014/071284, Jun. 21, 2016, 6 pgs.
Pay Range Inc., IPRP, PCT/US2016/015763, Aug. 1, 2017, 7 pgs.
Pay Range Inc., IPRP, PCT/US2017/015676, Jul. 31, 2018, 9 pgs.
Pay Range Inc., IPRP, PCT/US2017/018194, Aug. 21, 2018, 17 pgs.
Pay Range Inc., IPRP, PCT/US2019/060777, May 11, 2021, 7 pgs.
PayRange Inc., ISR/WO, PCT/US2014/071284, Mar. 25, 2015, 9 pgs.
Pay Range Inc., ISR/WO, PCT/US2016/015763, Apr. 8, 2016, 9 pgs.
Pay Range Inc., ISR/WO, PCT/US2017/015676, Apr. 18, 2017, 11 pgs.
PayRange Inc., ISR/WO, PCT/US2017/018194, Apr. 12, 2017, 10 pgs.
Pay Range Inc., ISR/WO, PCT/US2019/060777, Feb. 6, 2020, 11 pgs.
Pay Range Inc., ISR/WO, PCT/US2021/042632, Nov. 17, 2021, 11 pgs.
Pay Range Inc., Notice of Reasons for Rejection, JP2017527886, Aug. 29, 2019, 10 pgs.
Pay Range Inc., Notice of Reasons for Rejection, JP2018-543707, Sep. 4, 2020, 4 pgs.
Pay Range Inc., Notice of Reasons for Rejection, JP2020-101558, Oct. 7, 2021, 4 pgs.
Pay Range Inc., Summons to Attend Oral Proceedings, EP14828617.2, Apr. 2, 2020, 12 pgs.
PayRange New Product Launch, posted at youtube.com Jun. 27, 2015, © 2016 YouTube, LLC, [online], [site visited Mar. 2, 2016]. Available from Internet, <URL:https://www.youtube.com/watch?v=NTvvV03XFeg., 1 pg.
Smart Vending Machine Demo at TechCrunch Disrupt 2013, posted at youtube.com Dec. 3, 2013, © 2016 YouTube, LLC, [online], [site visited Mar. 2, 2016]. Available from internet, URL: https://www.youtube.com/watch?v=XEz1H-gxLj8>.
Square Mobile Credit Card Processing for iPhone, iPod, iPad, posted at youtube.com, posting date Apr. 30, 2011, © 2016 YouTube, LLC, [online], [site visited Mar. 2, 2016]. Available from internet, <URL: https://www.youtube.com/watch?v=v6sKb3CFSKw>.
Kanapaka et al., A Stochastic Game Theoretic Model for Expanding ATM Services. Https://ieeexplore.ieee.org/stamp/stamp.jsp?tp=&arnumber=7395687, 2015, 8 pgs.
Patel, Notice of Allownce, U.S. Appl. No. 17/147,305, filed Oct. 6, 2022, 9 pgs.
Hoffman et al., "New options in Wireless payments", Internet World 7.7:37 Penton Media Inc., Penton Business Media, Inc. and their subsidiaries. (Year: 2001) 5 pgs.

(56) References Cited

OTHER PUBLICATIONS

Carton et al., Framework for Mobile Payments Integration, Electronic Journal of Information Systems Evaluation, 15.1: 14-24, Academic Conferences International Limited, Jan. 2012, 14 pgs.
Apriva LLC Awarded Patent for System and Method for Facilitating a Purchase Transaction using a Customer Device Beacon, Jun. 7, 2017, Global IP News (Year: 2017), 5 pgs.
Kumar, "Amazon gets Indian patent for auto authentification of mobile transactions", ProQuest document Id:2433007646, Financial Express, Aug. 13, 2020, 2 pgs.
Patel, Non-Final Office Action, U.S. Appl. No. 17/443,802, filed Dec. 23, 2022, 14 pgs.
Patel, Non-Final Office Action, U.S. Appl. No. 15/956,741, filed Feb. 27, 2023, 11 pgs.
Patel et al., Notice of Allowance, U.S. Appl. No. 15/893,514, filed Apr. 10, 2023, 13 pgs.
Heimerl et al., "Community sourcing: Engaging Local Crowds to Perform Expert Work Via Physical Kiosks", CHI '12: Proceedings of the SIGCHI Conference on Human Factors in Computing Systems, May 2012, pp. 1539-1548, 10 pgs. https://doi.org/10.1145/2207676.2208619.
Patel, Notice of Allowance, U.S. Appl. No. 17/443,802, filed Jun. 28, 2023, 8 pgs.
Patel, Corrected Notice of Allowability, U.S. Appl. No. 17/443,802, filed Jul. 10, 2023, 5 pgs.
Patel, Notice of Allowance, U.S. Appl. No. 17/983,311, filed Jun. 28, 2023,10 pgs.
EIC 3600 Search Report, STIC, Scientific & Technical Information Center, Date Completed Jun. 12, 2023, 5 pgs.
Patel et al., Notice of Allowance, U.S. Appl. No. 15/893,514, Jul. 12, 2023, 13 pgs.
Patel et al., Notice of Allowance, U.S. Appl. No. 17/973,506, filed Jul. 26, 2023, 13 pgs.
Katy Jacob, "Are mobile payments the smart cards of the aughts?", Scientific and Technical Information Center, Report Information from Dialog, Jul. 14, 2023—11:33, ProQuest, Publication Info: Chicago Fed Letter 240: 1-4. Federal Reserve Bank of Chicago. (Jul. 2007), 9 pgs.
Patel et al., Notice of Allowance, U.S. Appl. No. 17/963,170, filed Aug. 4, 2023, 16 pgs.
USA Technologies Announces Cashless Solution to Be Offered by Blackboard Inc., Scientific and Technical Information Center, Report Information from Dialog, Jul. 25, 2023, ProQuest, Publication Info: Business Wire Jul. 18, 2007: NA, 6 pgs.
Patel, Non-Final Office Action, U.S. Appl. No. 18/197,071, filed Aug. 16, 2023, 9 pgs.
Hossain et al., "Comprehensive Study of Bluetooth Signal Parameters for Localization", Department of Electrical & Computer Engineering National University of Singapore, 5 pgs. Email: {g0500774, weeseng}@nus.edu.sg.
Bluetooth Specification 1.2, Covered Core Package version: 1.2, Current Master TOC issued: Nov. 5, 2003, 1200 pgs.
Hands-Free Profile 1.5, Doc. No. HFP1.5_SPEC, Nov. 25, 2005, 93 pgs.
DEX and MDB: A Primer For Vendors | Vending Market Watch, Feb. 7, 2008, 5 pgs. https://www.vendingmarketwatch.com/print/content/10272928.
MDB Protocol V4.2—Multi-Drop Bus—Internal Communication Protocol, MDB / ICP, Version 4.2, Feb. 2011, 313 pgs.
Gruber et al., "The Commodity Vending Machine", Forum Ware International Feb. 2005, 11 pgs.
Michael L. Kasavana, Innovative VDI Standards: Moving an Industry Forward, The Journal of International Management, vol. 4, No. 3, Dec. 2009, 10 pgs.
SDFL Administrative Order 2021-33, Apr. 6, 2021, 5 pgs.
The New York Times by David Pogue, In Arrived of 2 iPhones, 3 Lessons, Sep. 17, 2013, 4 pgs. https://www./nytime.com/2013/09/18/technology/personaltech/In-Arrived-of-2-iPhones-3-Lessons.html.
Cnet, John Thompson, How to use S Beam on your Samsung Galaxy S3, Jun. 21, 2012, 5 pgs. https://www.cnet.com/how-to/how-to-use-s-beam-on-your-samsung-galaxy-s3/.
IPhone, User Guide For iOS 6.1 Software, 156 pgs.
Apple Reports Fourth Quarter Results, Oct. 28, 2013, 4 pgs.
Apple Announces iPhone 5s—The Most Forward—Thinking Smartphone in the World, Sep. 10, 2013, 5 pgs.
CNet, by Marguerite Reardon, Motion sensing comes to mobile phones, Jun. 11, 2007, 4 pgs.
Multi-Drop Bus—Internal Communication Protocol, MDB / ICP, Version 3, Mar. 26, 2003, 270 pgs.
Weidong Kou, Payment Technologies for E-Commerce, University of Hong Kong Pokfulam Road, Hong Kong, ACM Subject Classification (1998): H.4, K.4.4, J.1, 339 pgs.
Specification for RFID Air Interface, EPC™ Radio-Frequency Identity Protocols, Class-1 Generation-2 UHF RFID, Protocol for Communications at 860 MHz-960 MHz, Version 1.2.0, EPCglobal Inc., Oct. 23, 2008, 108 pgs.
Baier et al., "Principles of Model Checking", The MIT Press Cambridge, Massachusetts, London, England, 2008, 994 pgs.
Patel, Notice of Allowance, U.S. Appl. No. 17/983,311, filed Oct. 4, 2023,11 pgs.
Patel, Non-Final Office Action, U.S. Appl. No. 18/197,070, filed Sep. 27, 2023, 8 pgs.
Patel, Notice of Allowance, U.S. Appl. No. 17/443,802, filed Nov. 1, 2023, 8 pgs.
Patel et al., Notice of Allowance, U.S. Appl. No. 15/893,514, filed Nov. 8, 2023, 13 pgs.
Kevin Werbach et al., "Contracts Ex Machina", Articles, Faculty Scholarship, University of Michigan Law School, The University of Michigan Law School Scholarship Repository, (Year: 2017), 71 pgs. https://repository.law.umich.edu/cgi/viewcontent.cgi?article=2936&context=articles.
Patel et al., Notice of Allowance, U.S. Appl. No. 17/973,506, filed Dec. 7, 2023, 11 pgs.
Bailey, Mobile-phone payment option gains ground, Dialog, STIC, Report Information from Dialog, Nov. 29, 2023, 6 pgs.
Patel, Non-Final Office Action, U.S. Appl. No. 17/968,672, filed Dec. 15, 2023, 14 pgs.
Patel, Non-Final Office Action, U.S. Appl. No. 17/973,505, filed Dec. 15, 2023, 14 pgs.
Patel, Notice of Allowance, U.S. Appl. No. 18/197,070, filed Dec. 20, 2023, 10 pgs.
"Mobile payment heads to the U.S.", Mobile Internet 6.10:1. Information Gatekeepers, Inc. (Oct. 2004), 2 pgs.
"During the period 2005 to 2009, the total number of wireless data connections used for retail applications in Europe can be expected to rise from less than 1 million to around 3 million", M2 PressWire, Feb. 28, 2006, 3 pgs.
Patel, Non-Final Office Action, U.S. Appl. No. 17/973,507, filed Jan. 26, 2024, 9 pgs.
Patel, Notice of Allowance, U.S. Appl. No. 15/956,741, filed Jan. 18, 2024, 18 pgs.
IEEE Standard for Information technology—Telecommunication and information exchange between systems—Local and metropolitan area networks—Specific requirements, Part 15.4: Wireless Medium Access Control (MAC) and Physical Layer (PHY) Specifications for Low-Rate Wireless Personal Area Networks (LR-WPANs), IEEE, The Institute of Electrical and Electronics Engineers, Inc., 3 Park Avenue, New York, NY 10016-5997, USA, Oct. 1, 2003, 679 pgs.
Patel et al., Notice of Allowance, U.S. Appl. No. 17/963,170, filed Dec. 12, 2023, 11 pgs.
Slick self-service options: as staffing remains lean grocers are using advanced self-service checkouts and kiosks to augment customer service, Dialog, STIC, Report Information from Dialog, Nov. 30, 2023, 8 pgs.
Patel, Notice of Allowance, U.S. Appl. No. 18/197,071, filed Jan. 26, 2024, 10 pgs.
Patel, Non-Final Office Action, U.S. Appl. No. 17/985,832, filed Feb. 29, 2024, 10 pgs.
Patel, Non-Final Office Action, U.S. Appl. No. 17/978,894, filed Jan. 17, 2024, 10 pgs.

(56) References Cited

OTHER PUBLICATIONS

Mumford, "The Components of credit card vending", Automatic Merchandiser, Oct. 9, 2009, pp. 42-47 (Year: 2009), 7 pgs.
"The benefits of offline vs. online vending machines", retrieved from https://web.archive.org/web/20181109215952/https://www.parlevelsystems.com/2018/10/23/online-offline-infographic/, Oct. 23, 2018, 2 pgs.) (Year: 2018).
Patel, Notice of Allowance, U.S. Appl. No. 17/973,507, filed May 10, 2024, 10 pgs.
CBM2020-00026 Petition—U.S. Pat. No. 9,659,296, 99 pgs.
IPR2021-00086 Petition—U.S. Pat. No. 9,659,296, 74 pgs.
IPR2023-01186 Institution—U.S. Pat. No. 8,856,045 B1, Entered: Jan. 19, 2024, 23 pgs.
IPR2023-01186 Petition—U.S. Pat. No. 8,856,045, 87 pgs.
IPR2023-01187 Petition—U.S. Pat. No. 10,438,208, 83 pgs.
IPR2023-01188 Petition—U.S. Pat. No. 10,891,608, 83 pgs.
IPR2023-01449 Institution—U.S. Pat. No. 11,481,772 B2, Date: Apr. 12, 2024, 27 pgs.
IPR2023-01449 Petition—U.S. Pat. No. 11,481,772, 96 pgs.
PGR2021-00077 Final Decision—U.S. Pat. No. 10,719,833 B2, Date: Oct. 26, 2022, 60 pgs.
PGR2021-00077 Institution—U.S. Pat. No. 10,719,833 B2, Date: Oct. 28, 2021, 53 pgs.
PGR2021-00077 Petition—U.S. Pat. No. 10,719,833, 102 pgs.
PGR2021-00084 Petition—U.S. Pat. No. 10,891,608, 123 pgs.
PGR2021-00093 Final Decision—U.S. Pat. No. 10,891,614 B2, 70 pgs.
PGR2021-00093 Institution—U.S. Pat. No. 10,891,614 B2, Entered: Dec. 17, 2021, 49 pgs.
PGR2021-00093 Petition—U.S. Pat. No. 10,891,614, 107 pgs.
PGR2022-00035 Petition—U.S. Pat. No. 11,074,580, 102 pgs.
PGR2023-00042 Petition—U.S. Pat. No. 11,481,772, 102 pgs.
PGR2023-00045 Petition—U.S. Pat. No. 11,488,174, 99 pgs.
PGR2023-00050 Petition—U.S. Pat. No. 11,501,296, 103 pgs.
Planet Laundry Magazine, "Upwardly Mobile", Smartphones and Other Mobile Devices Are Increasingly Becoming the Way Your Customers Prefer to Find—And Interact With—Your Business, Oct. 2013, "Magazine pp. 32-33 (PDF pp. 34-35)", 68 pgs.
PayRange Inc., Notice of Reasons for Rejection, Japanese Patent Application No. 2023-504380, Dec. 20, 2024, 6 pgs.
Final Office Action, U.S. Appl. No. 18/643,965, filed Jul. 1, 2024, 17 pgs.
W. Zhang and X. L. Zhang, "Design and Implementation of Automatic Vending Machine Based on the Short Massage Payment," 2010 6th International Conference on Wireless Communications Networking and Mobile Computing (WiCOM), Chengdu, China. https://ieeexplore.ieee.org/document/5600192?source=10plus (Year: 2010), 4 pgs.
Patel, Non-Final Office Action, U.S. Appl. No. 18/643,971, filed Jul. 5, 2024, 11 pgs.
Patel, Non-Final Office Action, U.S. Appl. No. 18/643,979, filed Jul. 18, 2024, 12 pgs.
Patel, Non-Final Office Action, U.S. Appl. No. 18/643,975, filed Jul. 18, 2024, 12 pgs.
Patel, Notice of Allowance, U.S. Appl. No. 17/973,505, filed Jul. 17, 2024, 12 pgs.
Patel, Notice of Allowance, U.S. Appl. No. 17/978,894, filed Jul. 17, 2024, 10 pgs.
Patel, Notice of Allowance, U.S. Appl. No. 17/968,672, filed Jul. 17, 2024, 12 pgs.
Patel, Non-Final Office Action, U.S. Appl. No. 17/985,832, filed Aug. 1, 2024, 7 pgs.
Patel, Notice of Allowance, U.S. Appl. No. 18/888,036, filed Mar. 19, 2025, 10 pgs.
Patel, Non-Final Office Action, U.S. Appl. No. 18/963,481, filed Mar. 21, 2025, 24 pgs.
Tao-Ku Chang et al., "A Secure Cloud-Based Payment Model for M-Commerce," 2013 42nd International Conference on Parallel Processing, Lyon, France, 2013, pp. 1082-1086, 5 pgs. doi: 10.1109/ICPP.2013.129. keywords: {Mobile communication;XML;Servers;Access control;Smart phones;Mobile Payment;Web Services;Cloud Security}.
PayRange, Inc., PCT/US2024/057922, International Search Report and Written Opinion, Mar. 12, 2025, 15 pgs.
Patel, Non-Final Office Action, U.S. Appl. No. 19/019,278, filed Apr. 7, 2025, 12 pgs.
Patel, Notice of Allowance, U.S. Appl. No. 19/019,281, filed Apr. 18, 2025, 11 pgs.
Goetting, "Device Description HG G-76343/4/5", Wlan Radio Modem 802.11 a/b/g/n, Top Hat Rail or Flange Casing, Jan. 24, 2024, 130 pgs. www.goetting-agv.com.
Patel, Non-Final Office Action, U.S. Appl. No. 19/077,043, filed May 13, 2025, 12 pgs.
Patel, Non-Final Office Action, U.S. Appl. No. 18/636,314, filed May 14, 2025, 13 pgs.
Patel, Final Office Action, U.S. Appl. No. 18/963,481, filed Jul. 14, 2025, 16 pgs.
A. M. Elshaer et al., "IoT-Enabled E-Prescription Management and Dispensing Machine Monitoring", Published in: 2024 14th International Conference on Electrical Engineering (ICEENG), Date Added to IEEE Xplore: Jun. 25, 2024, Cairo, Egypt, 5 pgs.
Patel, Notice of Allowance, U.S. Appl. No. 19/019,278, filed Jul. 29, 2025, 8 pgs.
Patel, Notice of Allowance, U.S. Appl. No. 19/077,043, filed Sep. 9, 2025, 16 pgs.
PayRange Inc., International Search Report and Written Opinion, PCT/US2025/011459, Aug. 22, 2025, 23 pgs.
PGR2025-00027 Petition—U.S. Pat. No. 11,966,920 B2, dated Aug. 25, 2025, 57 pgs.
PGR2025-00028 Petition—U.S. Pat. No. 11,972,423, B2, dated Aug. 25, 2025, 45 pgs.
Patel, Notice of Allowance, U.S. Appl. No. 18/830,424, Oct. 14, 2025, 16 pgs.
Patel, Notice of Allowance, U.S. Appl. No. 19/019,278, Nov. 26, 2025, 9 pgs.
Patel, Non-Final Office Action, U.S. Appl. No. 18/952,804, Nov. 28, 2025, 9 pgs.
Payrange LLC, EP21165692, Office Action, Nov. 21, 2025, 8 pgs.

* cited by examiner

| Tab | Favorite? | Alert | View to User |
|---|---|---|---|
| All | Yes | No | User can make Hands-free Credit with the connected vending machine |
| All | No | Yes | User needs to launch Mobile Device and then swipe to make transaction manually |
| Favorite | Yes | No | Hands-free transaction will be available to the user via vending machine |
| Favorite | No | No | User is not alerted for the vending machine which is not a favorite machine. Hands-free mode will not work, manual swipe for transaction required by user. |
| Either All or Favorite | Yes | Yes | BUT Hands-free Credit is not available (disabled by module, expired AuthGrant, insufficient balance, or other issue), then user will get an alert so that user can swipe credit manually. |

Figure 3

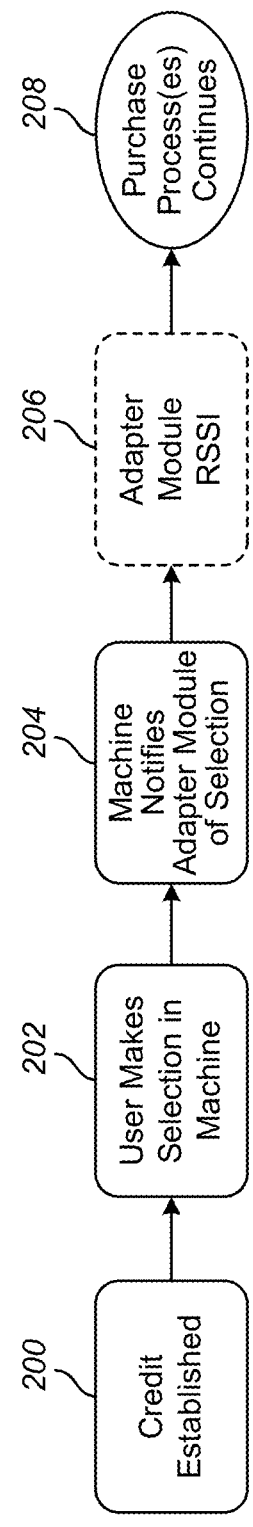

Figure 4

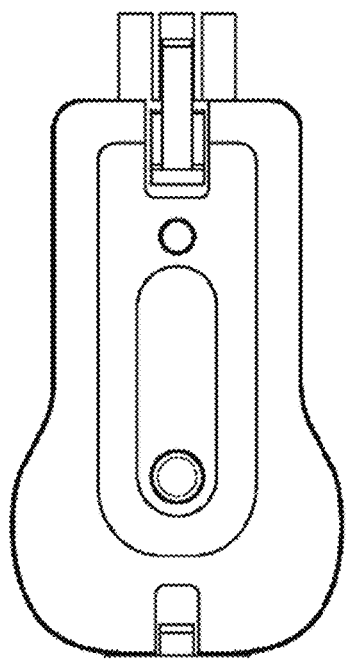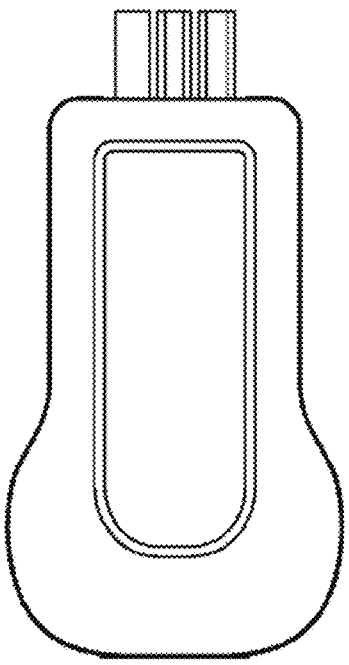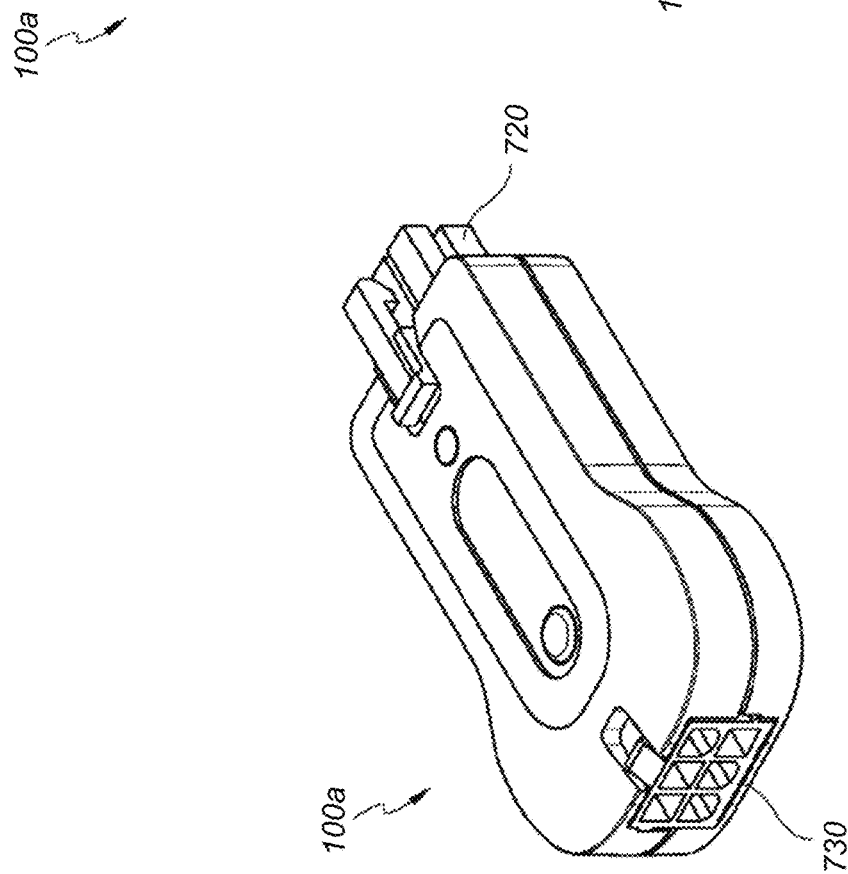

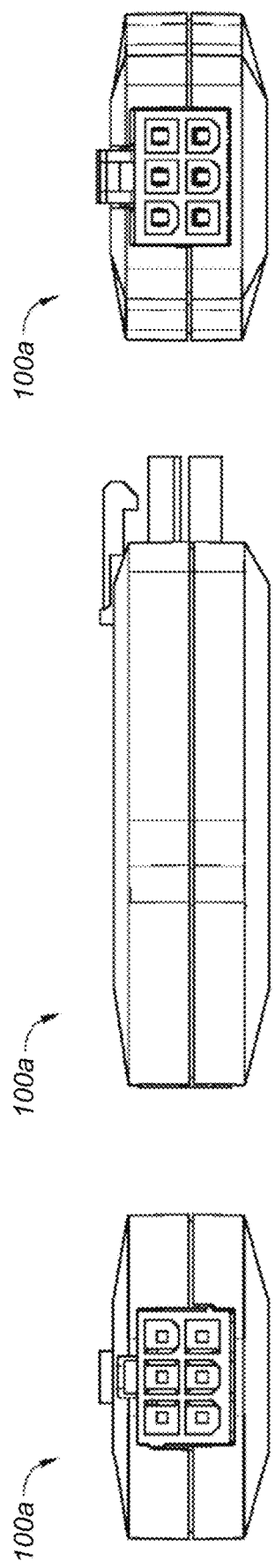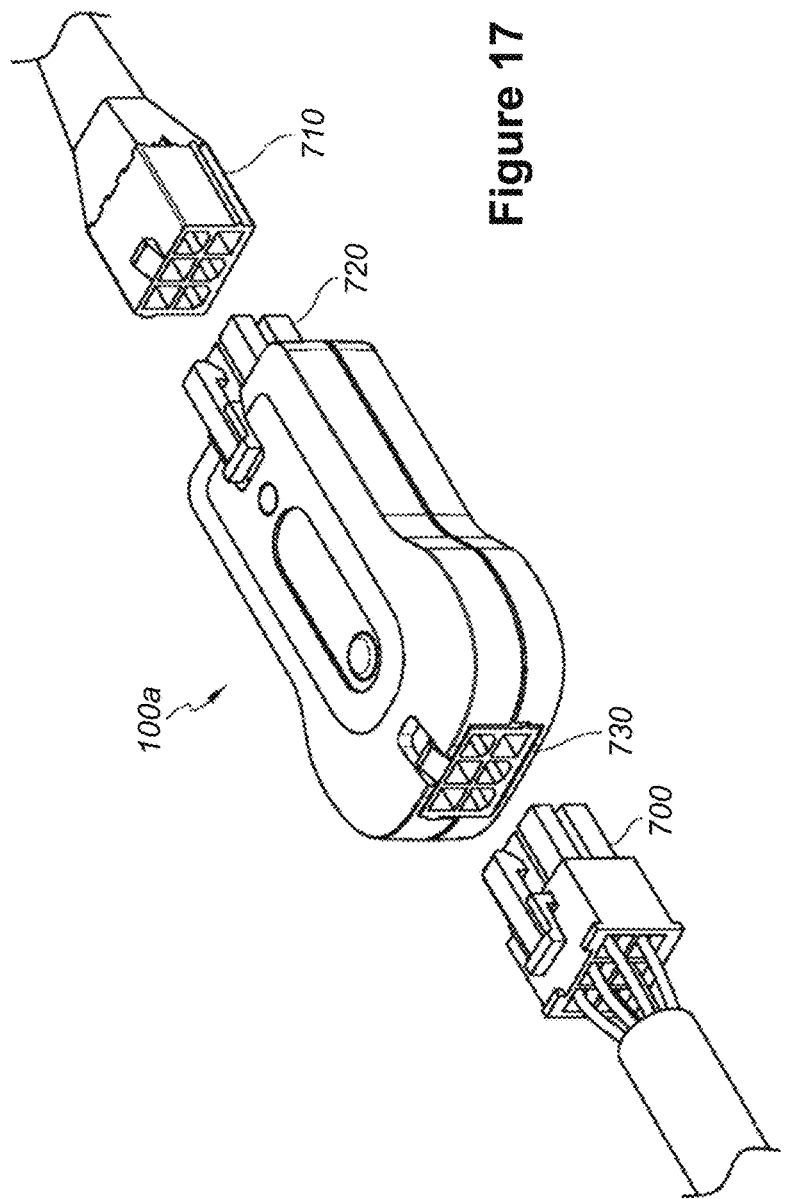

DEVICE AND METHOD FOR PROVIDING EXTERNAL ACCESS TO MULTI-DROP BUS PERIPHERAL DEVICES

PRIORITY CLAIM

The present application is a continuation of U.S. patent application Ser. No. 17/443,802, filed Jul. 27, 2021, which is a continuation of U.S. patent application Ser. No. 16/934,933, filed Jul. 21, 2020 and issued as U.S. Pat. No. 11,074,580 on Jul. 27, 2021, each of which is hereby incorporated by reference in its entirety.

U.S. patent application Ser. No. 16/934,933 is a continuation-in-part of U.S. patent application Ser. No. 15/406,492, filed Jan. 13, 2017 and issued as U.S. Pat. No. 10,719,833 on Jul. 21, 2020, which is a continuation of U.S. patent application Ser. No. 14/335,762, filed Jul. 18, 2014 and issued as U.S. Pat. No. 9,547,859 on Jan. 17, 2017, which is a continuation of U.S. patent application Ser. No. 14/214,644, filed Mar. 14, 2014 and issued as U.S. Pat. No. 8,856,045 on Oct. 7, 2014, which claims priority to U.S. Provisional Patent Application No. 61/917,936, filed Dec. 18, 2013, and is a continuation-in-part of U.S. Design patent application Ser. No. 29/477,025, filed Dec. 18, 2013 and issued as U.S. Pat. No. D755,183 on May 3, 2016, each of which is hereby incorporated by reference in its entirety.

U.S. patent application Ser. No. 16/934,933 is also a continuation-in-part of U.S. patent application Ser. No. 16/029,483, filed Jul. 6, 2018 and issued as U.S. Pat. No. 10,963,905 on Mar. 30, 2021, which is a continuation of Ser. No. 14/611,065, filed Jan. 30, 2015 and issued as U.S. Pat. No. 10,019,724 on Jul. 10, 2018, each of which is hereby incorporated by reference in its entirety.

U.S. patent application Ser. No. 16/934,933 is also a continuation-in-part of U.S. patent application Ser. No. 15/893,514, filed Feb. 9, 2018, which claims priority to International Patent Application No. PCT/US17/15676, filed Jan. 30, 2017, which is a continuation of U.S. Provisional Patent Application No. 62/289,158, filed Jan. 29, 2016. U.S. patent application Ser. No. 15/893,514 is also a continuation-in-part of U.S. patent application Ser. No. 14/641,236, filed Mar. 6, 2015, which claims priority to U.S. Provisional Patent Application No. 62/081,492, filed Nov. 18, 2014. U.S. patent application Ser. No. 14/641,236 is also a continuation-in-part of U.S. patent application Ser. No. 14/320,534, filed Jun. 30, 2014, which is a continuation-in-part of U.S. patent application Ser. No. 14/214,644, filed Mar. 14, 2014 and issued as U.S. Pat. No. 8,856,045 on Oct. 7, 2014, which claims priority to U.S. Provisional Patent Application No. 61/917,936, filed Dec. 18, 2013, and is a continuation-in-part of U.S. Design patent application Ser. No. 29/477,025, filed Dec. 18, 2013 and issued as U.S. Pat. No. D755,183 on May 3, 2016, each of which is hereby incorporated by reference in its entirety.

TECHNICAL FIELD

The present application relates to the field of electronic peripheral devices, and in particular, to a system for providing access to an electronic peripheral device over a non-persistent network connection.

BACKGROUND

Master/slave technology uses a model of dualistic communication where one device or process (the master) has control over one or more other devices (the slave(s)), sometimes referred to as peripheral devices.

Peripheral devices are often disposed at the functional interface between various internal components of a machine and a user of those components, thereby enabling human/machine interaction. While some types of peripheral devices may be removed and replaced (e.g., a Universal Serial Bus (USB) mouse or keyboard) or accessed by outside devices (e.g., a wireless printer), other types of peripheral devices, such as a bill acceptor or card reader, may be embedded in a machine and dependent on aspects of the machine (such as the machine's power supply, processing system, and physical housing) to operate.

As the number of people with Internet-connected mobile devices proliferates, so does the variety of uses for such devices. Some uses may be enhanced or even require certain types of peripheral devices which have traditionally only been accessible in embedded systems which do not necessarily provide access to outside devices.

SUMMARY

Disclosed herein is a system for providing external access to electronic peripheral devices disposed in a machine. The system enables an external device to access functionality provided by an electronic peripheral device of a machine by providing wireless communications between a mobile application and the electronic peripheral device. In order to provide this access, the system (i) communicatively decouples the electronic peripheral device from a machine controller which normally would function as the master of the electronic peripheral device, and (ii) communicatively couples the electronic peripheral device with the mobile application which functions as the master of the electronic peripheral device until the mobile application no longer requires access to the functionality provided by the electronic peripheral device.

BRIEF DESCRIPTION OF THE DRAWINGS

FIG. 3 is a table that illustrates the hands-free credit or alert user principle in accordance with some implementations.

FIG. 4 is a flow chart showing the logging received signal strength indicator (RSSI) information in accordance with some implementations.

FIG. 11 is a perspective view of the in-line dongle adapter module in accordance with some implementations.

FIG. 12 is a front plan view of the in-line dongle adapter module of FIG. 11 in accordance with some implementations.

FIG. 13 is a back plan view of the in-line dongle adapter module of FIG. 11 in accordance with some implementations.

FIG. 14 is a side view of the in-line dongle adapter module of FIG. 11 in accordance with some implementations.

FIG. 15 is a first end view of a connector receptacle of the in-line dongle adapter module of FIG. 11 in accordance with some implementations.

FIG. 16 is a second end view of a connector receptacle of the in-line dongle adapter module of FIG. 11 in accordance with some implementations.

FIG. 17 is a perspective view taken from the first end of the in-line dongle adapter module of FIG. 11, the connectors and cables between which the in-line dongle adapter module is inserted being shown in broken lines for illustrative purposes in accordance with some implementations.

Like reference numerals refer to corresponding parts throughout the several views of the drawings.

DETAILED DESCRIPTION

Figure 2:
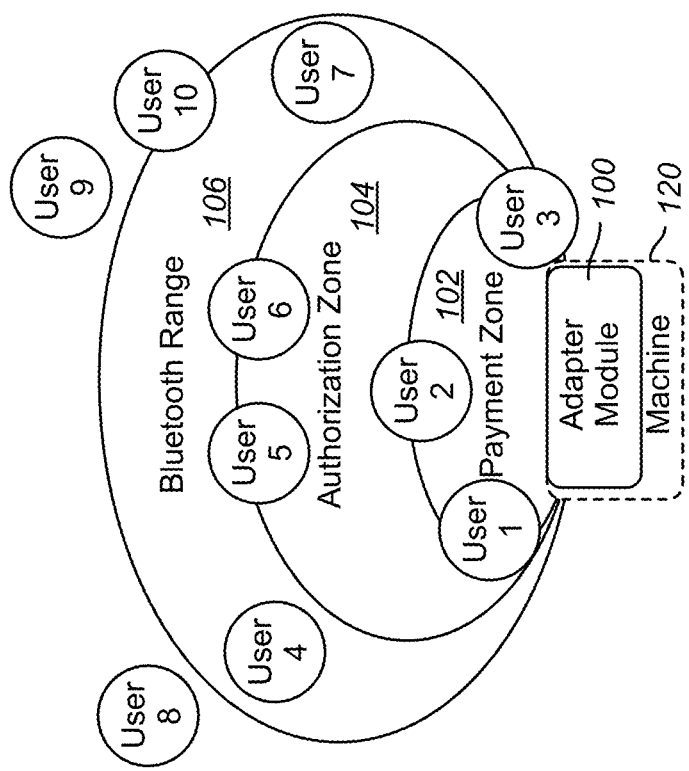
FIG. 2 is a schematic diagram that shows the three zones of FIG. 1 with multiple users therein in accordance with some implementations.

Disclosed herein is a payment processing system or, more specifically, a mobile-device-to-machine payment processing system for processing transactions over a non-persistent network connection. The mobile-device-to-machine payment processing system disclosed herein focuses on the unattended retail space (e.g., a payment accepting unit 120, sometimes also herein called a "machine 120"). More specifically, the mobile-device-to-machine payment processing system disclosed herein allows a user (having a mobile device 150 with a mobile application 140 thereon) to make a cashless purchase from a payment accepting unit 120 (having an adapter module 100 associated therewith).

The mobile-device-to-machine payment processing system described herein can be implemented with one or more of the following features: easy installation feature, a non-persistent network connection feature; a manual (swipe to pay) mode feature; a hands-free mode feature; and a multiple vending transactions (multi-vend) feature.

Easy Installation: Installation is very easy, requires no tools, requires no configuration, and takes as little as 30 seconds. This is accomplished by using an adapter module 100 (sometimes also herein called "payment module 100") such as an in-line dongle (a hardware device with software thereon) design for in-line insertion within a multi-drop bus (MDB) of a payment accepting unit 120 (e.g., a vending machine) (sometimes also herein called 'the machine 120"). Installation is as simple as "powering down" (turning off) the machine 120, identifying the "wire" that connects with a payment receiving mechanism (e.g., the coin mechanism), disconnecting the wire (so that there are two loose ends, such as a male connection end or adapter of an MDB and a female connection end or adapter of an MDB), plugging (inserting) the adapter module 100 in serial ("in-line") with the wire (e.g., connecting the MDB female adapter to a male adapter of the adapter module 100 and connecting the MDB male adapter to a female adapter of the adapter module 100), tucking the wire and the installed adapter module 100 back into position, and "powering up" (turning on) the machine 120. Most vending machines made since 1995 have this industry standard MDB technology that would allow this easy 30-second installation. On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Non-persistent Network Connection: Although payment accepting units (or "machines") that accept only cash (e.g., paper currency and coins) may not require a connection (persistent or non-persistent) to a network, traditional payment accepting units that accept cashless payments (e.g., credit cards, debit cards, and alternative mobile device payment methods using, for example, smart phones) require a persistent connection to a network (wired or wireless) to facilitate the cashless payments. In other words, without a persistent (ongoing or accessible on demand) network connection, traditional payment accepting units cannot accept cashless payments. Most traditional payment accepting units that accept cashless payments include the technology to accomplish this persistent network connection that allows them to connect to a remote server. If the network connection to a traditional machine is temporarily interrupted, cashless payments will be temporarily unavailable. If the machine is located in a location where no network connection is available, cashless payments is not possible. In addition to using a mobile device 150 as an intermediary between the payment accepting units 120 and the server 130, the mobile-device-to-machine payment processing system described herein minimizes (i.e., the manual mode) or eliminates (i.e., the hands-free mode) user interaction with the mobile device 150. Further, in some implementations, the mobile-device-to-machine payment processing system described herein facilitates the acceptance of cashless payments without requiring any network connection near the payment accepting unit 120. In some implementations, when the mobile-device-to-machine payment processing system described herein is located in a remote location where network connection is unavailable, the mobile-device-to-machine payment processing system, therefore, can still accept cashless payments.

Manual (Swipe-to-Pay) Mode: Using a "swipe-to-pay" feature (or just "swipe") refers to a user's action implemented on his/her mobile device 150 where he/she quickly brushes his/her finger (or other pre-determined interaction) on the mobile device's touch screen 152 (FIGS. 10A-10D) or other input devices associated with the mobile device 150. From the user's perspective, when the user is within range, a pre-installed mobile application 140 automatically connects to the payment accepting unit 120 (e.g., a vending machine). The mobile application 140 might display (on the touch screen 152) a prepaid balance that the user "swipes" to transfer payment to the payment accepting unit 120. The user could observe the transferred funds on the touch screen 152 of the mobile device 150 and/or on the display 122, 124 (FIG. 19) of the payment accepting unit 120. The transaction is completed just as if cash was inserted in the machine 120 with the user inputting his selection on the payment accepting unit 120 and the payment accepting unit 120 dispensing the product or service. After the selection is made, the change is returned to the mobile device 150 and this may be shown on the touch screen 152 of the mobile device 150.

Hands-Free Mode: A "hands-free pay" feature (or just "hands-free") would most likely be used with "favorite" payment accepting units 120 (e.g., a frequently used vending machine at a user's work or school). From the user's perspective, he/she would approach the favorite payment accepting unit 120 and notice that the display 122, 124 (FIG. 19) of the payment accepting unit 120 shows funds available, he/she would select the product or service using the payment accepting unit's input mechanisms (e.g., buttons 126 or a touch screen display 124 shown in FIG. 19), and he/she would retrieve dispensed services or products. It would be that simple. More specifically, when the user is within range, a pre-installed mobile application 140 automatically connects to the payment accepting unit 120 (e.g., a vending machine). The user may leave the mobile device 150 in a pocket, purse, briefcase, backpack, or other carrier. As the user approaches the payment accepting unit 120 and is in approximately "arm's-length" distance (e.g., 3 to 5 feet) of the payment accepting unit 120, the user could observe the transferred funds on the display 122, 124 (FIG. 19) of the payment accepting unit 120. The transaction is completed just as if cash was inserted into the payment accepting unit 120 with the user inputting his/her selection on the payment accepting unit 120 and the payment accepting unit 120 dispensing the product or service. After the selection is made, the change is returned to the mobile device 150. FIG. 3 details when the hands-free mode would be available.

Multiple Vending Transactions (Multi-Vend): Both the manual and hands-free modes could be used multiple times in sequence (implemented, for example, as a loop) so that a user may make multiple purchases. After making his/her first selection and receiving his product (or service), the user would observe that additional funds were available on the display 122, 124 (FIG. 19) on the payment accepting unit 120. He/she could make another selection (or multiple selections) and receive additional product(s) (or service(s)). More specifically, the display 122, 124 (FIG. 19) may reset as if the transaction is complete, but then, because the user is still standing in range, the mobile application 140 would send another credit to the payment accepting unit 120, allowing for a second purchase. When the user walks away, the system clears (e.g., returns unused funds to the application 140 on the mobile device 150).

The features described above, alone or in combination with other features described herein will revolutionize the hundred billion dollar automated retail industry. The hardware is very low cost and there are no reoccurring fees because no cellular connection is required on the machine 120. Using the mobile-device-to-machine payment processing system described herein, operators of machines 120 can increase frequency of visits by purchasers and items sold with each visit.

The mobile-device-to-machine payment processing system described herein may be implemented as an apparatus, system, and/or method for enabling payments to a machine 120 via a mobile device 150. The mobile-device-to-machine payment processing system may be better understood with reference to the drawings, but the shown mobile-device-to-machine payment processing system is not intended to be of a limiting nature.

Definitions

Before describing the mobile-device-to-machine payment processing system and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

Figure 1:
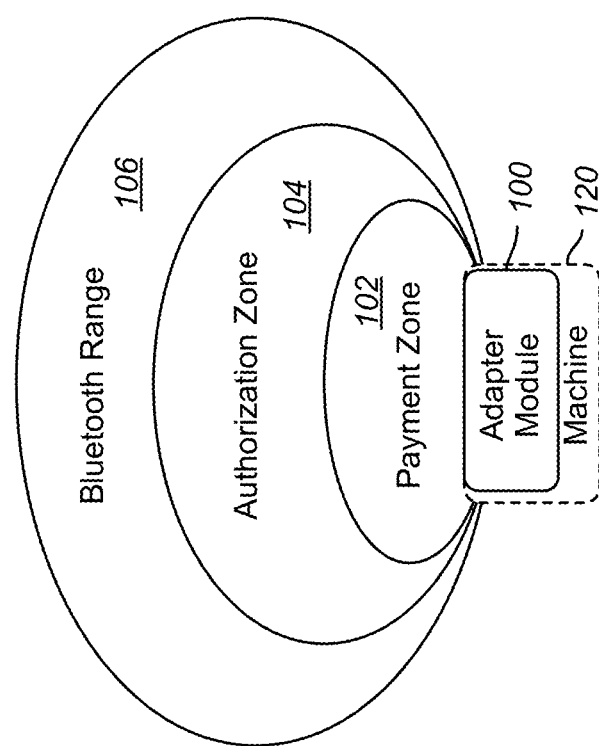
FIG. 1 is a schematic diagram that shows three zones: a "communication zone" (e.g., Bluetooth range), an "authorization zone," and a "payment zone" in accordance with some implementations.
Figure 20:
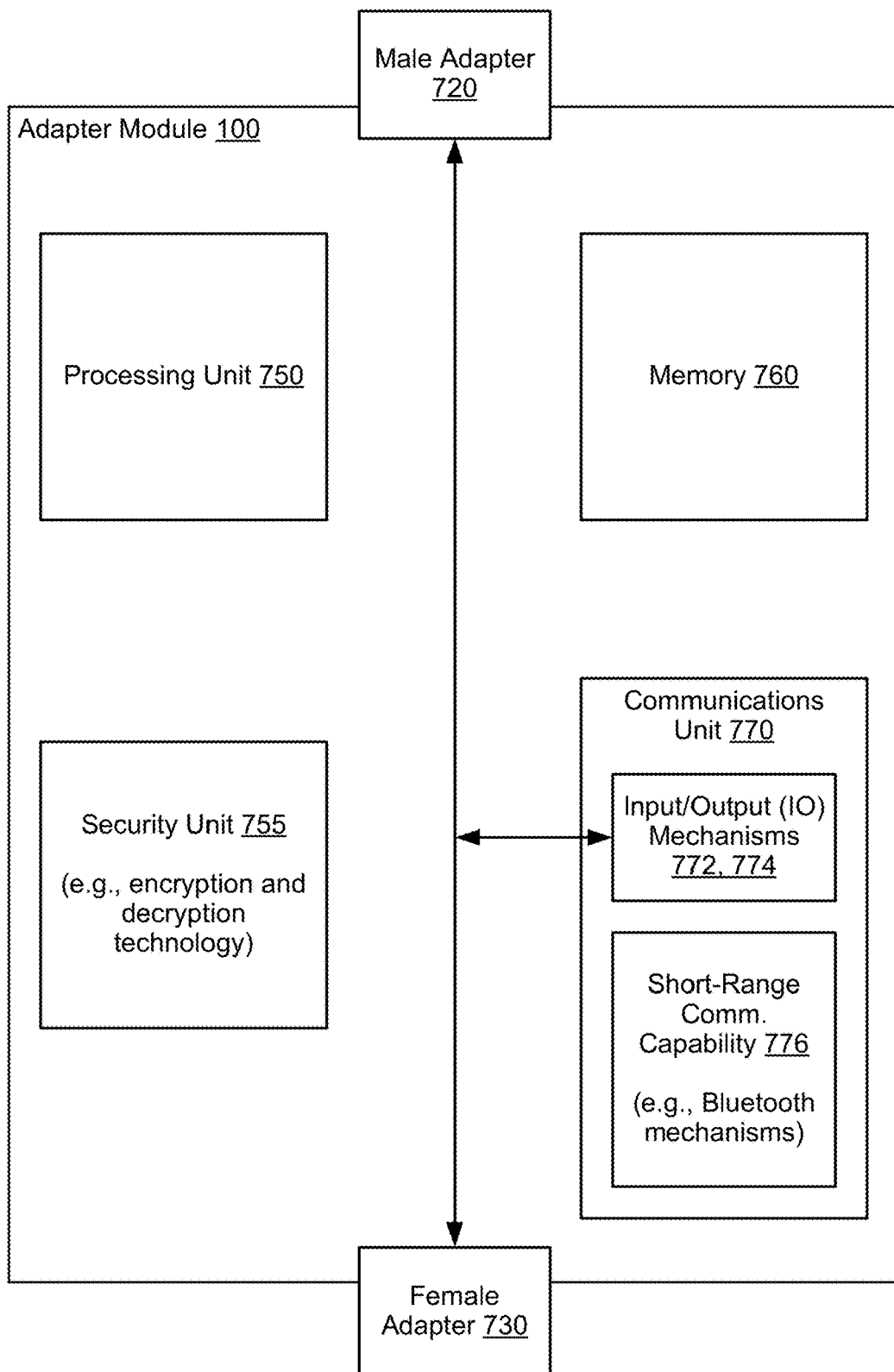
FIG. 20 is a block diagram of an adapter module in accordance with some implementations.

Adapter Module 100: As shown in FIGS. 1 and 2, the adapter module 100 (sometimes also herein called the "payment module 100") is a physical device that is installed in a machine 120 (a payment accepting unit 120). The shown adapter module 100 is an in-line dongle (a hardware device with software thereon) device that may be inserted in-line within a multi-drop bus (MDB) of a machine 120. The adapter module 100 bridges the communication between the machine 120 and a mobile device 150. Although described as a unique component, it should be noted that the adapter module 100 could be implemented as a plurality of devices or integrated into other devices (e.g., components of a machine 120). In its unique component form, the adapter module 100 can be easily inserted into a machine 120 so that the machine 120 is able to perform new features with the assistance of the adapter module 100. FIG. 20 shows components associated with the adapter module 100. As shown in FIG. 20, the communications unit 770 of the adapter module 100 includes short-range communication capability 776 (e.g., Bluetooth mechanisms). The shown example may be divided into multiple distinct components that are associated with each other or the example may be incorporated into or drawn from other technology (e.g., a computer or a payment accepting unit) as long as the components are associated with each other.

Figure 21:
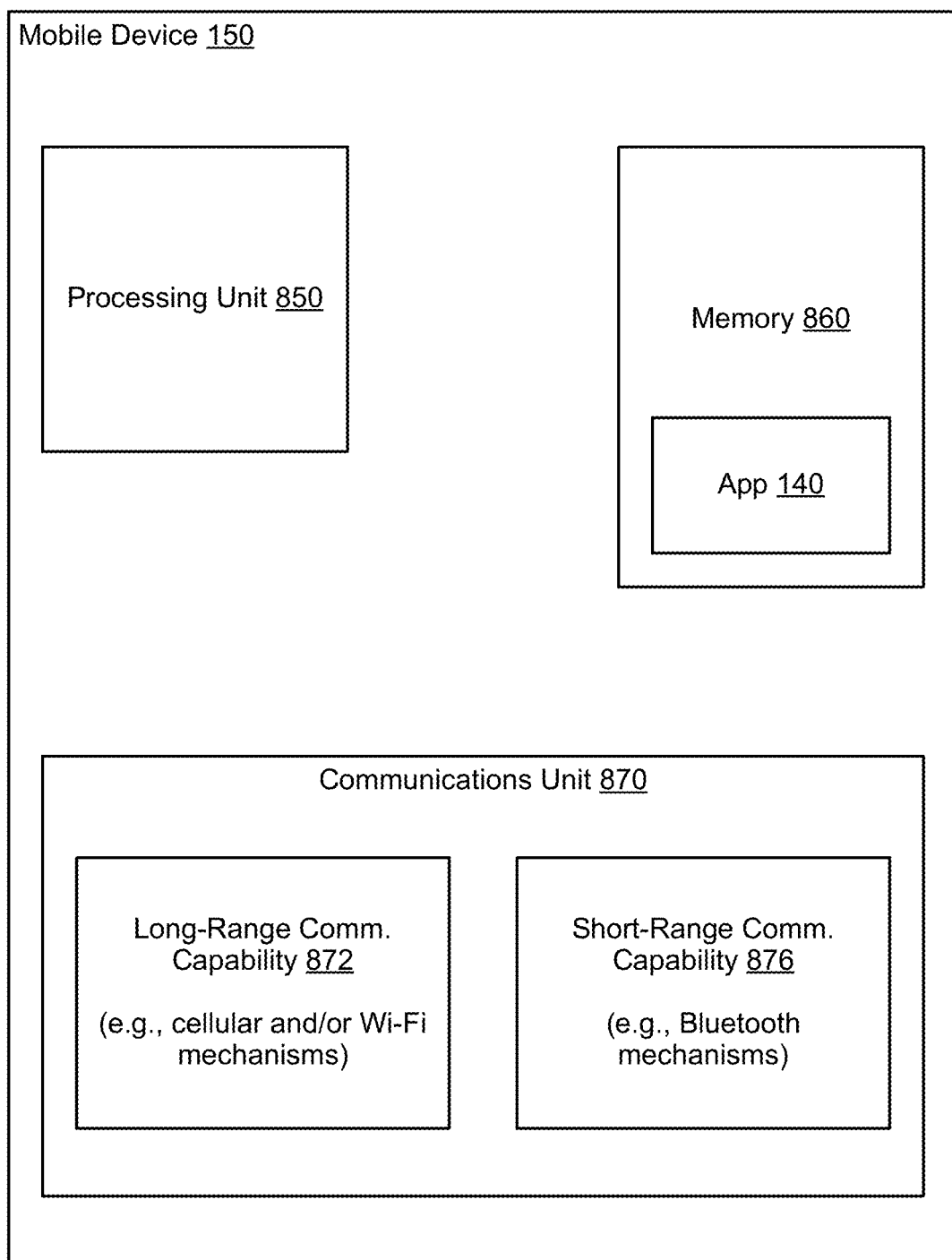
FIG. 21 is a block diagram of a mobile device in accordance with some implementations.

Mobile Device 150 and Application 140 (also referred to as a "mobile application," "mobile app," or "app"): In general, a mobile device 150 may be a user's personal mobile device 150. The mobile device 150 (with a mobile application 140 thereon) acts as a communication bridge between the adapter module 100 (associated with a payment accepting unit 120) and the server 130. The mobile device 150 and the application 140, however, are not "trusted" in that the communications (transmissions) it passes are encrypted. Encrypted (secured) communications are undecipherable (unencryptable, unreadable, and/or unusable) by the mobile device 150. This keeps the communications passed between the adapter module 100 and the server 130 secured and safe from hacking. Mobile devices include, but are not limited to smart phones, tablet or laptop computers, or personal digital assistants (PDAs), smart cards, or other technology (e.g., a hardware-software combination) known or yet to be discovered that has structure and/or capabilities similar to the mobile devices described herein. The mobile device 150 preferably has an application (e.g., the application 140) running on it. The term "app" is used broadly to include any software program(s) capable of implementing the features described herein. FIGS. 10A-10D show user interfaces for the application 140 displayed by the mobile device 150. It should be noted that the phrase "mobile device" can be assumed to include the relevant app unless specifically stated otherwise. Similarly, it should be noted that an "app" can be assumed to be running on an associated mobile device unless specifically stated otherwise. FIG. 21 shows components associated with the mobile device 150. The shown example may be divided into multiple distinct components that are associated with each other or the example may be incorporated into or drawn from other technology (e.g., the cell phone itself) as long as the components are associated with each other.

Payment Accepting Unit 120 (or Machine 120): A payment accepting unit 120 (or the machine 120) is equipment that requires payment for the dispensing of an product and/or service. Payment accepting units 120 may be vending machines, parking meters, toll booths, laundromat washers and dryers, arcade games, kiosks, photo booths, toll booths, transit ticket dispensing machines, and other known or yet to be discovered payment accepting units 120. Some payment accepting units 120 can accept cashless payments (payments other than cash (paper currency and coins)) by accepting payment from, for example, credit cards, debit cards, and mobile devices.

Network Connections: For purposes of this discussion, a persistent network connection is a wired or wireless communications connection that is ongoing (e.g., a dedicated connection, a dedicated online connection, and/or a hard-wired connection) or accessible on demand (e.g., the ability for the machine to make a temporary connection to a server or the ability for the user to contact a server from his mobile device). Typically the persistent network connection has been conducted over "long-range communication technology" or "long-range communication protocol" (e.g., hard-wired, telephone network technology, cellular technology (e.g., GSM, CDMA, or the like), Wi-Fi technology, wide area network (WAN), local area network (LAN), or any wired or wireless communication technology over the Internet that is known or yet to be discovered). Traditionally, machines that accept payment other than cash require a persistent (ongoing or accessible on demand) connection to a network to facilitate payment. This is true for machines that accept, for example, credit cards and debit cards. The payment accepting units 120 described herein do not require a traditional persistent network connection. The user's mobile device 150 acts as a communication bridge between the adapter module 100 and the server 130. Communications between user mobile devices 150 and the servers (e.g., a system management server 130 and/or a funding source server 160) take place using long-range communication technology. Communications between user mobile devices 150 and the adapter module 100 of the payment accepting unit 120 take place using "short-range communication technology" or "short-range communication protocol" (e.g., Bluetooth (such as Bluetooth 4.0, Bluetooth Smart, Bluetooth Low Energy (BLE)), near-field communication (NFC), Ultra Wideband (UWB), radio frequency identification (RFID), infrared wireless, induction wireless, or any wired or wireless technology that could be used to communicate a small distance (approximately a hundred feet or closer) that is known or yet to be discovered). Therefore, neither the adapter module 100 nor the payment accepting unit 120 requires a traditional persistent long-range wireless network connection. The communications technology shown in the figures may be replaced with alternative like communications technology and, therefore, specific shown communications technologies are not meant to be limiting. For example, Wi-Fi technology could be replaced with another long-range communication technology.

Figure 22:
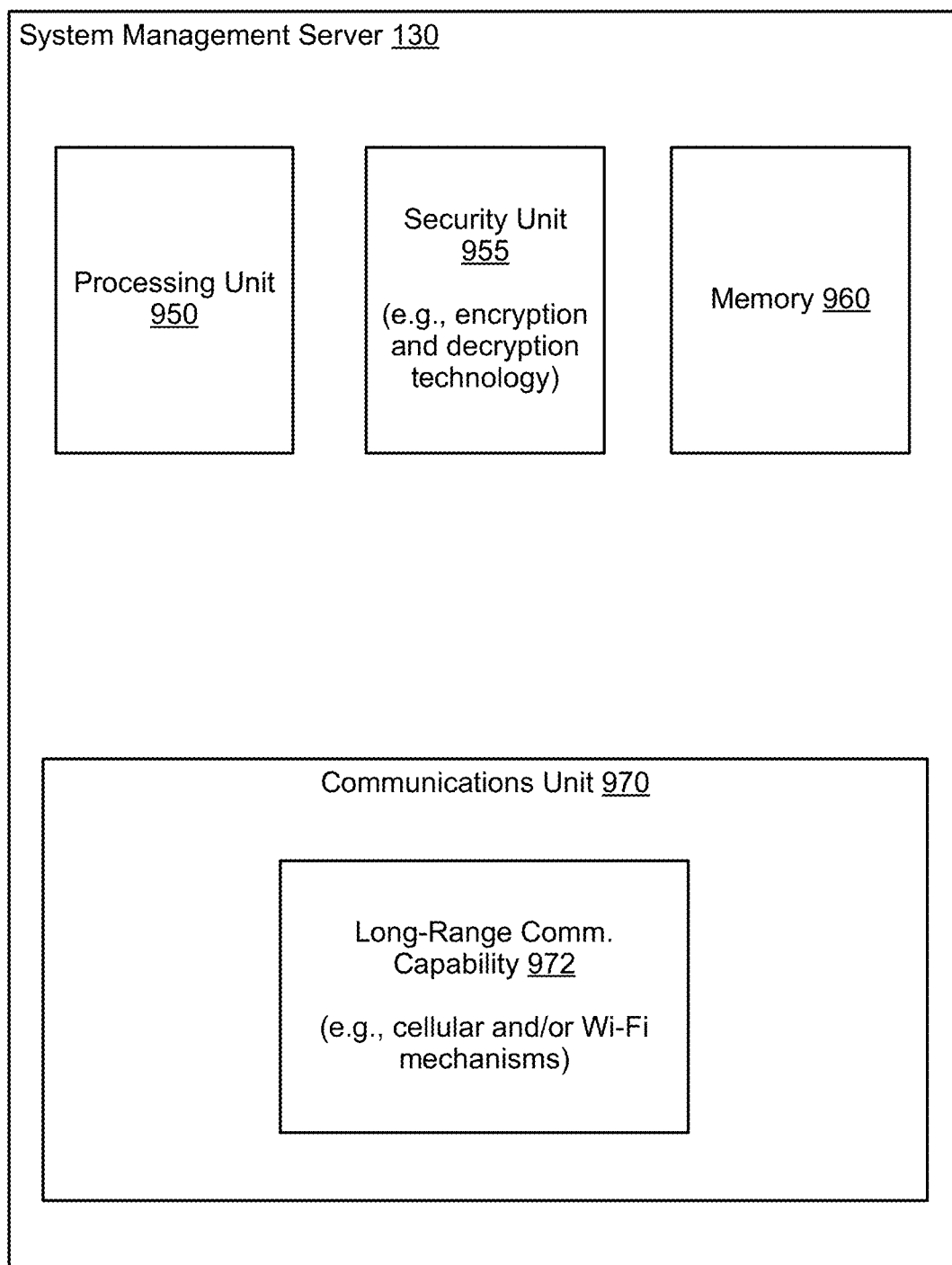
FIG. 22 is a block diagram of a server in accordance with some implementations.

Server: A server is the host processing server that may be operated by the company running the payment processing system. For each user, the server 130 preferably maintains at least one "virtual wallet" having at least one "balance" (which can be $0) of designated funds for which the server 130 keeps an accounting. The balance may represent, for example, "cash" or it may be a "promotional value" that represents funds that may be spent under certain circumstances. If these funds begin to be depleted, the user may be notified (e.g., via the application 140 on the mobile device 150) that additional funds need to be designated and/or transferred. Alternatively, funds from other sources (e.g., the funding source server 160) may be automatically transferred to restore a predetermined balance. The balance may also be increased based on a promotion (e.g., points earned or coupons). As shown in FIG. 22, the server includes appropriate processors 950, memory 960 (which would keep an accounting of the user's balance in a manner similar to a gift card), and communication systems 970. As shown in FIG. 22, the communications unit 970 of the server 130 includes long-range communication capability 972 (e.g., cellular technology and/or Wi-Fi mechanisms). The server 130 also includes a security unit 955 for encrypting and decrypting messages. The server 130 receives an authorization request (sometimes also herein called an "AuthRequest") from the adapter module 100 (via a mobile device 150) and, if funds are available, returns an authorization grant (sometimes also herein called an "AuthGrant" or an "authorization grant token") for funds. FIG. 22 shows components associated with the server 130. The shown example may be divided into multiple distinct components that are associated with each other or the example may be incorporated into or drawn from other technology (e.g., a computer or a main frame) as long as the components are associated with each other.

Advertise Presence: Each adapter module 100 advertises its presence by broadcasting signals (advertising broadcast signals) to mobile devices in the zones 102, 104, 106. Each adapter module 100 can listen to other adapter modules' advertisements.

Received Signal Strength Indicator (RSSI): The adapter module 100 may have a self-calibrating signal strength to determine zone thresholds (e.g., a payment zone threshold and an authentication zone threshold). At the time the user selects an item (product or service) from the payment accepting unit 120, the Received Signal Strength Indicator (RSSI) is logged. At this moment, it is presumed the user is within "arm's-length" (which may be a predetermined length approximating the distance of a user standing in front of a machine for the purpose of making a purchase) from the payment accepting unit 120. A mathematical computation (i.e., In-Range Heuristics) is conducted to derive the optimal RSSI threshold at which point payment should be triggered by an application 140 on a mobile device 150. The threshold may be payment accepting unit specific and can vary over a period of time. This optimal zone threshold is preferably reported to the mobile device 150 during an initial handshake.

In-Range Heuristics: A mathematical computation that determines the RSSI threshold to determine when a user is in the authorization zone 104 and/or the payment zone 102. This computation can take into consideration numerous historical data points as well as transaction specific information such as which the mobile device 150 is being used, payment accepting unit type, among other factors. Preferably the RSSI is logged while the user is making his selection (this is the one time in the entire process that the user definitely will be "in range" (e.g., they will be arm's length from the machine 120 because they are physically interacting with the machine 120). The type of user mobile device 150, accelerometer data (e.g., is the user moving or stationary), and/or other information may also be logged while the user is making his selection. The adapter module 100 can give a reference RSSI for the payment zone 102 for the machine 120, and the application 140 can make a +/−adjustment based on the specific mobile device 150 on which it is installed. Over a period of time, the payment processing system continues to improve itself based on additional data points.

Authorization Request ("AuthRequest:"): When a user enters the authorization zone 104, the mobile device 150 notifies the adapter module 100 and the adapter module 100 sends a secured authorization request (e.g., the encrypted authorization request) as a "message" (also referred to as a communication or transmissions) to the server 130 via the mobile device 150. Encryption may be performed by a security unit 755 (FIG. 20) with security technology (e.g., encryption and decryption means) that may be associated with the processing unit 750 and/or the memory 760. Significantly, the AuthRequest is a request for authorization of funds, not a request for authorization of a transaction. The purpose of the funds is irrelevant to the server 130.

Authorization Grant Token ("AuthGrant"): This is a "message" (also referred to as a communication or transmissions) encrypted by the security unit 955 (FIG. 22) with security technology (e.g., encryption and decryption means) of the server 130 with the unique private key corresponding to the adapter module 100. The secured authorization grant (e.g., the encrypted authorization grant) is passed from the server 130 to the adapter module 100 via the mobile device 150 in the form of a message. The mobile device 150, however, is not able to decrypt and/or read the message. The authorization grant is in response to the authorization request. The amount of the funds granted by the AuthGrant may be determined by factors including, but not limited to, the amount of funds available (or, if funds are not available, a mini-loan could be granted), a pre-authorized amount (e.g., set by the server, set by the user during set-up, set by the funding source, or a standard amount), limited by time (e.g., only a certain amount per hour, or a predetermined amount at specific times of the day), limited to the maximum amount of an item on the machine (or enough for two or three items in the machine), or one or more of these and other factors. Significantly, the AuthGrant makes the funds available, but does not authorize a transaction. The AuthGrant may have an associated expiration period in that it may expire if it is not used in a pre-determined time period. The length of time before the AuthGrant expires may be determined by factors including, but not limited to, the trustworthiness of the user (e.g., the user has a long history with the payment processing system or some known provider (e.g., credit card provider, bank, or credit union), the user has a good credit rating, or the user has a large wallet balance), a pre-authorized time period (e.g., set by the server, set by the user during set-up, set by the funding source, or a standard time period), limited by time (e.g., predetermined time periods at specific times of the day such as longer times during breakfast, lunch, and dinner), limited by the machine or the products or services sold in the machine, limited by the number of other users near the machine (e.g., if it is a crowded machine, the AuthGrant may expire faster), or one or more of these and other factors. The AuthGrant remains valid until it expires or some other event occurs to end its validity (e.g., the user cancels it). This means that under normal circumstances the mobile device 150 will hold the AuthGrant authorizing use of funds for a pre-determined time period that will allow the user sufficient time to make a purchase. The authorized amount may be considered to be the "wallet balance" that is held in a virtual "wallet."

Synchronization: Time may be synchronized to the adapter module 100 from the server 130. The server 130 sends time information with encrypted messages and the adapter module 100 uses the time encoded in the messages for synchronization.

The mobile-device-to-machine payment processing system and components thereof may have associated hardware, software, and/or firmware (a variation, subset, or hybrid of hardware and/or software). The term "hardware" includes at least one "processing unit," "processor," "computer," "programmable apparatus," and/or other known or yet to be discovered technology capable of executing instructions or steps (shown as the processing unit 750 in FIG. 20, the processing unit 850 in FIG. 21, and the processing unit 950 in FIG. 22). The term "software" includes at least one "program," "subprogram," "series of instructions," or other known or yet to be discovered hardware instructions or hardware-readable program code. Software may be loaded onto hardware (or firmware) to produce a "machine," such that the software executes on the hardware to create structures for implementing the functions described herein. Further, the software may be loaded onto the hardware (or firmware) so as to direct the mobile-device-to-machine payment processing system (and components thereof) to function in a particular manner described herein or to perform a series of operational steps as described herein. "Hardware" such as the adapter module 100, the mobile device 150, and the payment accepting unit 120 may have software (e.g., programs and apps) loaded thereon. The phrase "loaded onto the hardware" also includes being loaded into memory (shown as the memory 760 in FIG. 20, the memory 860 in FIG. 21, and the memory 960 in FIG. 22) associated with or accessible by the hardware. The term "memory" is defined to include any type of hardware (or other technology)-readable media (also referred to as computer-readable storage medium) including, but not limited to, attached storage media (e.g., hard disk drives, network disk drives, servers), internal storage media (e.g., RAM, ROM, EPROM, FLASH-EPROM, or any other memory chip or cartridge), removable storage media (e.g., CDs, DVDs, flash drives, memory cards, floppy disks, flexible disks), firmware, and/or other known or yet to be discovered storage media. Depending on its purpose, the memory may be transitory and/or non-transitory. Appropriate "messages," "communications," "signals," and/or "transmissions" (that includes various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the payment processing system (e.g., the adapter module 100, the mobile device 150, the payment accepting unit 120, hardware systems and subsystems, and memory) would be used as appropriate to facilitate controls and communications.

It should be noted that the terms "programs" and "subprograms" are defined as a series of instructions that may be implemented as software (i.e. computer program instructions or computer-readable program code) that may be loaded onto a computer to produce a "machine," such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. Separate, albeit interacting, programs and subprograms may be associated with the adapter modules 100, the server 130, and the mobile device 150 (including the mobile application 140) and these programs and subprograms may be divided into smaller subprograms to perform specific functions.

The terms "messages," "communications," "signals," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "communications," "signals," and/or "transmissions" including, for example, transmitters, receivers, and transceivers. "Communications," "signals," and/or "transmissions" described herein would use appropriate technology for their intended purpose. For example, hard-wired communications (e.g., wired serial communications) would use technology appropriate for hard-wired communications, short-range communications (e.g., Bluetooth) would use technology appropriate for close communications, and long-range communications (e.g., GSM, CDMA, Wi-Fi, or the like) would use technology appropriate for remote communications over a distance. Appropriate security (e.g., SSL or TLS) for each type of communication is included herein. The security units 755 and 955 include technology for securing messages. The security technology may be, for example, encryption/decryption technology (e.g., software or hardware). Although encryption/decryption is discussed primarily as being performed using a unique private key, alternative strategies include, but are not limited to encryption/decryption performed using public/private keys (i.e., asymmetric cryptography), or other encryption/decryption strategies known or yet to be discovered. Appropriate input mechanisms and/or output mechanisms, even if not specifically described, are considered to be part of the technology described herein. The communications unit 770 (shown in FIG. 20) of the adapter module 100 is shown as including appropriate input and output mechanisms 772, 774 that may be implemented in association (e.g., directly or indirectly in functional communication) with male and female adapters 720, 730 of the adapter module 100. The communications unit 870 (shown in FIG. 21) of the mobile device 150 includes mechanisms for both long-range communications (shown as the long-range communication capability 872 such as cellular and/or Wi-Fi mechanisms) for communicating with the server 130 and short-range communications (shown as the short-range communication capability 876 such as Bluetooth mechanisms) for communicating with the adapter module 100.

When used in relation to "communications," "signals," and/or "transmissions," the terms "provide" and "providing" (and variations thereof) are meant to include standard means of provision including "transmit" and "transmitting," but can also be used for non-traditional provisions as long as the "communications," "signals," and/or "transmissions" are "received" (that can also mean obtained). The terms "transmit" and "transmitting" (and variations thereof) are meant to include standard means of transmission, but can also be used for non-traditional transmissions as long as the "communications," "signals," and/or "transmissions" are "sent." The terms "receive" and "receiving" (and variations thereof) are meant to include standard means of reception, but can also be used for non-traditional methods of obtaining as long as the "communications," "signals," and/or "transmissions" are "obtained."

Figure 19:
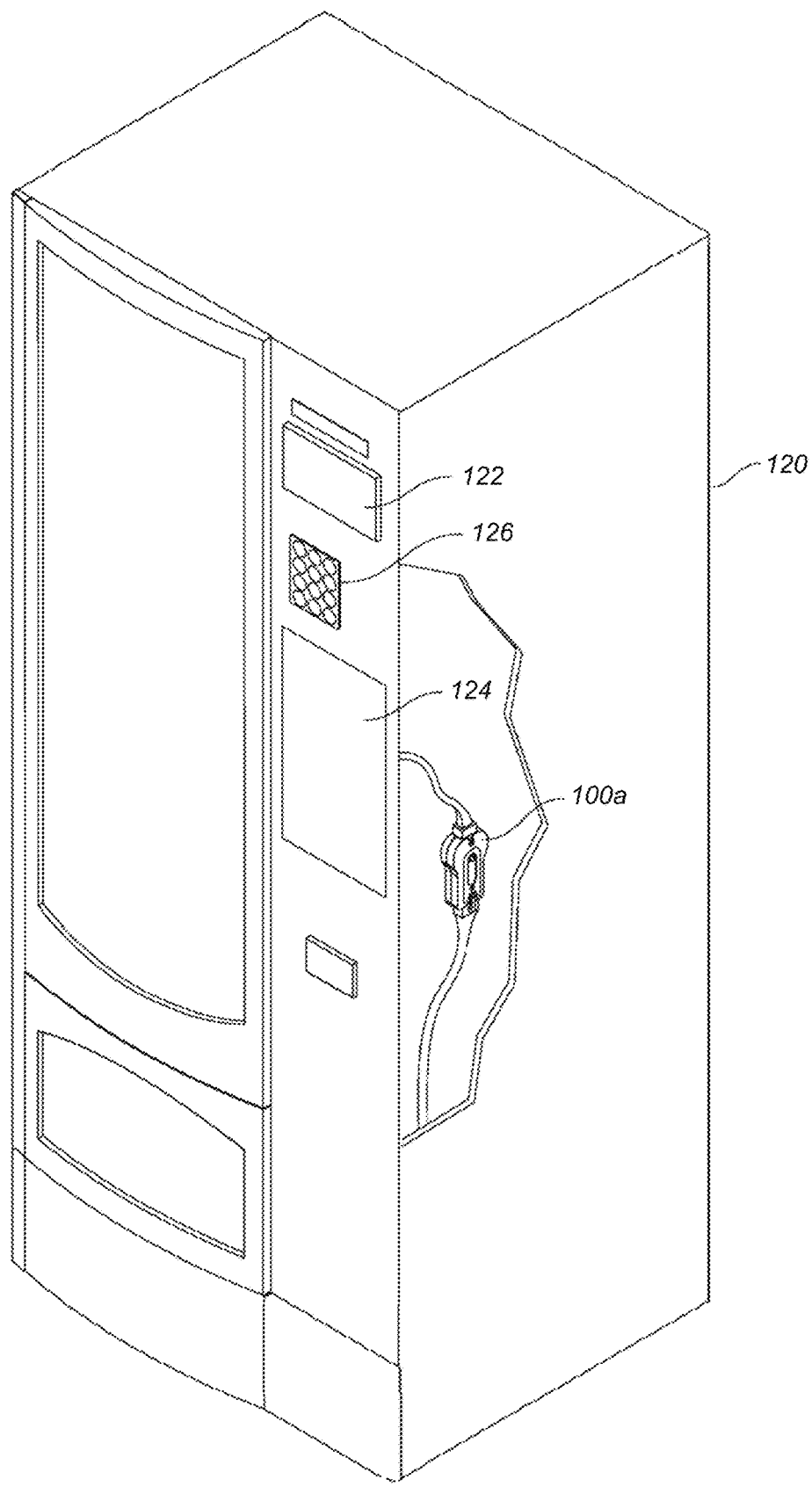
FIG. 19 is a perspective view of the in-line dongle adapter module of FIG. 11 within a vending machine in accordance with some implementations.

The term "associated" is defined to mean integral or original, retrofitted, attached, connected (including functionally connected), positioned near, and/or accessible by. For example, if the user interface (e.g., a traditional display 122 (FIG. 19), a touch screen display 124 (FIG. 19), a key pad 126 (FIG. 19), buttons 126 (FIG. 19, shown as part of the key pad 126), a keyboard (not shown), and/or other input or output mechanism) is associated with a payment accepting unit 120, the user interface may be original to the payment accepting unit 120, retrofitted into the payment accepting unit 120, attached to the payment accepting unit 120, and/or a nearby the payment accepting unit 120. Similarly, adapter modules 100 may be associated with payment accepting units 120 in that the adapter modules 100 may be original to the payment accepting unit 120, retrofitted into the payment accepting unit 120, attached to the payment accepting unit 120, and/or a nearby the payment accepting unit 120.

System Overview

Figure 5:
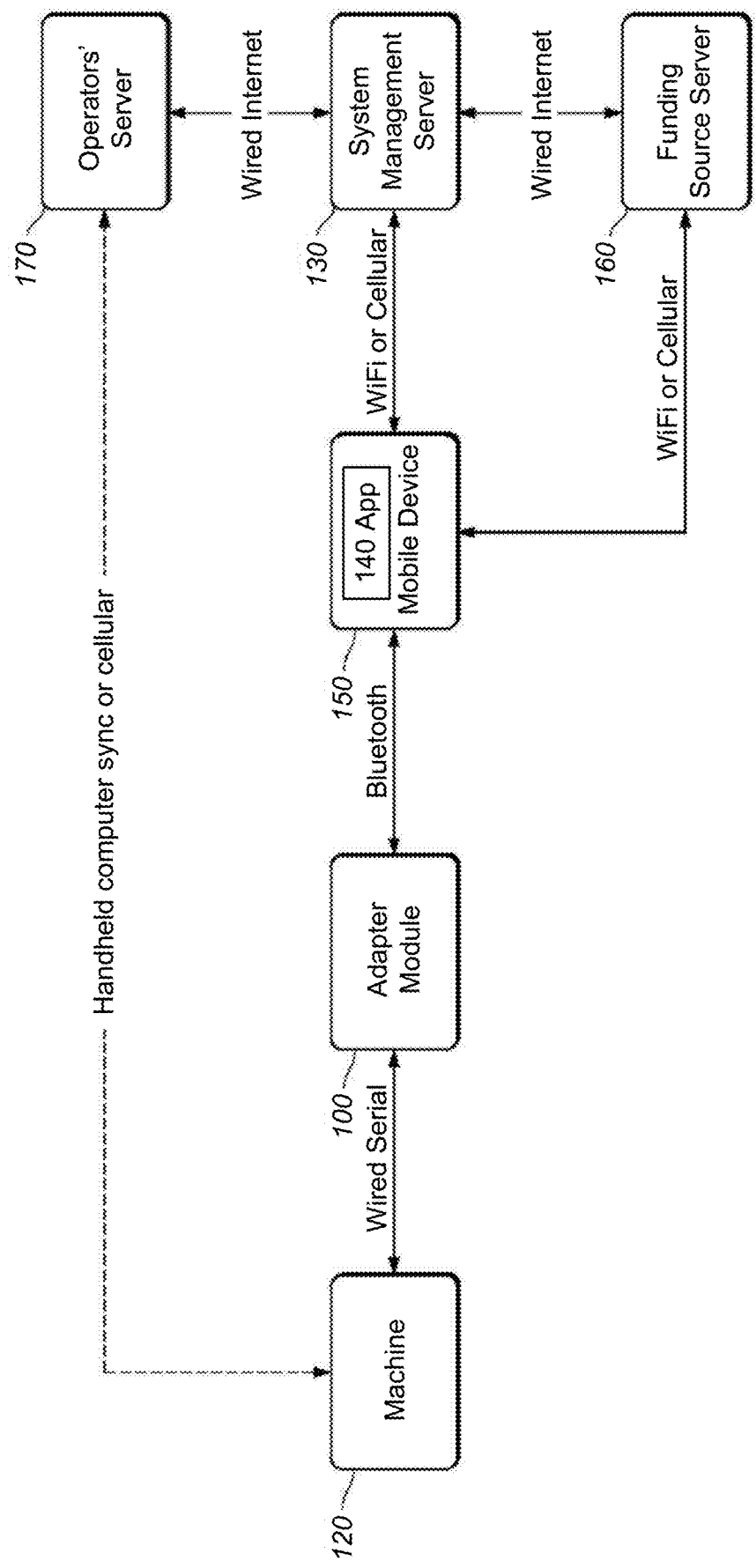
FIG. 5 is a block schematic that shows elements of the payment processing system including, but not limited to, the adapter module, the machine, the mobile device, and servers, as well as communications therebetween in accordance with some implementations.
Figure 6:
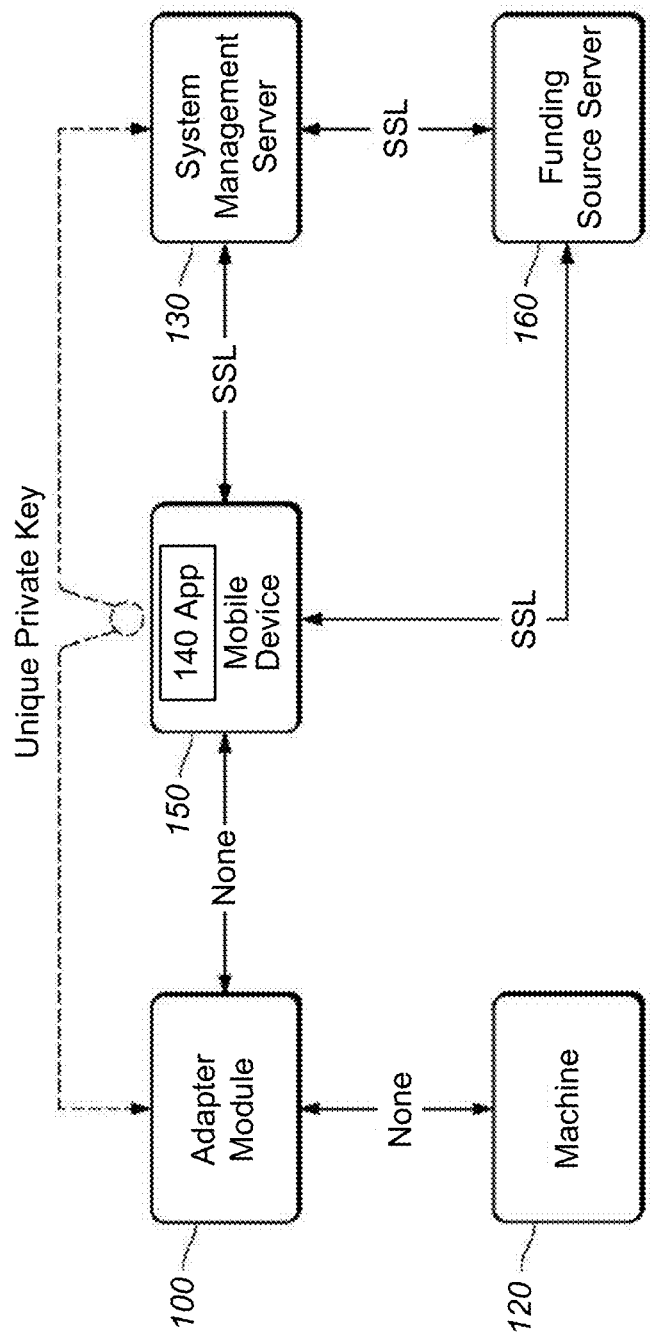
FIG. 6 is a block schematic that shows three areas of encryption used (each is bi-directional) between the adapter module, the machine, the mobile device, and/or servers in accordance with some implementations.
Figure 7:
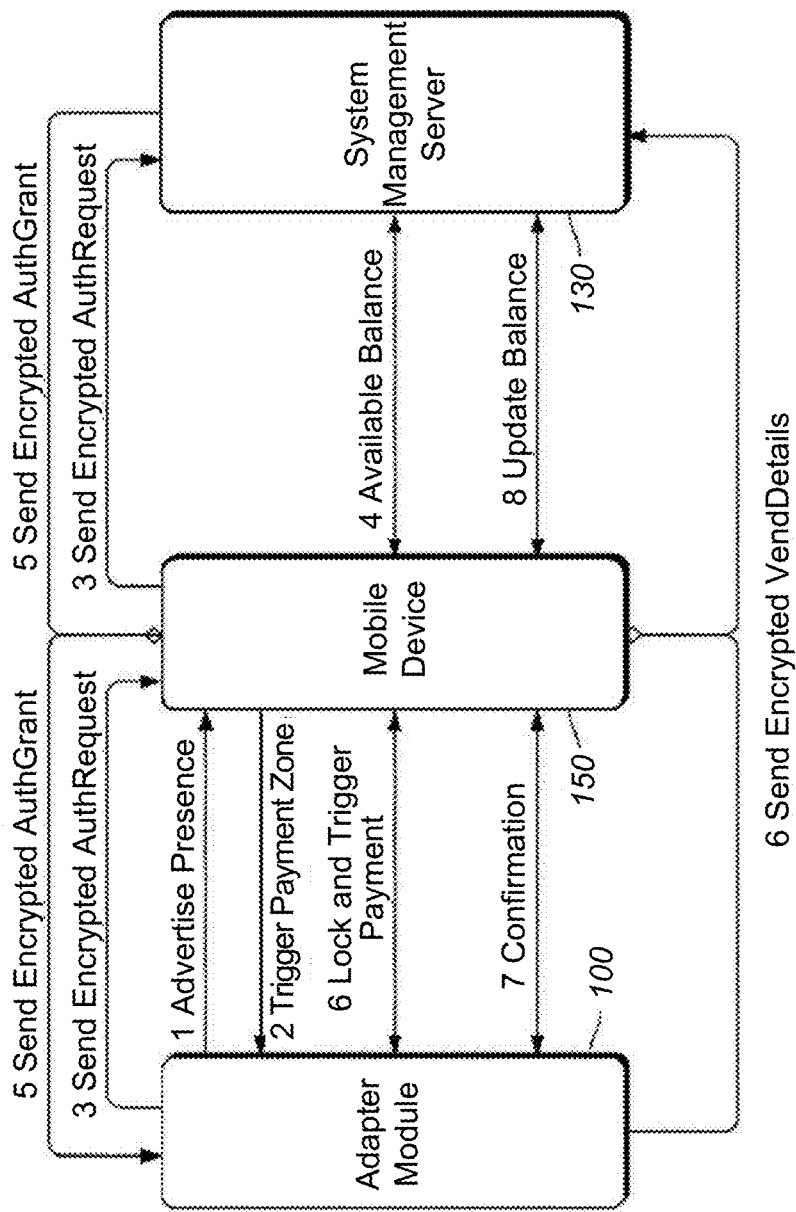
FIG. 7 is a block diagram that shows communications, messaging, vending sequence, and purchase flow between the adapter module, the mobile device, and a system management server in accordance with some implementations.

FIGS. 5, 6, and 7 together show major components of the mobile-device-to-machine payment system and the interactions there-between.

As shown, the adapter module 100 functionally connected bi-directionally to the payment accepting unit 120 via a wired serial connection such that no security is necessary. The adapter module 100 is also functionally connected bi-directionally to the mobile device 150 (and its installed mobile application 140) via short-range communication technology (e.g., a Bluetooth connection). Because the mobile device 150 is not a "trusted" link (e.g., it could be hacked by a user), only secured communications (transmissions) are passed between the adapter module 100 and the mobile device 150. This keeps communications secured and safe from hacking. The mobile device 150 (and its installed mobile application 140) is also functionally connected bi-directionally to a system management server 130 and/or a funding source server 160 via long-range communication technology (e.g., Wi-Fi or Cellular connection) that preferably has appropriate security (e.g., SSL security). Security between the mobile device 150 and the system management server 130 has the advantage of protecting communications from the mobile device 150 to the system management server 130 that may include sensitive data and may not be encrypted. The system management server 130 and the funding source server 160 may be connected via a wired Internet connection with SSL security. The system management server 130 may be connected via a wired Internet connection with SSL security to an operators' server 170. Although not necessary to implement a purchase transaction, for other purposes (e.g., inventory), the operators' server 170 may be connected to the payment accepting unit 120 using a handheld computer sync or a cellular connection.

Also, a unique private key may be used to securely transmit encrypted messages between the adapter module 100 and the system management server 130 (although the encrypted transmissions would most likely be routed through the mobile device 150). The server 130 stores a private key for each adapter module 100, and this key is only known to the adapter module 100 and the server 130. No intermediary is privy to this key (especially not the mobile device 150). When the adapter module 100 and the server 130 communicate messages (e.g., AuthRequest and AuthGrant), the security unit 755 of the adapter module 100 encrypts the message with its private key and passes the message to the mobile device 150. The mobile device 150 (which preferably cannot decrypt the message) passes the encrypted message to the server 130. The server 130 is able to decrypt the message using the security unit 955 of the adapter module 100 and the unique private key. The security unit 955 of the server 130 uses this same unique private key to encrypt messages to the adapter module 100 and sends the message to the mobile device 150 to relay to the adapter module 100 that is able to decrypt the message using the security unit 755 of the adapter module 100 and the unique private key.

FIG. 7 shows specific communications and messaging with a vending sequence (the numbers to the left of the communications and messaging) between the adapter module 100, the mobile device 150, and the system management server 130. These communications are discussed in more detail in the discussion pertaining to the schematic flow diagrams (FIGS. 8A-8G) and the flow charts (FIGS. 9A-9E).

It should be noted that FIGS. 5, 6, and 7 are examples, and are meant to help in the understanding of the mobile-device-to-machine payment system. For example, the shown long-range communications technology may be replaced with alternative long-range communications technology known or yet to be discovered, the shown short-range communication technology may be replaced with alternative short-range communication technology known or yet to be discovered, and the shown security may be replaced with alternative security known or yet to be discovered. The shown connections are meant to be examples, and there may be intermediaries that are not shown. The shown components have been simplified in that, for example, only one mobile device 150 (or machine 120, adapter module 100, or server 130) is shown where many may be included. Finally, the order of the steps may be changed and some steps may be eliminated.

Adapter Module

FIGS. 11-18 show views of adapter module 100a (referred to generally as adapter module 100). Adapter module 100 is a relatively low cost hardware component that is pre-configured to work with the industry standard multi-drop bus (MDB). On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Figure 18:
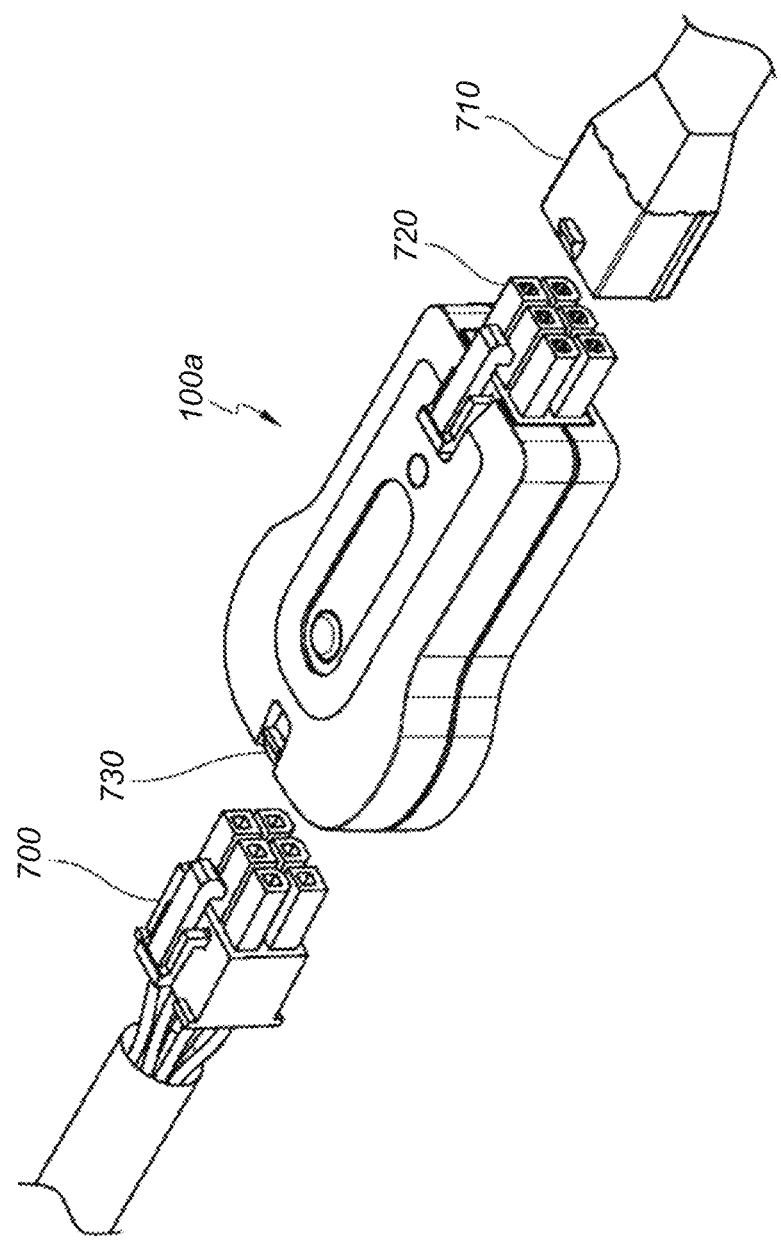
FIG. 18 is a perspective view taken from the second end of the in-line dongle adapter module of FIG. 11, the connectors and cables between which the in-line dongle adapter module is inserted being shown in broken lines for illustrative purposes in accordance with some implementations.

The shown adapter modules 100 are preferably designed to be used as an in-line dongle for in-line insertion within, for example, a MDB of a machine 120. The wire used in MDB technology uses male and female connection ends or adapters to allow the attachment of peripherals. In the case of a vending machine, the wire with the connection ends or adapters would be present to allow the attachment of a payment receiving mechanism (e.g., a coin mechanism). The MDB male and female adapters 700, 710 may be separated (as shown in FIGS. 17-18). The adapter module 100a in FIGS. 11 and 17-18 has a male adapter 720 and a female adapter 730. The adapter module 100a may be plugged (inserted) in serial ("in-line") with the wire. For example, the MDB female adapter 710 may be connected to the male adapter 720 of the adapter module 100 and the MDB male adapter 700 may be connected to the female adapter 730 of the adapter module 100. The resulting in-line configuration is shown in FIG. 19. It should be noted that the adapter modules 100 are designed to allow pass-through communications so that if the mobile-device-to-machine payment processing system is not enabled (e.g., for a particular purchase or simply turned off) the MDB functions as though the adapter module 100 is not there and the machine 120 can function normally.

Hands-Free Mode

Summarily, if it is available, a hands-free mode, from the user's perspective, would allow the user to approach a favorite payment accepting unit 120 and notice that the display (e.g., the displays 122 or 124 shown in FIG. 19) associated with the payment accepting unit 120 shows funds available (e.g., the wallet balance), he would select the product or service using input mechanisms (e.g., buttons 126 or a touch screen display 124 shown in FIG. 19) associated with the payment accepting unit 120, and he would retrieve his dispensed services or products.

During an initial handshake with the mobile device 150 (when the user is within range), the adapter module 100 reports to the mobile device 150 whether or not hands-free mode is available. If it is available, the installed mobile application 140 automatically connects to the payment accepting unit 120 without the user having to interact with the mobile device 150. The user observes that funds are available on the display 122, 124 of the payment accepting unit 120 and completes the purchase transaction as if cash was inserted in the machine 120 by inputting his selection on the payment accepting unit 120. The payment accepting unit 120 dispenses the product or service. After the selection is made, the change is returned to the mobile device 150.

Whether hands-free payment is available is determined by factors including, but not limited to whether if other mobile devices 150 are in range, if other adapter modules 100 are in range, if there are any alerts, if the payment trigger threshold is having wide variances and so deemed unstable, or if the payment accepting unit operator (e.g., a vending machine operator) has opted to disable hands-free mode for the payment accepting unit 120. In the latter instance, operators can disable via a maintenance mobile device 150, as well as through the operators' server 170 and/or the system management server 130.

FIG. 3 is a table that shows considerations, conditions, or factors that may be used to determine whether the hands-free pay feature is available. Starting at the "Favorite?" column, this indicates whether the payment accepting unit 120 is a favorite machine. Preferably the hands-free pay feature is only available for use with "favorite" payment accepting units 120 (e.g., a vending machine at work or school). The "Alert" column has to do with whether there is some reason (e.g., there are too many users in range) that the hands-free pay feature should not work and, if there is such a reason, the user will be notified (alerted) and may be able to use the manual mode to resolve the alert and/or complete the transaction. FIG. 3 shows situations in which a user is or is not able to make hands-free purchases from a machine 120 using a mobile application 140 on his mobile device 150. It should be noted that the shown interface is an example. For example, some of the features could be automated or pre-selected. (It should be noted that the left hand column, the "Tab" column, relates to whether the selected tab on the mobile application 140 is "all" or "favorite." FIGS. 10A-10D all show these tabs. Unlike the other columns in FIG. 3, this column has more to do with the functionality and view of the application 140 than specifically with the hands-free feature. The tabs would allow a user to select whether he wanted to be alerted when he was in range of all payment accepting units 120 or just "favorite" payment accepting units 120 and the application 140 would show the appropriate view.)

Balance Display: An optional feature of the mobile-device-to-machine payment system that is particularly helpful in the hands-free mode (although it may be available in the manual mode and/or in a multiple-vend scenarios) is when the user's mobile device 150 sends "credit" to the payment accepting unit 120 (either via hands-free payment or through a manual swipe), the wallet balance is sent to the payment accepting unit 120 that is then displayed to the user on a display 122, 124 of the machine 120. This is particularly beneficial during hands-free mode when the user does not retrieve the mobile device 150 and, therefore, may not know the balance. Also, in a multiple-vend scenario the user would not have to calculate a remaining balance.

An example of a hands-free, multiple-vend scenario where a balance is displayed by the payment accepting unit 120, follows: The user has $5.00 in his/her virtual wallet as that is the amount that has been authorized (the AuthGrant being stored on the mobile device 150). The user walks up to the payment accepting unit 120 and $5.00 is displayed on the display 122, 124 of the payment accepting unit 120 since hands-free mode was enabled and credit was sent (e.g., via the short-range communication capability) to the payment accepting unit 120. The user makes a selection of $1.50 by interacting (e.g., pressing buttons) with the machine 120. The item (product or service) is dispensed and the "change" is "returned" (e.g., via the short-range communication capability) to the virtual wallet. But since the user is still standing in the payment zone 102, the remaining wallet balance of $3.50 is sent to the payment accepting unit 120 and displayed so that the user can now see that he/she has a $3.50 balance. (It should be noted that the authorized funds may remain on the machine 120 and not be transferred back to the mobile device 150 between transactions.) The user decides to purchase a $1.50 item, and the transaction is completed as usual (e.g., by interacting with the machine 120). Now the user is still standing in the payment zone 102 and he/she sees the wallet balance of $2.00 on the display 122, 124 of the payment accepting unit 120. The user decides that he/she does not wish to purchase anything else and simply walks away. As he/she walks out of the payment zone 102, the credit is cleared from the machine 120, but he/she is left with the knowledge that his wallet balance is $2.00 even though he/she never touched the mobile device 150. Communications between the payment accepting unit 120 and the adapter module 100 (via the mobile device 150) handle the accounting incidental to the transaction. The remaining balance ($2.00) is technically stored on the server 130, and may be reflected on the application 140 on the mobile device 150.

Multiple Distinct Zones

As shown in FIGS. 1-2, the functions performed by the adapter module 100 can be divided into distinct zones: a first "communication zone" (e.g., "Bluetooth range" 106), a second "authorization zone" 104, and a third "payment zone" 102. The payment zone 102 is smaller than or equal to (overlapping completely) the authorization zone 104. Put another way, the payment zone 102 is within or coextensive with the authorization zone 104. The payment zone 102 is a subset of the authorization zone 104 with a ratio of the payment zone 102 to the authorization zone 104 ranging from 0.01:1 to 1:1. It is not necessarily a fixed ratio and can vary between different payment accepting units 120, different mobile devices 150, different users, and over time. While the zones 102, 104, 106 are depicted as having a uniform shape, the zones may not necessarily be uniform (or constant over time) in that the shape can vary. For example, the shape of the Bluetooth range 106 may vary depending on environmental conditions such as obstacles in the room and payment accepting unit 120 door/wall materials.

Bluetooth Range 106 (sometimes also herein called the "communication zone"): The outermost range is the Bluetooth range 106 (shown in FIGS. 1-2). This is the area in which the adapter module 100 is able to broadcast its presence. In most situations, the Bluetooth range 106 is a passive range in that no actual data is exchanged between the mobile device 150 and the adapter module 100. While in the Bluetooth range 106, the mobile device 150 monitors the RSSI (Received Signal Strength Indicator).

Authorization Zone 104: The middle region is the authorization zone 104 (shown in FIGS. 1-2). This is a computed area based on the RSSI. As mentioned, the mobile device 150 monitors the RSSI while it is in the Bluetooth range 106. When the RSSI reaches a certain predetermined threshold based on In-Range Heuristics, the mobile device 150 can be considered to be in the authorization zone 104. In the authorization zone 104 the mobile device 150 establishes a connection to the adapter module 100 (e.g., a Bluetooth connection (FIG. 5) with SSL protection (FIG. 6)) and informs the adapter module 100 of its presence. After a successful handshake with the adapter module 100, the mobile device 150 registers the adapter module 100 and the adapter module 100 requests an authorization to the server 130 via the mobile devices' network connection (e.g., a Wi-Fi or cellular connection (FIG. 5) with SSL protection (FIG. 6)). It is important to note the mobile device 150 and the adapter module 100 have a non-exclusive relationship at this point. The adapter module 100 may collect registrations for all mobile devices 150 that are within the authorization zone 104.

An authorization occurs in preparation for when the user enters the payment zone 102 (shown in FIGS. 1-2). An authorization expires in a set period of time (for example, five minutes), so if the mobile device 150 is still in the authorization zone 104 at the time of expiration, the adapter module 100 submits for and receives another authorization. This will continue for a set number of times (for example, the limit may be three times to limit cases of numerous authorizations for a mobile device that may remain in the authorization zone 104 for an extended period of time without completing a transaction). Should authorization fail (for instance if the limit had been reached) prior to the user entering the payment zone 102, the adapter module 100 will request authorization when the mobile device 150 enters the payment zone 102 (which adds a few seconds to the experience).

Payment Zone 102: As a user enters the payment zone 102, the mobile device 150 establishes exclusive control of the adapter module 100. Once established, any other user in the payment zone 102 is put into a "waiting" status.

In the payment zone 102, the payment can be triggered automatically if the payment processing system has and is in hands-free mode. In such instances, the mobile device 150 is running the application 140 in background mode and will send credit to the payment accepting unit 120 without any explicit user interaction. The user completes the transaction on the payment accepting unit 120 in much the same manner as if cash had been inserted into the payment accepting unit 120 to establish credit. After the user completes the transaction (that may include one or more purchases), details of the transaction are preferably returned to the mobile device 150 and server 130 in separate messages. The message to the server 130 is preferably encrypted with the adapter module's 100 private key (FIG. 6) to ensure data integrity. As shown in FIG. 7, the "private key" coded message (Encrypted VendDetails) is preferably sent via the mobile device 150. The message to the mobile device 150 may be sent solely for the purpose of closing the transaction. The transaction history and balance are updated server-side via the encrypted message sent to the server 130.

The other mode of operation is manual mode. In manual mode, the user launches the mobile device 150 and is able to swipe to send payment to the payment accepting unit 120. The user can also swipe back to cancel the payment. Like in hands-free mode, the purchase transaction is completed on the payment accepting unit 120 in the same manner as if cash were inserted into the payment accepting unit 120. The mobile device 150 is only used to send payment. Selection is made directly on the payment accepting unit 120.

Self-Calibrating Zone Threshold: A key, but optional feature, of the payment processing system is a self-calibrating payment zone RSSI threshold. Because RSSI can vary machine to machine, environment to environment, and device to device, having a fixed threshold at which payment is triggered can be problematic. The approach suggested herein is the creation of a self-calibrating threshold. When the user is interacting with the payment accepting unit 120 (such as when he makes his selection on the payment accepting unit 120), the payment accepting unit 120 notifies the adapter module 100 and the adapter module 100 logs the conditions such as RSSI, type of user mobile device 150, accelerometer data, and other information. It is at this point that it can be ascertained safely that the user is within arm's-length from the payment accepting unit 120 (by necessity the user is arm's-length because he is making some physical interaction with the payment accepting unit 120). This is the only point in the entire transaction in which it can be certain that the user is within arm's-length from the payment accepting unit 120.

FIG. 4 shows a simplified set of steps involved when users enter the payment zone 102. Specifically, FIG. 4 shows that credit is established 200 (this may have been done in the authorization zone 104, but if not it would be handled in the payment zone 102), that the user makes a selection using the machine 202, that the machine notifies the adapter module of the selection 204, that the adapter module (optionally) logs the RSSI 206, and that the purchase process(es) continues 208. Using the historically logged RSSI data, the adapter module 100 calculates one of several "average" RSSI using various mathematical models. This "average" could be a traditional average, a moving average, a weighted average, a median, or other similar summary function. The adapter module 100 could pre-process the historical data before running the function, such as to eliminate top and bottom data points, suspect data points, etc.

Optionally, during the handshake between the mobile device 150 and the adapter module 100, the information transmitted to the adapter module 100 may include, for example, the model of the mobile device 150. Using the received information pertaining to the mobile device models, the adapter module 100 can create multiple payment thresholds, one for each mobile device model. This allows for variances that may be inherent in different types of Bluetooth radios. An alternative to this method is for the adapter module 100 to broadcast a baseline payment zone threshold, and the mobile device 150 can use an offset from this baseline based on its specific model type. The payment zone thresholds (or baseline offsets) can be unique to specific types of mobile devices (e.g., by manufacturer, operating system, or component parts), models of mobile devices, or individual mobile devices (unique to each user).

In a typical scenario in which the payment zone threshold has been calibrated, the adapter module 100 advertises its presence along with the threshold at which it considers any mobile device 150 to be in the authorization zone 104. This is a one-way communication from adapter module 100 to mobile device 150. Once the mobile device 150 enters the authorization zone 104, there is a handshake that is established between the adapter module 100 and the mobile device 150. During this handshake, the mobile device 150 can share its model information with the adapter module 100, and the adapter module 100 can return the payment zone 102 threshold for that specific model.

Optionally, in addition to calibrating the payment zone threshold, the adapter module 100 can apply the self-calibrating model to the authorization zone 104 to calibrate the authorization zone threshold. As with the payment zone thresholds, the authorization zone thresholds can be unique to specific types of mobile devices, models of mobile devices, or individual mobile devices. In this scenario, the adapter module 100 would broadcast multiple thresholds by device type and the mobile device 150 would determine which threshold to apply (or alternatively broadcast a baseline and the mobile device 150 uses an offset based on its device model). Even in this scenario, the authorization zone 104 is a one-way communication.

Optionally, along with the threshold that is calculated (in the payment and/or the authorization zone(s)), a safety margin can be added to minimize scenarios in which a user is within range, but the mobile-device-to-machine payment processing system does not recognize it because the threshold may not have been reached. For example, if the calculated RSSI for an iPhone™ 5 on machine 4567 is −68 db, the mobile-device-to-machine payment processing system may add a safety margin of −5 db, and establish the threshold at −73 db. So when a user's phone is communicating with the adapter module 100 at an RSSI of −73 db or better, the mobile-device-to-machine payment processing system will allow the mobile device 150 to credit the payment accepting unit 120. The safety margin can be set on the server 130 and downloaded to the adapter module 100, or set on the mobile device 150, or set on the adapter module 100 itself.

Optionally, in the payment zone threshold, the mobile device 150 can use other data to determine when to cancel the exclusive control of the payment accepting unit 120, to identify when the user is moving out of the payment zone 102. External data could include accelerometer data from the mobile device 150. Using that data, the mobile device 150 can determine whether the user is standing relatively still in front of the payment accepting unit 120, or if the user is in motion—effectively walking away from the payment accepting unit 120.

Signal Unavailability Adaptation

The mobile-device-to-machine payment processing system described herein uses a mobile device's 150 short-range communication technology (e.g., Bluetooth mechanisms) (shown as short-range communication capability 876 in FIG. 21) and a mobile device's 150 long-range communications technology (e.g., cellular and/or Wi-Fi mechanisms) (shown as long-range communication capability 872 in FIG. 21). The short-range communication capability 876 communicates with the adapter module's 100 short-range communication technology (e.g., Bluetooth mechanisms) (shown as short-range communication capability 776 in FIG. 20). The long-range communication capability 872 communicates with the server's 130 long-range communications technology (e.g., cellular and/or Wi-Fi mechanisms) (shown as long-range communication capability 972 in FIG. 22). The mobile device 150 (with a mobile application 140 thereon) acts as a communication bridge between the adapter module 100 (associated with a payment accepting unit 120) and the server 130. This process is described herein and works properly if there is cellular or Wi-Fi coverage within the payment zone 102.

One option if there is no cellular or Wi-Fi coverage within the payment zone 102 is to determine whether there is cellular or Wi-Fi coverage within the authorization zone 104 or the Bluetooth range 106. If there is, then the sizes of the zones 102, 104, 106 could be adapted and the timing could be adapted. For example, if the mobile devices 150 detected problems with the cellular or Wi-Fi coverage within the payment zone 102, the user could carry his mobile device 150 into the other zones (or the mobile device 150 could use short-range communication technology to communicate with other mobile devices 150 within the authorization zone 104 or the Bluetooth range 106) to determine whether the zones have cellular or Wi-Fi coverage. If they do have coverage, communication between the mobile device 150 and the server 130 can be advanced (conducted earlier when the mobile device 150 is further from the machine 120) or delayed (conducted later when the mobile device 150 is further from the machine 120). This can be thought of as changing the size or shapes of the zones 102, 104, 106. The timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again.

Another option if there is no cellular or Wi-Fi coverage within any of the zones 102, 104, 106 is for the user to obtain authorization while outside of the zones in a place with cellular or Wi-Fi coverage. This may occur, for example, if a user knows that he will be going to a place with a payment accepting unit 120 equipped with an adapter module 100 (perhaps to a favorite payment accepting unit 120) that does not have (or rarely has) cellular or Wi-Fi coverage. A user may also use the mobile application 140 to query payment accepting units 120 in a given range (e.g., within 50 miles) or at a given location (e.g., at a campground or in a particular remote city) to determine whether there is cellular or Wi-Fi coverage within the zones 102, 104, 106. The user can then obtain pre-authorization from the server 130 using the mobile application 140. Again, the timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again. A mobile-device-to-machine payment system having the ability to implement this option would be able to accept cashless payments without requiring any network connection near the payment accepting unit 120. In some implementations, the mobile-device-to-machine payment processing systems described herein is located in a remote location where no signal is available, therefore, can accept cashless payments.

As an example of a situation in which there might be no cellular or Wi-Fi coverage within any of the zones 102, 104, 106 of a particular payment accepting unit 120, the user (a teenager) may be traveling to a remote location to attend summer camp where there is no cellular or Wi-Fi coverage. The camp may have several payment accepting units 120 (e.g., a machine that creates a dedicated "hot spot" that requires payment for use, vending machines, or machines for renting equipment such as bikes, kayaks, or basketballs). The camp facility might notify parents that the mobile-device-to-machine payment system is available. The parents, while at home, could obtain authorization for a particular amount (that could be doled out a certain amount per day or limited to type of machine or location) to be authorized and "loaded" into the user's mobile device 150 and specify that the authorization will not expire for a certain period or until a certain date. Thereafter, while at camp, the user could use the mobile application 140 on his mobile device 150 in a manner similar to those discussed elsewhere herein. Short-range communications may be used for communications between the adapter modules 100 (associated with the machines 120) and users' mobile devices 150.

One subtle but powerful component of the payment processing system described herein is that it requires a long-range communication capability (e.g., an Internet or cellular network connection) only in the authorization zone 104 and only for the time period required to send the AuthRequest and receive the AuthGrant. Once a valid AuthGrant is received by the mobile device 150, the long-range communication capability (e.g., an Internet or cellular network connection) is not required by either the mobile device 150 or the adapter module 100 in the payment zone 102 as long as the AuthGrant is valid (unexpired). This mechanism allows the system to seamlessly handle authenticated transactions in (temporary) offline mode, with the deferred acknowledgement and transaction messages performing the bookkeeping and cleanup when network connection is regained. The alternatives described above provide a unique way to artificially extend the authorization zone to include any location where the mobile device 150 can communicate with the server 130.

Multiple User Resolution

As shown in FIG. 2, in one practical scenario, multiple users are in the zones 102, 104, 106. As shown in FIG. 2, users 1, 2, and 3 are in the payment zone 102 near the machine 120; users 5 and 6 are shown as positioned between the authorization zone 104 and the Bluetooth range 106; users 4 and 7 are in the Bluetooth range 106, user 10 is positioned on the edge of the Bluetooth range 106; and users 8 and 9 are positioned outside of Bluetooth range 106. In some implementations, the mobile-device-to-machine payment processing system manages and resolves issues pertaining to multiple users.

Users 4 and 7 are within the Bluetooth range 106 and the user 10 is either entering or leaving the Bluetooth range 106. Within the Bluetooth range 106 the users' mobile devices 150 are able to see the adapter module's 100 advertisement. In this zone, the mobile device 150 preferably does not initiate a connection. The adapter module 100 is preferably unaware of the users in the Bluetooth range 106. All the adapter module 100 is doing is advertising its presence to any multitude of users that may be in Bluetooth range 106.

The adapter module 100 begins to log users as the users (and their respective mobile devices 150) enter the authorization zone 104 (shown in FIG. 2 as users 5 and 6). At this point, there is a non-exclusive connection initiated by the mobile device 150 to the adapter module 100. It does a handshake (e.g., to exchange information needed to obtain authorization and, optionally, to log information needed for a self-calibrating authorization zone threshold) and the mobile device 150 contacts the server 130 for an authorization (e.g., sending an AuthRequest and receiving an AuthGrant). The adapter module 100 registers all mobile devices 150 that have requested and received AuthGrants. The adapter module 100 continues communicating with any other mobile device 150 that enters the authorization zone 104. After initial contact, the adapter module 100 may provide the mobile device 150 with a deferral delay of when to check back in with the adapter module 100 allowing opportunity for other mobile devices 150 to communicate with the adapter module 100.

If there is only one user in the payment zone 102, a purchase transaction may be performed. If there are multiple users in the payment zone 102, the mobile-device-to-machine payment system must handle the situation.

One optional solution for handling the situation of the multiple users in the payment zone 102 is queuing users in the payment zone 102. Once any mobile device 150 enters the payment zone 102, it establishes exclusivity to a particular mobile device 150 (e.g., in a first-come-first-serve manner). Technically, however, the adapter module 100 is not establishing an exclusive connection to the mobile device 150. The adapter module 100 can still perform a round-robin poll and communicate with and advertise to other mobile devices 150. Instead, the adapter module 100 establishes a queue prioritized by RSSI and time (e.g., who was first and whether the authorization has expired) and it notifies (e.g., alerts) other mobile devices 150 to wait. The earliest valid (unexpired) authorization takes precedence when there is any tie in the RSSI. Otherwise, for example, the strongest average RSSI takes priority. Preferably the queue is not a static measure of the RSSI but an averaged measure over the period of time in the queue. This compensates for a scenario in which a user may be walking around in the queue and then shows up at the payment accepting unit 120 just as the previous user is finishing. If another user was also in the payment zone 102 and stood there the entire time, but may have newer authorization, he could win out.

Anytime that the adapter module 100 cannot determine exactly which user is in the payment zone 102 in front of the payment accepting unit 120, the adapter module 100 will disable hands-free payment. The mobile device 150 will send an alert to the user and he can use swipe to pay (manual mode). All users in payment zone 102 will show "Connected" and the first to swipe payment to the payment accepting unit 120 then locks out other users.

Multiple Module Resolution

In the scenario where there are multiple modules present, determining which payment accepting unit 120 a user is in front of can be a challenge. In some implementations, the mobile-device-to-machine payment processing system described herein allows adapter modules 100 to communicate to other adapter modules 100 in range via Bluetooth. Each user receives authorization grants for specific payment accepting units 120. This means if there are multiple adapter modules 100 within the same authorization zone 104, there will be multiple authorization grants for the user. When the user enters the payment zone 102, it can be difficult to differentiate which payment accepting unit 120 the user is in front of if the payment zones 102 overlap.

To solve this problem, when the user enters the payment zone 102, the adapter modules 100 communicate with each other to determine the RSSI for the particular user (based on the signal from his mobile device 150) to triangulate which adapter module 100 (and the associated payment accepting unit 120) is closer to the user. Optionally, the inter-module communications can restrict the user to establishing an exclusive connection with only one payment accepting unit 120.

Optionally, when the user connects to a payment accepting unit 120, the mobile device 150 can send a communication to the payment accepting unit 120 for momentary display to the user on the display 122, 124 of the payment accepting unit 120. For example, the mobile device 150 can send a communication (e.g., "connected" or "Fred's Mobile Device Connected") to the payment accepting unit's display 122, 124 for a predetermined period of time (e.g., 1-3 seconds) so when the user is in payment zone 102, it is clear which payment accepting unit 120 the user is connected to prior to making a purchase (either in hands-free or manual mode).

In addition, when the user is in manual mode, the mobile device 150 can display (e.g., on the touch screen 152 as shown in FIGS. 10A-10D) a visual indication of the payment accepting unit 120 (e.g., a picture and/or a payment accepting unit ID of the payment accepting unit 120) for visual confirmation. If the user is in manual mode, the user can manually change the payment accepting unit 120.

Descriptive Scenario

FIG. 7, FIGS. 8A-8G, and 9A-9E (as well as other figures) can be used to understand a detailed scenario of the mobile-device-to-machine payment processing system described herein. A flow of communications and steps are loosely described below with reference to these (and other figures).

It should be noted that alternative scenarios could include, for example, a modified order of the steps performed.

Prior to vending transactions, a user downloads a mobile application 140 onto his mobile device 150, creates an account, and configures a funding source via, for example, a funding source server 160. A funding source may be, for example, a debit card, a credit card, campus cards, rewards points, bank accounts, payment services (e.g., PayPal™) or other payment option or combination of payment options known or yet to be discovered. The funding sources may be traditional and/or nontraditional payment sources that are integrated into the ecosystem described herein and then used indirectly as a source of funds. Funds from the funding source are preferably held on the server 130 such that when an AuthRequest is received by the server 130, the server 130 can send an AuthGrant authorizing funds for a purchase.

The user can specify one or more "favorite" adapter module(s) 100 (that has a one-to-one relationship to the payment accepting unit 120) that he may visit regularly, such as a vending machine at school or work. Favorite adapter modules 100 appear on a pre-filtered list and allow for additional rich features such as hands-free payment.

Figure 8A:
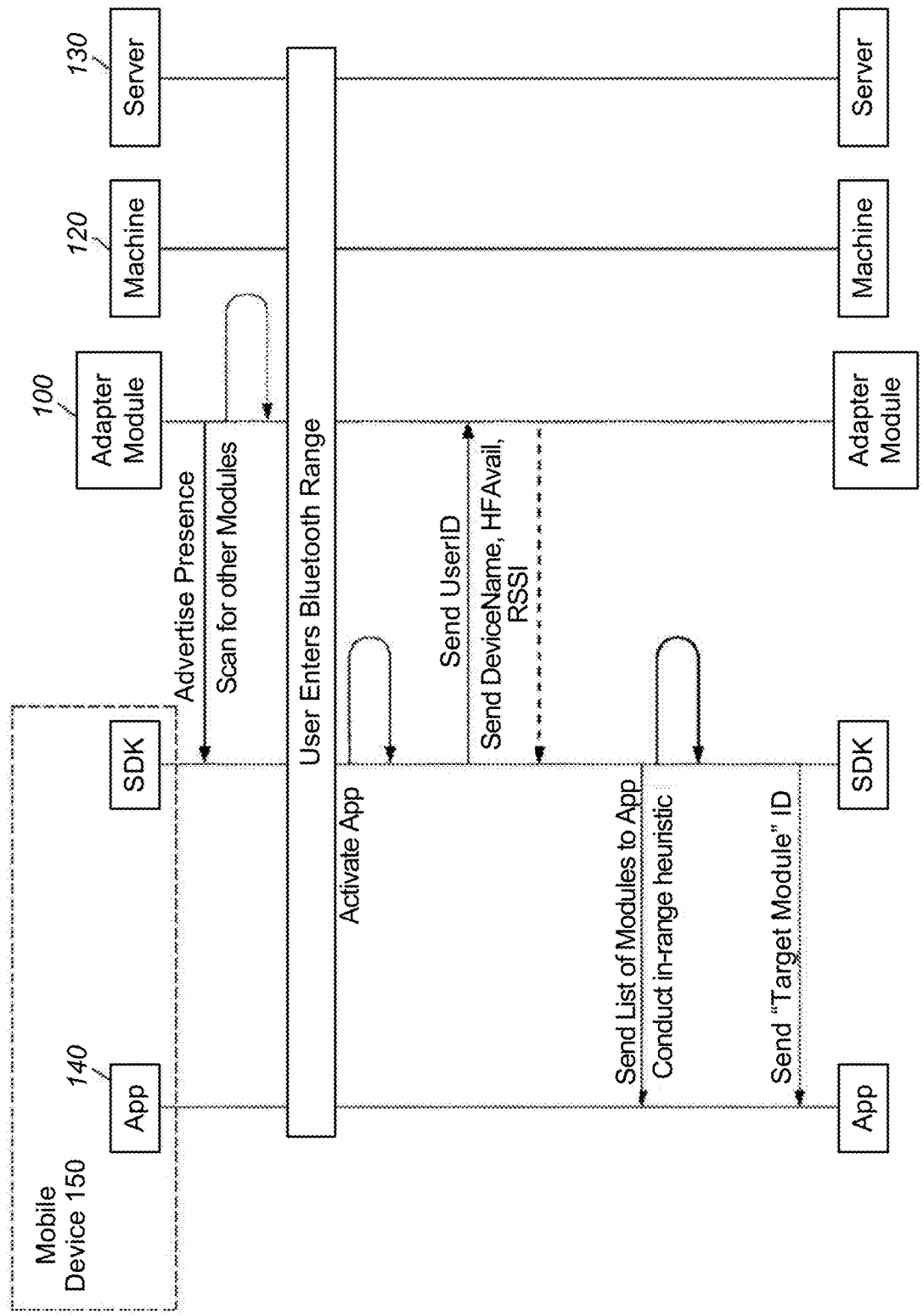
FIG. 8A is a schematic process flow diagram that shows additional elements and features of the payment processing system (e.g., communications, messaging, vending sequence, and purchase flow) when the user enters the "communication zone" (e.g., Bluetooth range) in accordance with some implementations.

The payment accepting unit 120 may be equipped with an adapter module 100 that is constantly advertising its availability via Bluetooth (or other "signals," "communications," and/or "transmissions"). This ongoing advertising and scanning for adapter modules is shown in FIG. 8A. As shown, the mobile device 150 is continuously scanning for any adapter module 100 within Bluetooth (or other "signal," "communication," and/or "transmission") range. When the user is within range of that adapter module 100, the mobile device 150 tracks and monitors the signal strength until a predetermined "authorization zone" threshold is achieved.

Figure 8B:
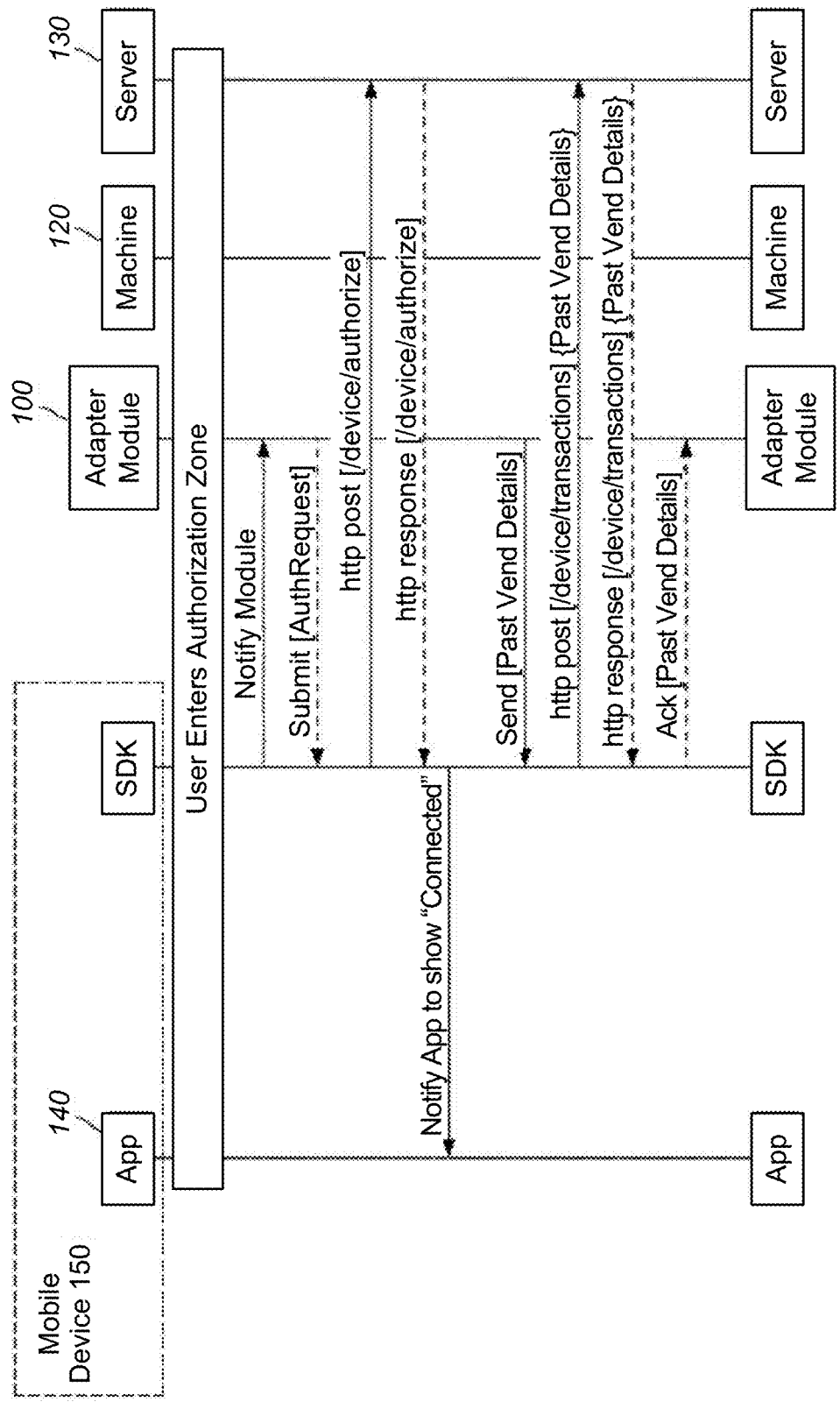
FIG. 8B is a schematic process flow diagram that shows additional elements and features of the payment processing system (e.g., communications, messaging, vending sequence, and purchase flow) when the user enters the "authorization zone" in accordance with some implementations.
Figure 9A:
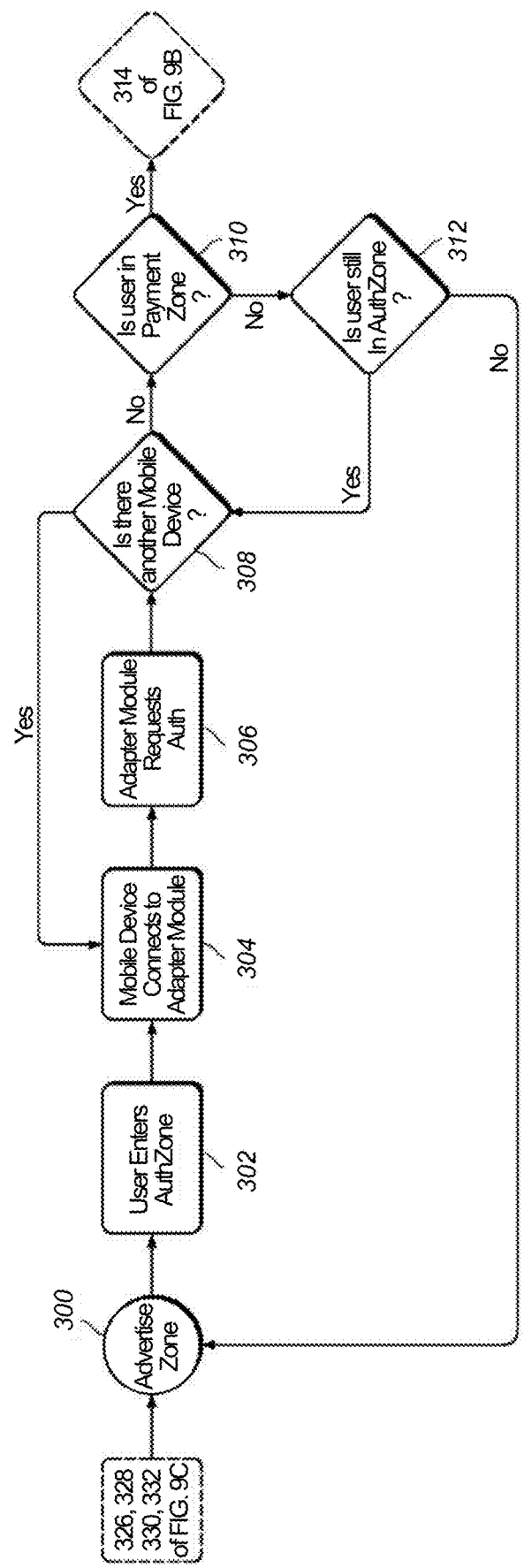
FIGS. 9A-9E are flow charts that show example steps and features of the payment processing system (e.g., communications, messaging, vending sequence, and purchase flow) in accordance with some implementations.

FIGS. 8B and 9A generally show that when the authorization zone threshold is reached, the mobile device 150 enters the authorization zone (block 302) and registers the adapter module 100. The mobile device 150 connects to the server 130 (block 304). The application 140 on the mobile device 150 creates a request for authorization (AuthRequest) and passes the AuthRequest to the server 130 using appropriate communication technology (e.g., GSM, CDMA, Wi-Fi, or the like) (block 306). The server 130 responds with an authorization grant (AuthGrant) encrypted with the specific adapter module's private key (block 306). This authorization token may minimally include the User identifier (ID), Apparatus ID (for the adapter module 100), authorization amount, and expiration time. The mobile device 150 receives the AuthGrant from the server 130, and retains it until the mobile device 150 is ready to issue payment to an adapter module 100. The mobile device 150 collects all pending AuthGrants that may be one or more depending on how many adapter modules 100 are in-range. Unused AuthGrants that expire are purged from the mobile device 150 and the server 130. It is important to note that the mobile device 150 is unable to read the AuthGrant because it is encrypted with the adapter module's unique private key that is only known to server 130 and adapter module 100. This provides a preferred key element of security in the system as the adapter module 100 only trusts AuthGrants that are issued by the server 130, and the AuthGrants cannot be read or modified by the mobile device 150 or any other party in between the server and the adapter module 100. Additional mobile devices 150 may enter the authorization zone 104 (block 308).

As the user approaches a specific adapter module 100, the user enters the payment zone 102 and an event threshold is triggered based on heuristics performed by the mobile device 150. Blocks 310 and 312 show the loop steps of waiting for a mobile device 150 from the authorization zone 104 to enter the payment zone 102. If the user leaves the authorization zone 104 without entering the payment zone 102, the adapter module 100 returns to advertising its presence (block 300).

Figure 8C:
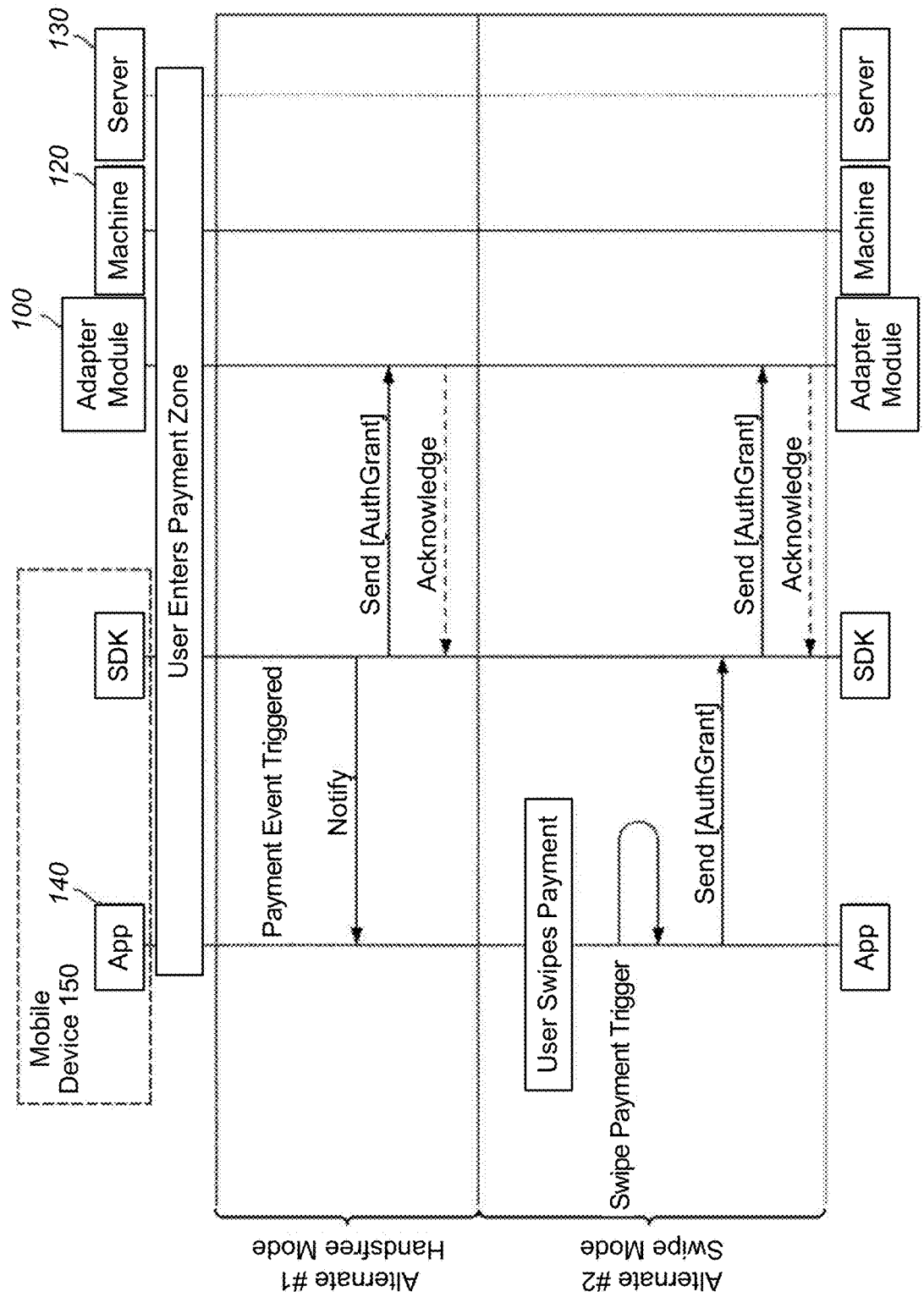
FIG. 8C is a schematic process flow diagram that shows additional elements and features of the payment processing system (e.g., communications, messaging, vending sequence, and purchase flow) when the user enters the "payment zone" and, in particular, detailing a hands-free mode embodiment and a swipe mode embodiment in accordance with some implementations.
Figure 9B:
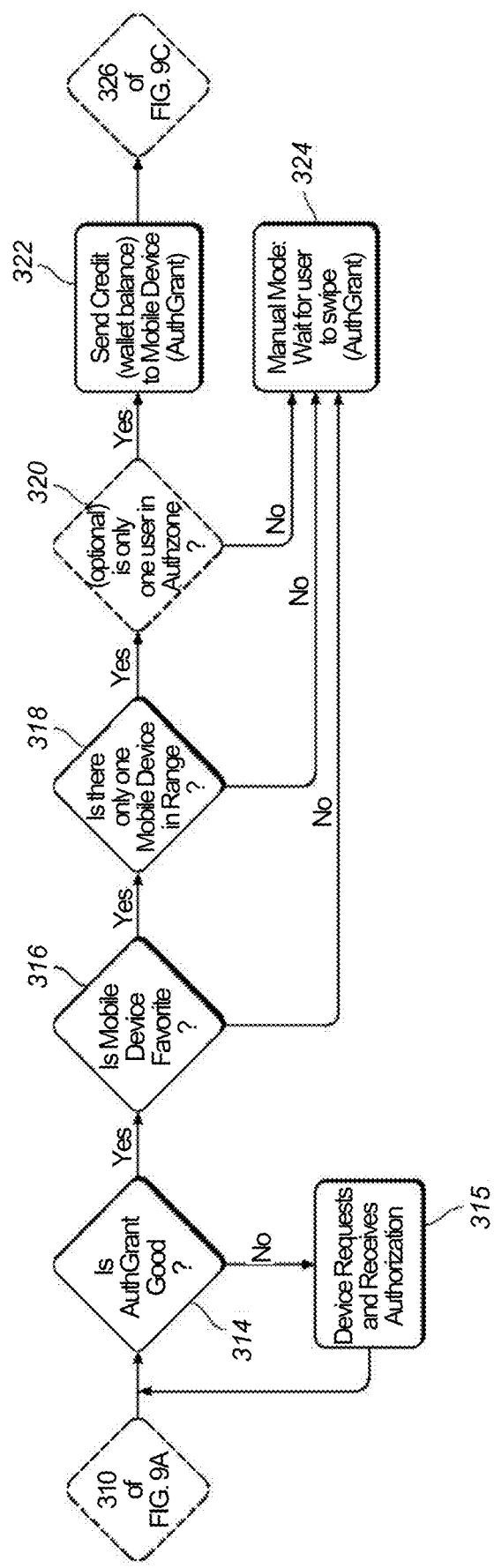

FIGS. 8C and 9B generally show the user entering the payment zone. The mobile device 150 verifies that it has an unexpired and valid AuthGrant. If the AuthGrant is not good, it may be requested again, repeating the Authorization Request process (block 315). If the AuthGrant is good, the mobile device 150 sends the valid AuthGrant (including the wallet balance (block 322)) to the adapter module 100 to initiate a transaction. The mobile device 150 may issue the AuthGrant automatically without specific user interaction if the hands-free mode is supported (and the device is a favorite (block 318), there is only one device in the payment zone 102 (block 318), and (optionally) there is only one user in the authorization zone 104 (block 320). If any of these factors are not present, the mobile device 150 will prompt and/or wait for the user to begin the transaction manually (block 324).

Figure 8D:
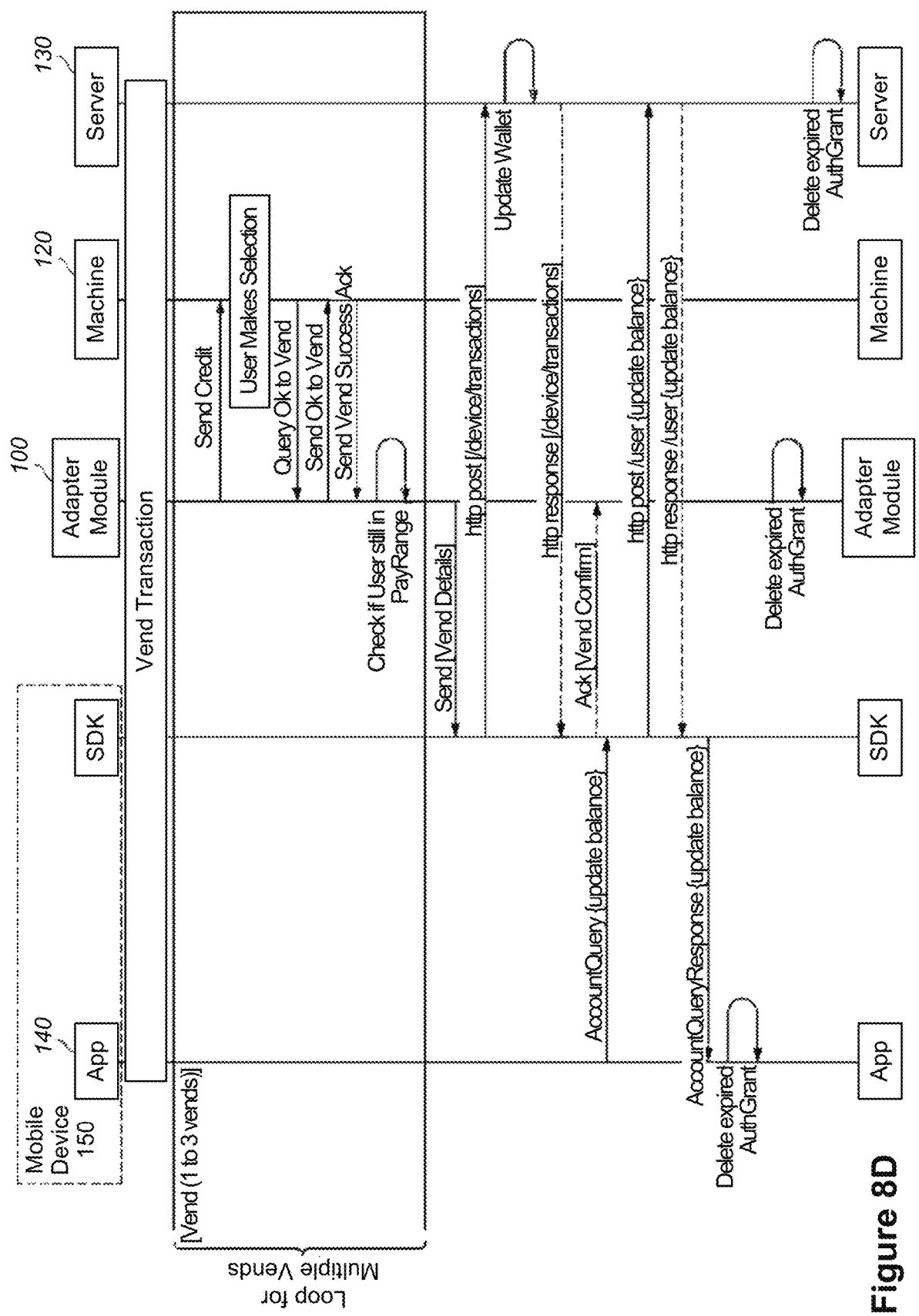
FIG. 8D is a schematic process flow diagram that shows additional elements and features of the payment processing system (e.g., communications, messaging, vending sequence, and purchase flow) in a vending transaction including a loop for multiple transactions in accordance with some implementations.
Figure 9C:
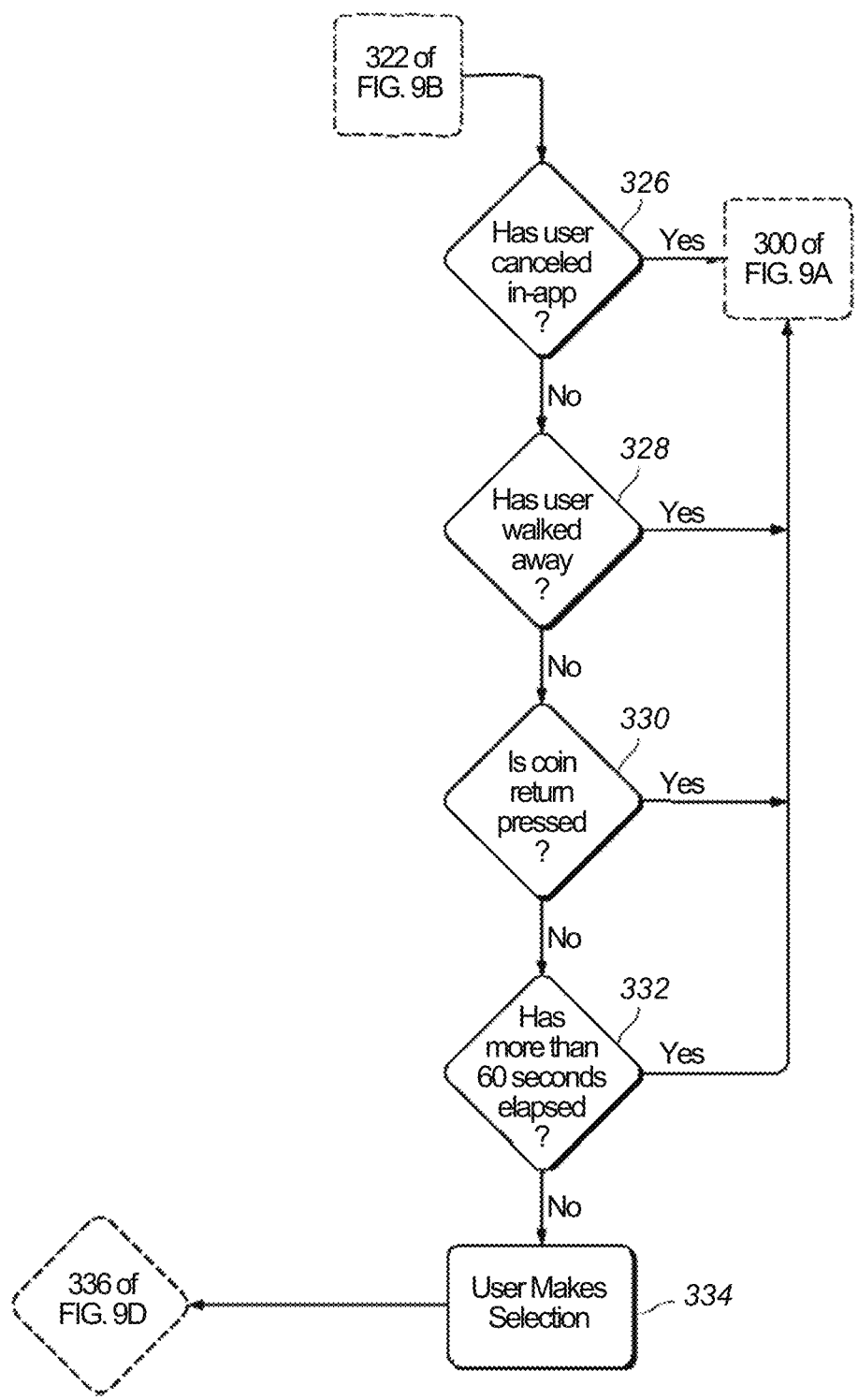
Figure 9D:
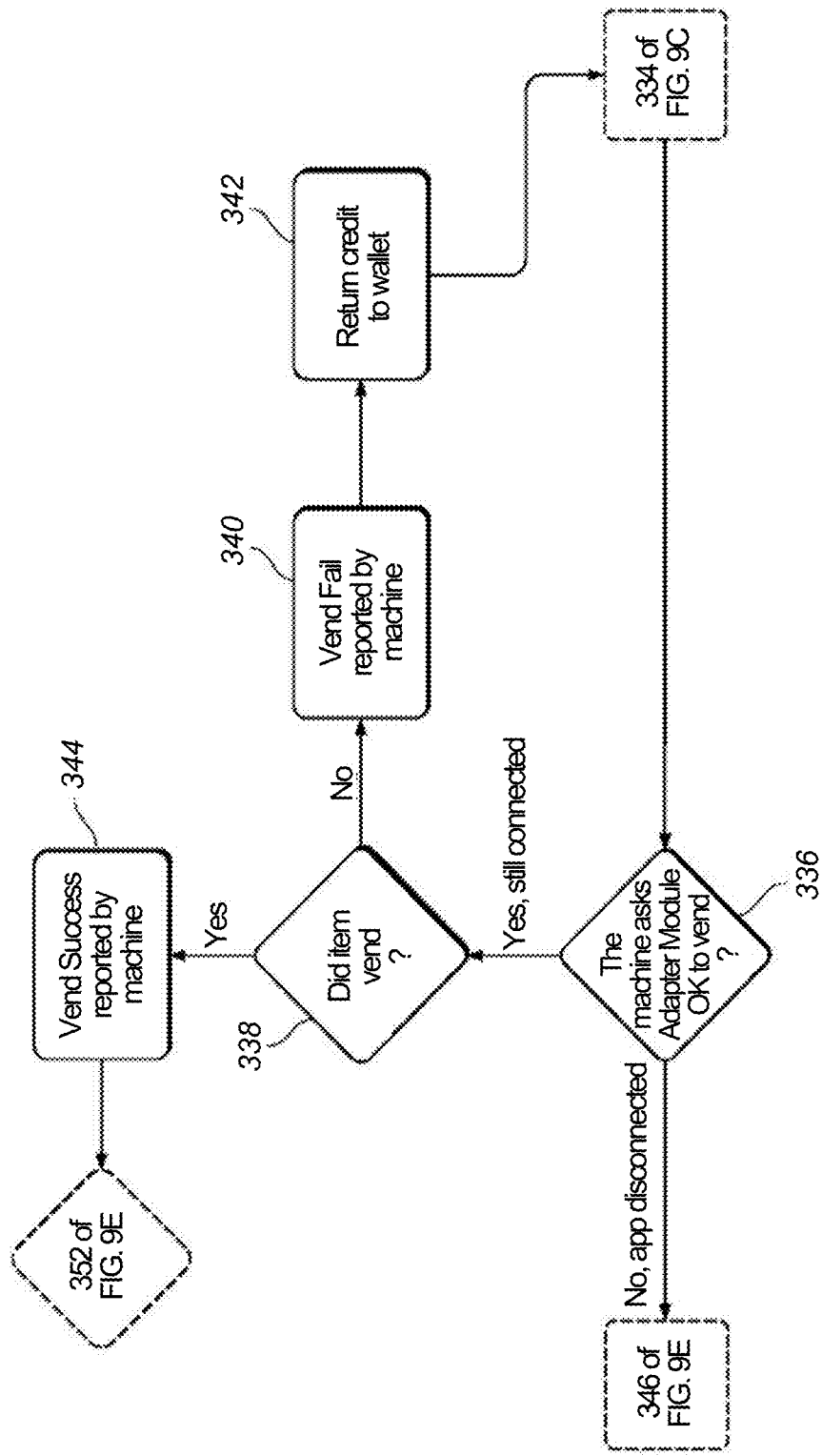

FIGS. 8D, 9C, and 9D generally show the transaction process. As shown in FIG. 9C, the adapter module 100 runs through a series of questions to determine if there are any issues that would prevent vending including: has the user canceled in-app? (block 326), has the user walked away? (block 328), is the coin return pressed? (block 330), has more than a predetermined period of time elapsed? (block 332). If the answer to any of these questions is "yes," the transaction does not proceed. If the answers to all of these questions is "no," the user makes a selection (block 334) on the payment accepting unit 120 in the same or similar manner as compared to if cash or credit were presented to the payment accepting unit 120. If the machine 120 is able to vend (block 336), it attempts to release the product. If the vend fails (block 338) it is reported by the machine (block 340) and a credit is returned to the virtual wallet (block 342). If the vend is successful (block 338) it is reported by the machine (block 344). Put another way, after the transaction is complete, the adapter module 100 returns to the mobile device 150 the details of the transaction as well as an encrypted packet containing the vend details to be sent to the server 130 via the mobile device 150. Optionally, the adapter module 100 can pass additional information not directly related to the transaction such as payment accepting unit health, sales data, error codes, etc.

Figure 9E:
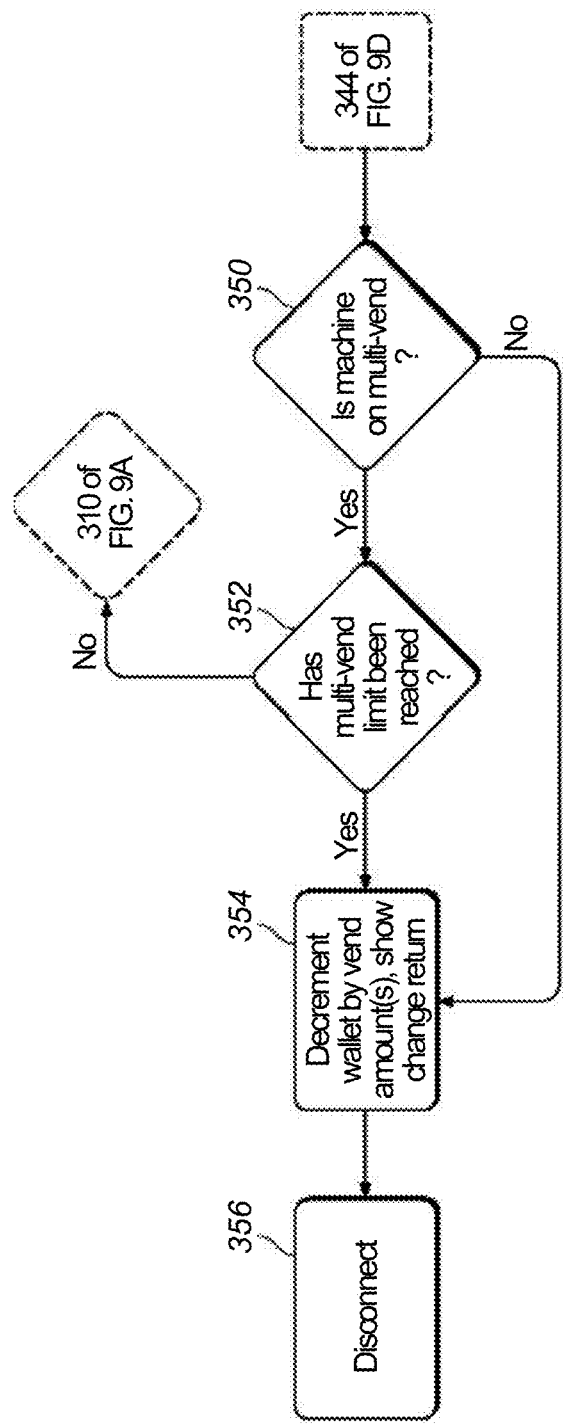
Figure 10B:
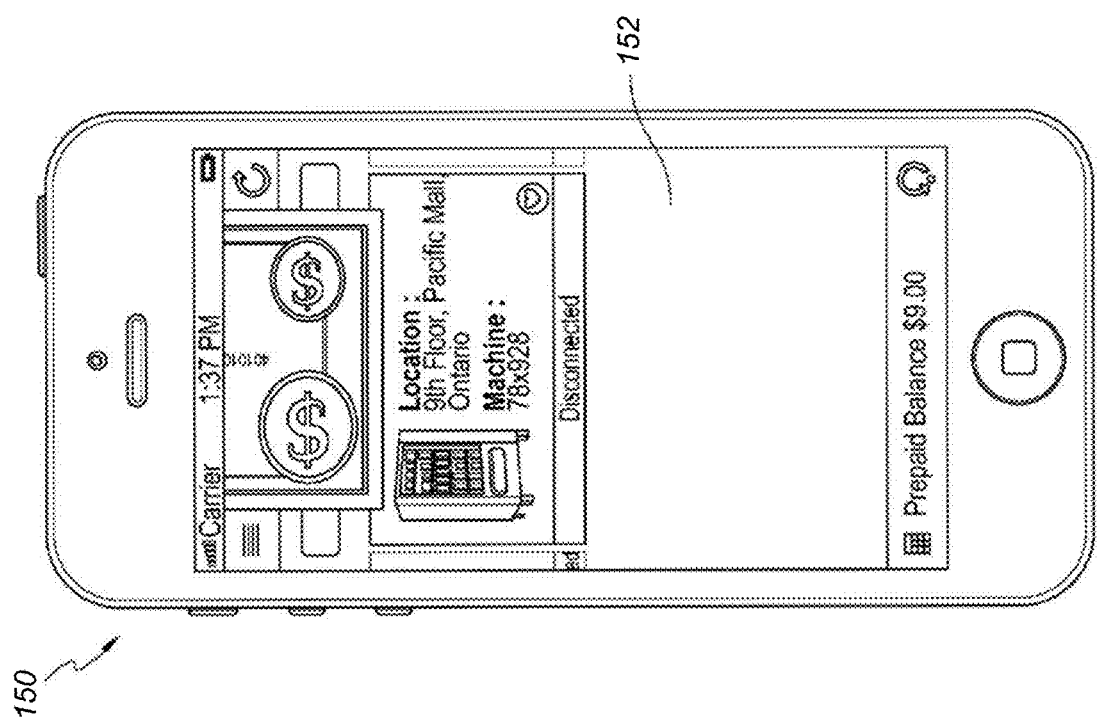
FIGS. 10A-10D show a mobile device with a graphical representation of a mobile application shown thereon, the mobile application being used as part of the mobile-device-to-machine payment processing system in accordance with some implementations.
Figure 10A:
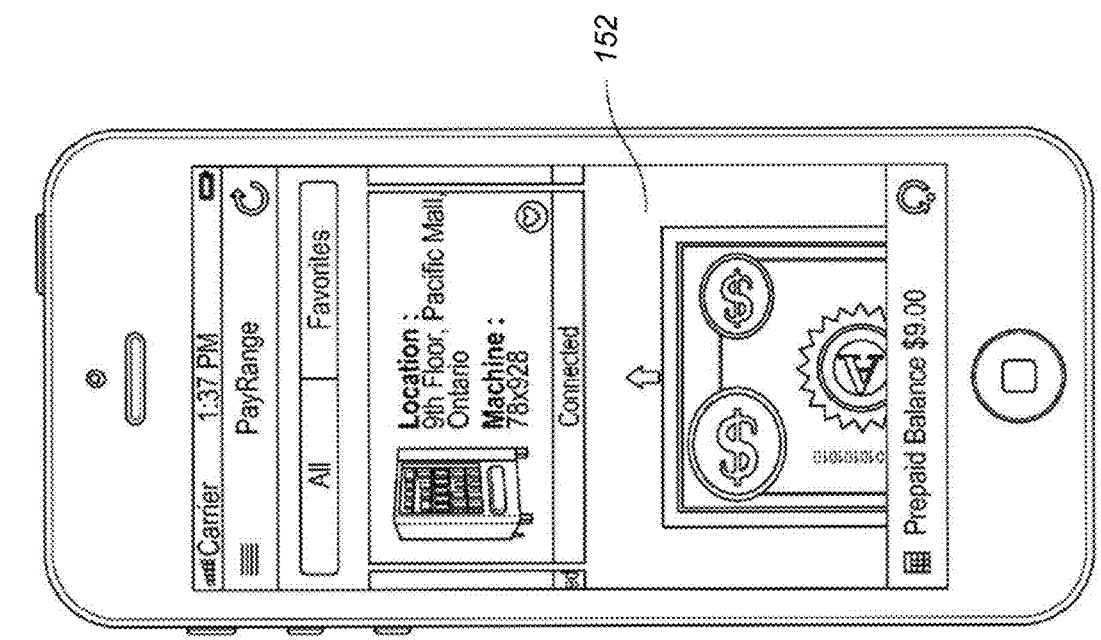
Figure 10D:
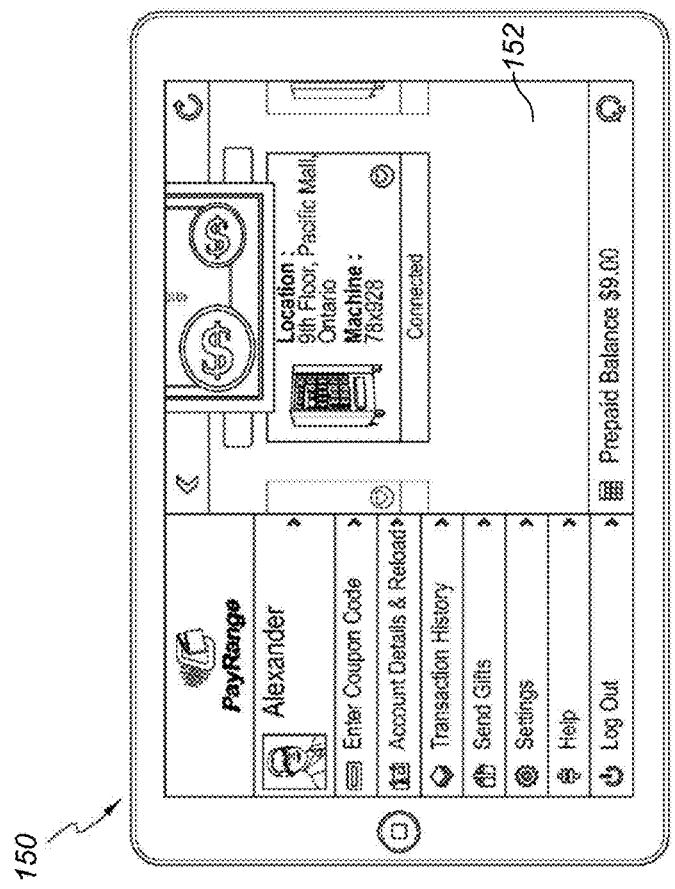
Figure 10C:
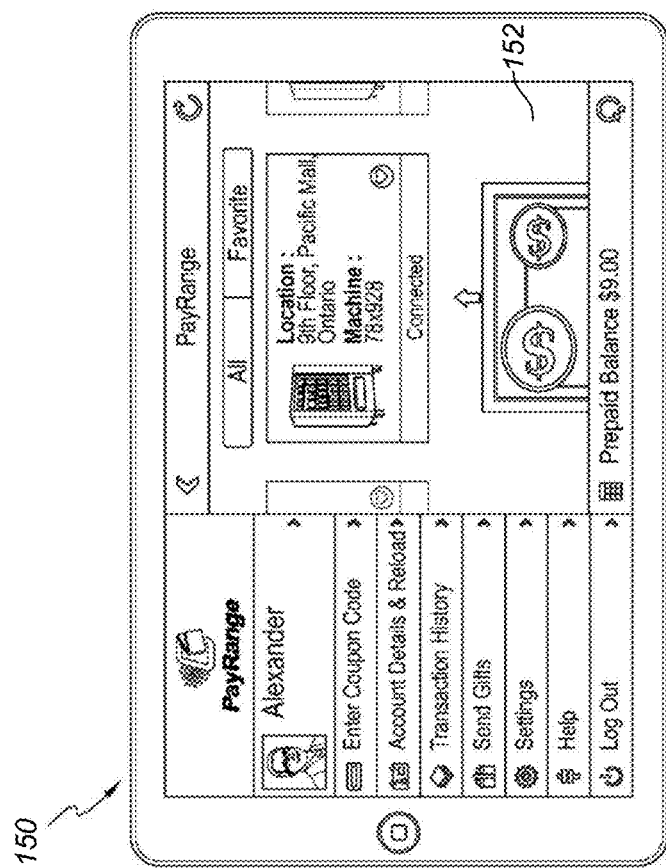

FIGS. 8D and 9E generally show the multi-vend function. If the machine has enabled multi-vend capabilities (block 350) and the multi-vend limit has not been reached, the process returns to the question of whether the user is in the payment zone (block 310 of FIG. 9A). If the machine does not have enabled multi-vend capabilities (block 350) or the multi-vend limit has been reached, the wallet is decremented by the vend amount(s) and "change" is returned to the virtual wallet (block 354) and the process ends (block 356).

Figure 8E:
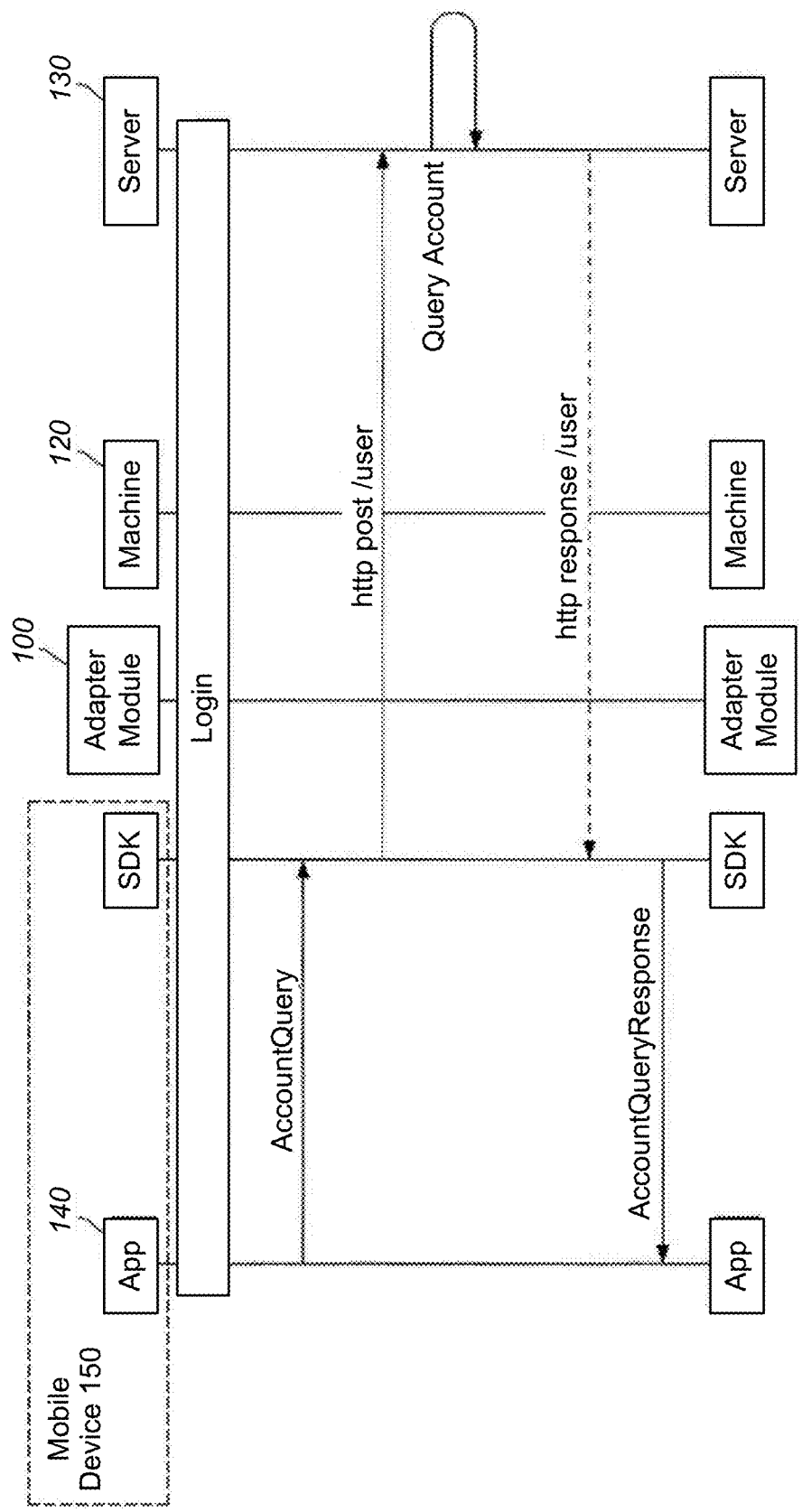
FIG. 8E is a schematic process flow diagram that shows additional elements and features of the payment processing system (e.g., communications, messaging, vending sequence, and purchase flow) in the login mode in accordance with some implementations.
Figure 8F:
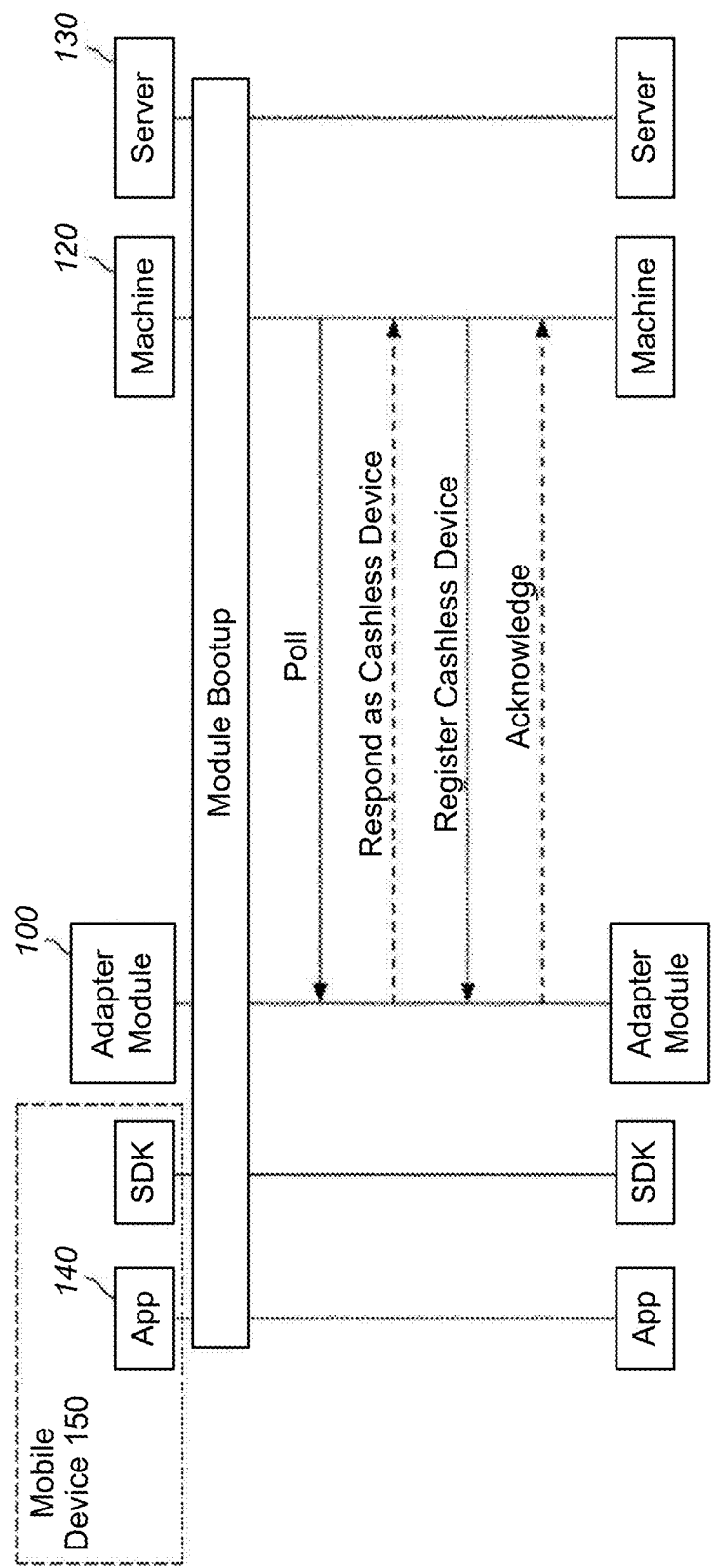
FIG. 8F is a schematic process flow diagram that shows additional elements and features of the payment processing system (e.g., communications, messaging, vending sequence, and purchase flow) during boot-up of the adapter module in accordance with some implementations.
Figure 8G:
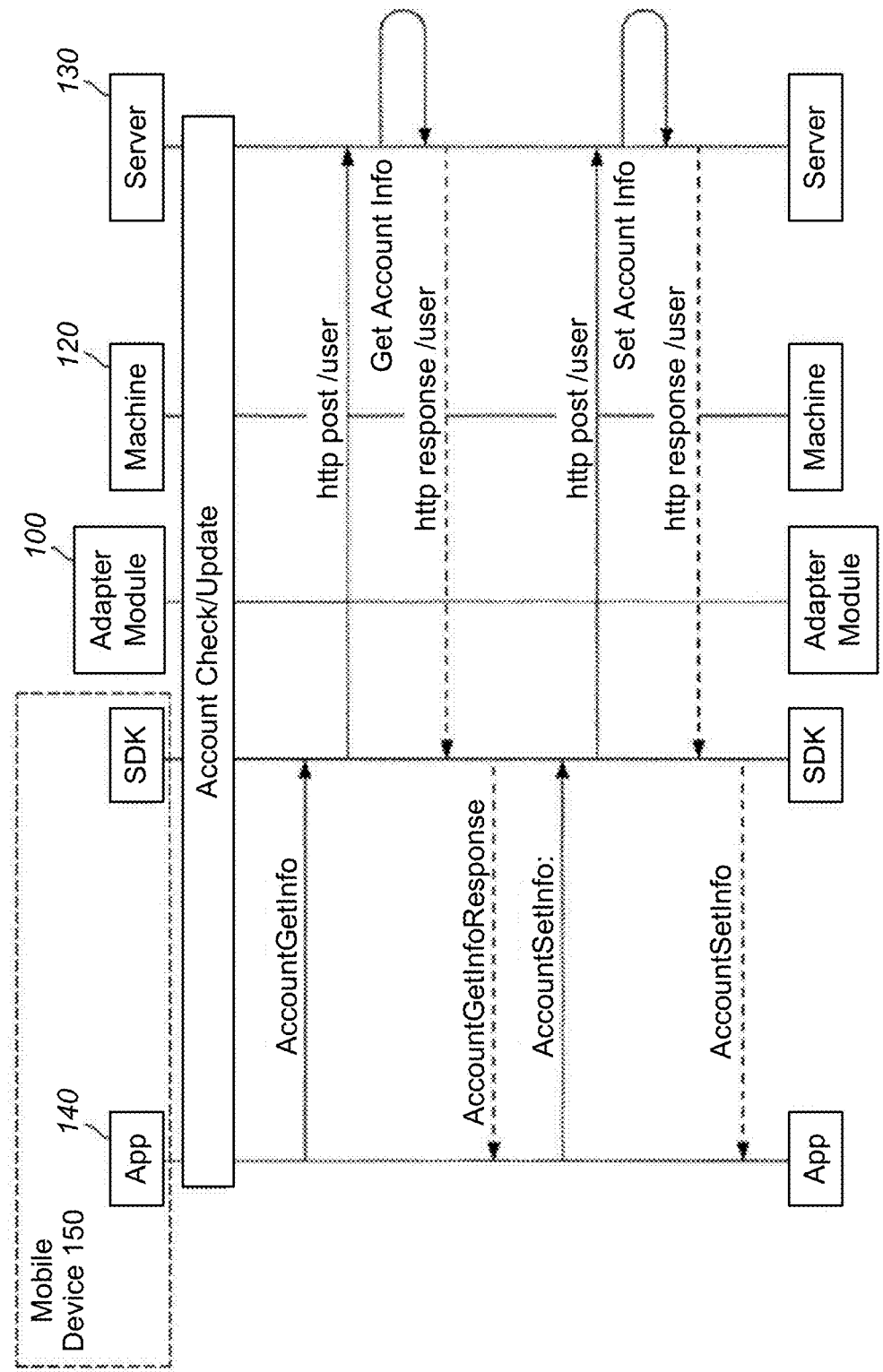
FIG. 8G is a schematic process flow diagram that shows additional elements and features of the payment processing system (e.g., communications, messaging, vending sequence, and purchase flow) during an account check/update process in accordance with some implementations.

FIG. 8E is a schematic flow diagram of an example login process. FIG. 8F is a schematic flow diagram of an example boot-up process. FIG. 8G is a schematic flow diagram of an example account check/update process.

Several of the figures are flow charts (e.g., FIGS. 9A-9E) illustrating methods and systems. It will be understood that each block of these flow charts, components of all or some of the blocks of these flow charts, and/or combinations of blocks in these flow charts, may be implemented by software (e.g., coding, software, computer program instructions, software programs, subprograms, or other series of computer-executable or processor-executable instructions), by hardware (e.g., processors, memory), by firmware, and/or a combination of these forms. As an example, in the case of software, computer program instructions (computer-readable program code) may be loaded onto a computer to produce a machine, such that the instructions that execute on the computer create structures for implementing the functions specified in the flow chart block or blocks. These computer program instructions may also be stored in a memory that can direct a computer to function in a particular manner, such that the instructions stored in the memory produce an article of manufacture including instruction structures that implement the function specified in the flow chart block or blocks. The computer program instructions may also be loaded onto a computer to cause a series of operational steps to be performed on or by the computer to produce a computer implemented process such that the instructions that execute on the computer provide steps for implementing the functions specified in the flow chart block or blocks. Accordingly, blocks of the flow charts support combinations of steps, structures, and/or modules for performing the specified functions. It will also be understood that each block of the flow charts, and combinations of blocks in the flow charts, may be divided and/or joined with other blocks of the flow charts without affecting the scope of the invention. This may result, for example, in computer-readable program code being stored in whole on a single memory, or various components of computer-readable program code being stored on more than one memory.

Additional Implementations

Figure 23:
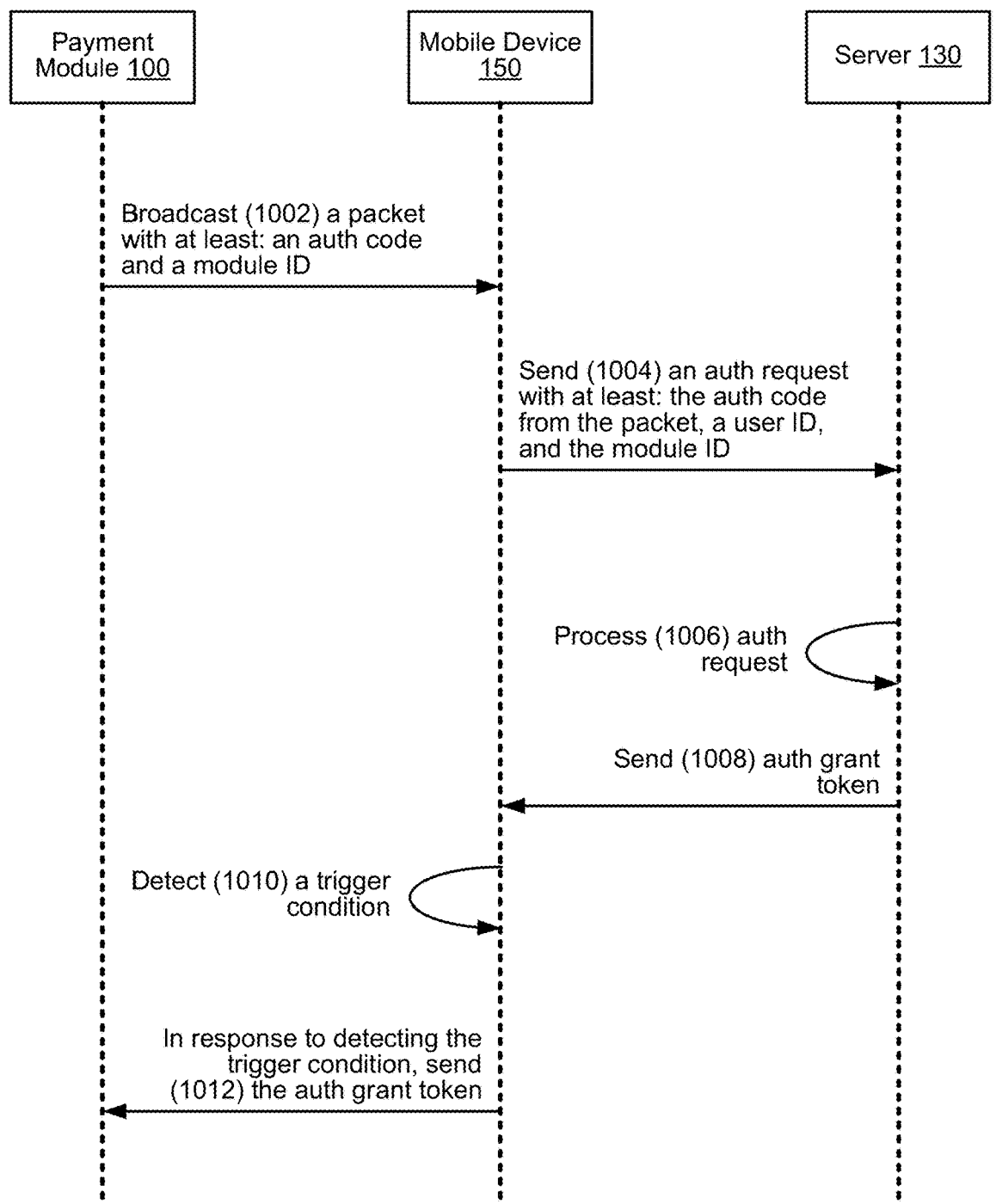
FIG. 23 is a schematic flow diagram of a process for authenticating a user to perform a transaction in the payment processing system in accordance with some implementations.

FIG. 23 illustrates a schematic flow diagram of a process 1000 of authenticating a user to perform a transaction in the payment processing system in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, is associated with an entity that supplies, operates, and/or manufactures the one or more payment modules 100. For brevity, the process 1000 will be described with respect to a respective payment module 100 and a respective mobile device 150 in the payment processing system.

The payment module 100 broadcasts (1002), via a short-range communication capability (e.g., BLE), a packet of information (sometimes also herein called "advertised information"). The packet of information at least includes an authorization code and an identifier associated with the payment module 100 (module ID). In some implementations, the packet of information further includes a firmware version of the payment module 100 and one or more status flags corresponding to one or more states of the payment module 100 and/or the payment accepting unit 120. The information included in the packet broadcast by the payment module 100 is further discussed below with reference to FIG. 24A.

In some implementations, the payment module 100 sends out a unique authorization code every X seconds (e.g., 100 ms, 200 ms, 500 ms, etc.). In some implementations, the unique authorization codes are randomly or pseudo-randomly generated numbers. In some implementations, the payment module 100 stores broadcasted authorization codes until a received authorization grant token matches one of the stored authorization codes. In some implementations, the payment module 100 stores broadcasted authorization codes for a predetermined amount of time (e.g., Y minutes) after which time an authorization code expires and is deleted. In some implementations, the authorization code is encrypted with a shared secret key known by the server 130 but unique to the payment module 100. In some implementations, the payment module 100 initializes a random number and then the authorization codes are sequential counts from this random number. In such implementations, the payment module 100 stores the earliest valid (unexpired) counter without a need to store every valid authorization code. In some implementations, the authentication code included in the broadcast packet of information is a hash value of the randomly or pseudo-randomly generated number or the sequential number.

The mobile device 150 receives the broadcasted packet of information, and the mobile device 150 sends (1004), via a long-range communication capability (e.g., GSM, CDMA, Wi-Fi, or the like), an authorization request to the server 130. For example, an application 140 that is associated with the payment processing system is executing as a foreground or background process on the mobile device 150. In this example, the application 140 receives the broadcasted packet of information when the mobile device 150 is within the communication zone of the payment module 100 (i.e., BLE range) and either automatically sends the authorization request to the server 130 or sends the authorization request to the server 130 when the mobile device 150 is within the authorization zone of the payment module 100. In some implementations, the broadcasted packet of information includes a baseline authorization zone threshold (i.e., an authorization zone criterion) indicating a baseline RSSI that the mobile device 150 (or the application 140) is required to observe before being within the authorization zone of the payment module 100. In some implementations, the mobile device 150 (or the application 140) offsets the baseline authorization zone threshold based on the strength and/or reception of the short-range communication capability (e.g., BLE radio/transceiver) of the mobile device 150. In some implementations, the authorization request at least includes the authorization code which was included in the broadcasted packet of information, an identifier associated with the user of the mobile device 150 or the user account under which the user of the mobile device 150 is logged into the application 140 (user ID), and the identifier associated with the payment module 100 (module ID). In some implementations, the authentication code included in authorization request is the hash value in cleartext. The authorization request is further discussed below with reference to FIG. 24B.

After receiving the authorization request, the server 130 processes (1006) the authorization request. In some implementations, the server 130 decrypts the authorization code included in the authorization request with the shared secret key corresponding to the payment module 100. In some implementations, the server 130 determines whether the user associated with the user ID in the authorization request has sufficient funds in his/her account for the payment processing system to perform a transaction at the machine 120 that is associated with the payment module 100 corresponding to the module ID in the authorization request.

The server 130 sends (1008), via a long-range communication capability (e.g., GSM, CDMA, Wi-Fi, or the like), an authorization grant token to the mobile device 150. In some implementations, the server 130 does not send the authorization grant token if the authorization code in the authorization request cannot be decrypted with the shared secret key corresponding to the payment module 100 (e.g., the authorization code is corrupted or hacked). In some implementations, the server 130 does not send the authorization grant token if the user associated with the user ID in the authorization request does not have sufficient funds in his/her account. In some implementations, in addition to the authorization grant token, the server 130 sends a message directly to the mobile device 150 which is not encrypted with the shared secret key corresponding to the payment module 100. After receiving the message, the mobile device 150 displays an appropriate message to the user such as insufficient balance or declined authorization. In some implementations, the server 130 sends an authorization grant token for an amount equal to zero; in which case, the payment module 100 interprets this as a declined or failed authorization which can result for any number of reasons including, but not limited to, insufficient balance or credit.

The mobile device 150 receives the authorization grant token, and, subsequently, the mobile device 150 detects (1010) a trigger condition. In some implementations, the mobile device 150 (or the application 140) detects the trigger condition via the hand-free mode (e.g., upon entrance into the payment zone of the payment module 100) or manual mode (e.g., interacting with the user interface of the application 140 to initiate a transaction with the payment accepting unit associated with the payment module 100).

In some implementations, unused authorization grants (e.g., if there was no trigger condition or it expired) are canceled by the mobile device 150 by sending a cancellation message to the server 130 corresponding to the unused authorization grant. In some implementations, the server 130 denies or limits the number of authorization grants sent to the mobile device 150 until it has received transaction information or cancellation of authorization outstanding authorization grants sent to the mobile device 150.

In response to detecting the trigger condition, the mobile device 150 sends (1012), via a short-range communication capability (e.g., BLE), the authorization grant token to the payment module 100. Subsequently, the machine 120 displays credit to the user (e.g., via one of the displays 122 or 124 shown in FIG. 19) and the user interacts with the input mechanisms of the machine 120 (e.g., via the buttons 126 or a touch screen display 124 shown in FIG. 19) to purchase products and/or services.

Figure 24A:
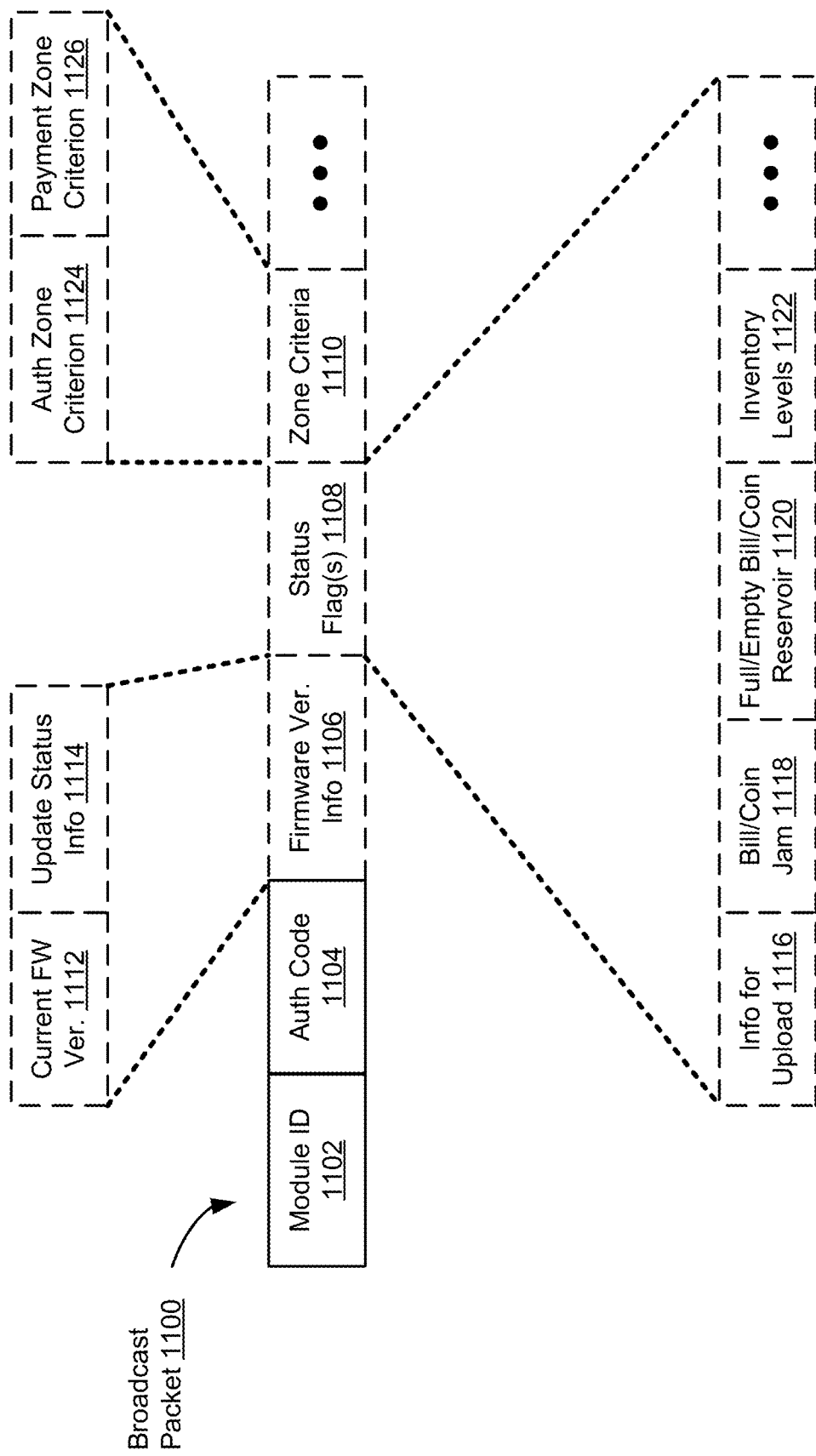
FIG. 24A is a block diagram of a packet of information broadcast by the payment module (sometimes also herein called the "adapter module") in accordance with some implementations.

FIG. 24A illustrates a block diagram of a packet 1100 of information broadcast by the payment module 100 (e.g., in step 1002 of the process 1000 in FIG. 23) in accordance with some implementations. In some implementations, the packet 1100 at least includes: module ID 1102 and authorization code 1104. In some implementations, the packet 110 additional includes: a firmware version 1106 and one or more status flags 1108.

In some implementations, the module ID 1102 is a unique identifier corresponding to the payment module 100 (sometimes also herein called the "adapter module 100") that broadcast the packet 1100.

In some implementations, the authorization code 1104 is a hash value in cleartext. In some implementations, the payment module 100 randomly or pseudo-randomly generates a number or determines a sequential number (See step 1002 of process 1000 in FIG. 23) and performs a predetermined hash function (e.g., SHA-256) on the number to produce the hash value as the authorization code 1104. In some implementations, the authorization code 1104 is a unique code that is encrypted with a secret encryption key corresponding to the payment module 100. The secret encryption key is shared with the server 130, which enables the server 130 to decrypt the authorization code 1104 and encrypt the authorization grant token but not the mobile device 150. In some implementations, the encryption between server 130 and payment module 100 is accomplished by two pairs of public/private keys.

In some implementations, the firmware version information 1106 identifies a current firmware version 1112 of the payment module 100. In some implementations, the firmware version information 1106 also includes update status information 1114 indicating one or more packets received by the payment module 100 to update the firmware or one or more packets needed by the payment module 100 to update the firmware. See FIGS. 26A-26B and 30A-30D and the accompanying text for further discussion regarding updating the firmware of the payment module 100.

In some implementations, the one or more status flags 1108 indicate a state of the payment module 100 and/or the payment accepting unit 120 associated with the payment module 100. In some implementations, the one or more status flags 1108 indicate a state of the payment module 100 such upload information indicator 1116 indicating that that the payment module 100 has information to be uploaded to the server 130 (e.g., transaction information for one or more interrupted transactions). In some implementations, upload information indicator 1116 triggers the mobile device 150 to connect to payment module 100 immediately (e.g., if it has interrupted transaction information to be uploaded to the server 130). See FIGS. 25A-25B and 29 and the accompanying text for further discussion regarding interrupted transactions. In some implementations, the one or more status flags 1108 indicate a state of the payment accepting unit 120 including one or more of an error indicator 1118 (e.g., indicating that a bill and/or coin acceptor of the payment accepting unit 120 is experiencing a jam, error code, or malfunction), a currency level indicator 1120 (e.g., indicating that the level of the bill and/or coin acceptor reservoir of the payment accepting unit 120 is full or empty), and/or inventory level(s) indicator 1122 (e.g., indicating that one or more products of the payment accepting unit 120. In some implementations, the one or more status flags 1108 are error codes issued by payment accepting unit 120 over the MDB.

In some implementations, the zone criteria information 1110 specifies an authorization zone criterion 1124 (e.g., a baseline authorization zone threshold indicating a baseline RSSI that the mobile device 150 (or the application 140) is required to observe before being within the authorization zone of the payment module 100) and/or a payment zone criterion 1126 (e.g., a baseline payment zone threshold indicating a baseline RSSI that the mobile device 150 (or the application 140) is required to observe before being within the payment zone of the payment module 100). In some implementations, the baseline authorization zone threshold and the baseline payment zone threshold are default values determined by the server 130 or stored as variables by the application 140, in which case the authorization zone criterion 1124 and payment zone criterion 1126 are offsets to compensate for the strength and/or reception of the short-range communication capability (e.g., BLE radio/transceiver) of the payment module 100. Alternatively, zone criteria information 1110 includes a spread between the baseline authorization zone threshold and the baseline payment zone threshold. Thus, the mobile device 150 (or the application 140) determines the baseline authorization zone threshold and the baseline payment zone threshold based on the spread value and a default value for either the baseline authorization zone threshold or the baseline payment zone threshold. For example, the spread indicates −10 db and the default baseline payment zone threshold is −90 db; thus, the baseline authorization zone threshold is −80 db. Continuing with this example, after determining the baseline authorization zone threshold and the baseline payment zone threshold, the mobile device 150 (or the application 140) may further adjust the authorization zone threshold and/or the payment zone threshold based on the strength and/or reception of its short-range communication capability (i.e., BLE radio/transceiver).

Figures 24B, 24C:
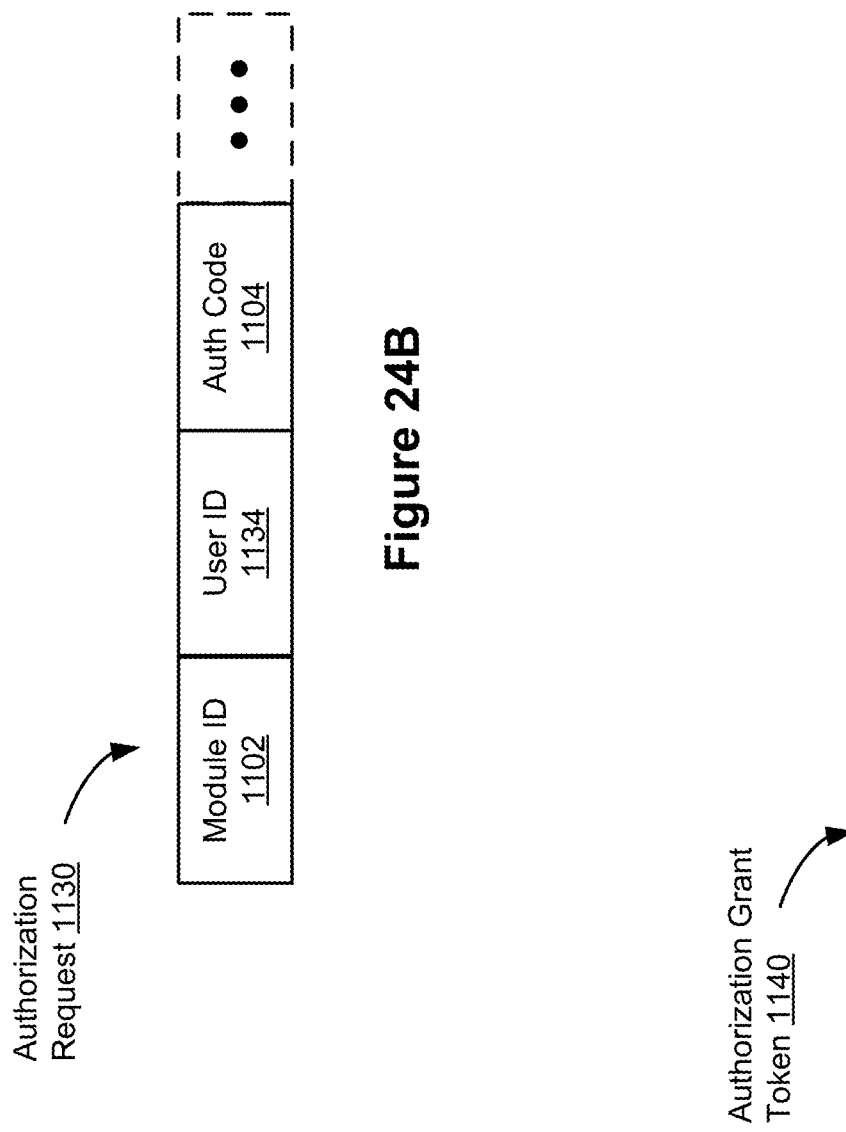
FIG. 24B is a block diagram of an authorization request in accordance with some implementations.
FIG. 24C is a block diagram of an authorization grant token in accordance with some implementations.

FIG. 24B is a block diagram of an authorization request 1130 sent by the mobile device 150 to the server 130 (e.g., in step 1004 of the process 1000 in FIG. 23) in accordance with some implementations. In some implementations, the authorization request 1130 at least includes: a module ID 1102, a user ID 1134, and an authorization code 1104.

In some implementations, the module ID 1102 is a unique identifier corresponding to the payment module 100 that broadcast the 1100 that included the authorization code 1104.

In some implementations, the user ID 1134 is an identifier associated with the user of the mobile device 150 sending the authorization request 1130 to the server 130. In some implementations, the user ID 1134 is associated with the user account under which the user of the mobile device 150 is logged into the application 140.

In some implementations, the authorization code 1130 includes the authorization code 1104 included in the packet 1100 of information that was broadcast by the payment module 100.

FIG. 24C is a block diagram of an authorization grant token 1140 sent by the server 130 to the mobile device 150 (e.g., in step 1008 of the process 1000 in FIG. 23) in accordance with some implementations. In some implementations, in accordance with a determination that the authorization code 1136 included in the authorization request 1130 from the mobile device 150 is valid and that the user associated with the mobile device 150 has sufficient funds in his/her account for the payment processing system, the server 130 generates the authorization grant token 1140. In some implementations, the authorization grant token 1140 at least includes: a module ID 1102, a user ID 1134, an authorized amount 1146, (optionally) an expiration period offset 1148, and (optionally) the authorization code 1104.

In some implementations, the module ID 1102 is a unique identifier corresponding to the payment module 100 that broadcast the packet 1100 that included the authorization code 1104.

In some implementations, the user ID 1134 is an identifier associated with the user of the mobile device 150 that sent the authorization request 1130 to the server 130.

In some implementations, the authorized amount 1146 indicates a maximum amount for which the user of the mobile device 150 is authorized for a transaction using the authorization grant token 1140. For example, the authorized amount 1146 is predefined by the user of the mobile device 150 or by the server 130 based on a daily limit or based on the user's total account balance or based on a risk profile of the user correspond to the user ID 1134.

In some implementations, the expiration period 1148 offset indicates an offset to the amount of time that the payment module 100 holds the authorization grant token 1140 valid for initiation of a transaction with the machine 120 associated with the payment module 100. For example, the expiration period offset 1148 depends on the history and credit of the user of mobile device 150 or a period predefined by the user of mobile device 150.

In some implementations, the authorization grant token 1140 further includes the authorization code 1104 that was included in the authorization request 1130. In some implementations, when the authorization code 1104 is the hash value, the server 130 encrypts the authorization grant token 1140 including the hashed value with the shared secret encryption key associated with payment module 100. Subsequently, when mobile device 150 sends the authorization grant token 1140 to payment module 100 after detecting a trigger condition, the payment module 100 decrypts the authorization grant token 1140 using the secret key known only to server 130 and payment module 100 (which authenticates the message and the authorization grant), and then matches the hash value included in the decrypted authorization grant token 1140 to previously broadcast valid (unexpired) hash values (i.e., auth codes) to determine validity of the (which was known only by payment module 100).

Figure 24D:
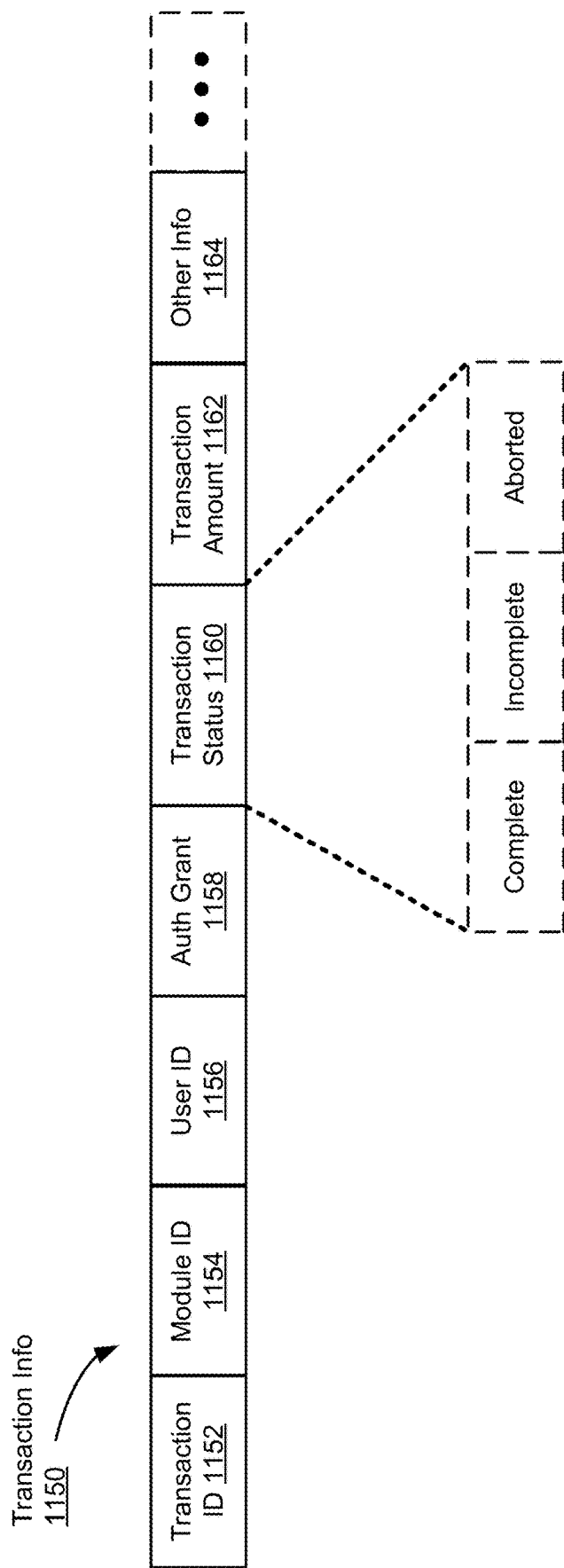
FIG. 24D is a block diagram of transaction information generated by the payment module in accordance with some implementations.

FIG. 24D illustrates a block diagram of transaction information 1150 generated by the payment module 100 (e.g., in step 1204 of the process 1200 in FIG. 25A) in accordance with some implementations. In some implementations, the transaction information 1150 includes: a transaction ID 1152 for the respective transaction, a module ID 1154, a user ID 1156, (optionally) the authorization code 1158, transaction status information 1160, the transaction amount 1162, and other information 1164.

In some implementations, the transaction ID 1152 is a unique identifier corresponding to the respective transaction. In some implementations, the transaction ID 1152 is encoded based on or associated with the time and/or date on which and the location at which the respective transaction took place.

In some implementations, the module ID 1154 is a unique identifier corresponding to the payment module 100 that performed the respective transaction.

In some implementations, the user ID 1156 is an identifier associated with the user of the mobile device 150 that initiated the respective transaction.

In some implementations, the authorization code 1158 corresponds to the original authorization code (e.g., auth code 1104, FIGS. 24 A-24C) and/or authorization grant token (e.g., auth grant token 1140, FIG. 24C) that was used to initiate the respective transaction. In some implementations, the authorization code 1156 is encrypted with a unique encryption key corresponding to the payment module 100.

In some implementations, the transaction status information 1160 includes an indication whether the respective transaction was completed, not-completed, or aborted. For example, the respective transaction is incomplete if a jam occurred at the payment accepting unit 120 and the user did not receive the product associated with the respective transaction. For example, if the user walks away from the payment accepting unit 120 after money was credited for the respective transaction, the respective transaction is aborted. In another example, if respective transaction times out after a predetermined time period because the user failed to select a product at the payment accepting unit 120, the respective transaction is aborted. In another example, if the user actuates a bill or coin return mechanism of the payment accepting unit 120, the respective transaction is aborted.

In some implementations, the transaction amount 1162 indicates the amount of the respective transaction or the amount of each of multiple transactions (e.g., in a multi-vend scenario). In some implementations, the transaction amount 1162 is encrypted with a unique encryption key corresponding to the payment module 100.

In some implementations, the other information 1164 includes other information related to the respective transaction such as the items dispensed by the payment accepting unit 120 and the type of transaction (e.g., coins, bills, credit card, manual mode, hands-free mode, etc.). In some implementations, the other information 1164 includes other information related to the payment module 100 and/or the payment accepting unit 120 associated with the payment module 100. For example, the other information 1164 includes a verification request to the server 130 in order to implement new firmware. See FIGS. 26A-26B and the accompanying text for further discussion of the verification request. In another example, the other information 1164 includes transaction information from one or more previous interrupted transactions. In another example, the other information 1164 includes transaction information for one or more transactions paid via bills and/or coins. In another example, the other information 1164 includes inventory information as to one or more products of the payment accepting unit 120.

Figure 25:
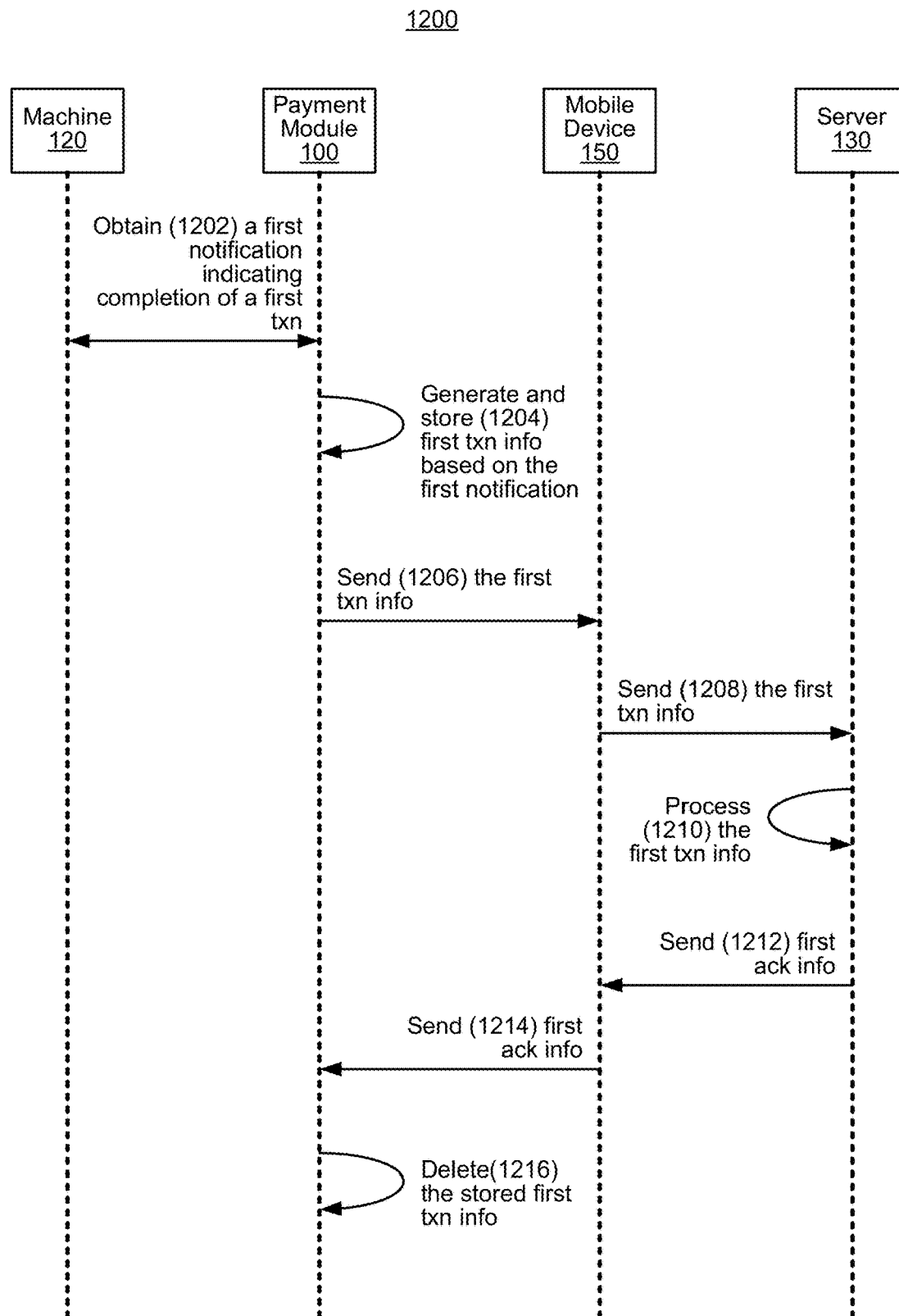
FIG. 25 is a schematic flow diagram of a process for processing acknowledgment information in the payment processing system in accordance with some implementations.

FIG. 25 illustrates a schematic flow diagram of a process 1200 of processing acknowledgement information in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, supplies, operates, and/or manufactures the one or more payment modules 100. For brevity, the process 1200 will be described with respect to a respective payment module 100 associated with a respective payment accepting unit 120 (machine 120) and a respective mobile device 150 in the payment processing system. In the process 1200, the payment module 100 receives first acknowledgment information for a first transaction via the mobile device 150 that initiated the first transaction.

The payment module 100 obtains (1202) a first notification indicating completion of a first transaction from the machine 120. For example, after the process 1000 in FIG. 23, the user of the mobile device 150 selects a product to purchase from the machine 120 by interacting with one or more input mechanisms of the machine 120 (e.g., buttons 126 or a touch screen display 124 shown in FIG. 19), and the machine 120 dispenses the selected product. Continuing with this example, after the product is dispensed, the transaction is complete and the payment module 100 obtains a notification from the machine of the completed transaction. In some implementations, the notification includes the amount of the transaction and (optionally) machine status information associated with the machine 120 such as inventory information as to one or more products of the payment accepting unit 120 and/or the like.

After obtaining the first notification, the payment module 100 generates (1204) first transaction information based on the first notification, and the payment module 100 stores the first transaction information. In some implementations, the transaction information includes a transaction ID for the first transaction, a module ID corresponding to payment module 100, a user ID corresponding to the mobile device 150, transaction status information indicating that the first transaction is complete, and the transaction amount indicated by the first notification. In some implementations, the payment module 100 retains the authorization code included in the original broadcasted packet and/or the authorization grant token and includes the authorization code in the first transaction information. In some implementations, the authorization code is encrypted with a secret key corresponding to the payment module 100, which is shared with the server 130 but not the mobile device 150. In some implementations, the first transaction information further includes other information such as the machine status information included in the first notification or transaction information corresponding to previous interrupted transaction(s). See FIG. 24D and the accompanying text for further discussion regarding transaction information 1150.

The payment module 100 sends (1206), via a short-range communication capability (e.g., BLE), the first transaction information to the mobile device 150.

The mobile device 150 sends (1208), via a long-range communication capability (e.g., GSM, CDMA, Wi-Fi, or the like), the first transaction information to the server 130.

The server 130 processes (1210) the first transaction information. For example, the server 130 debits the account of the user associated with the user ID in the first transaction information in the amount indicated by the first transaction information.

The server 130 sends (1212), via a long-range communication capability (e.g., GSM, CDMA, Wi-Fi, or the like), first acknowledgment information to the mobile device 150. In some implementations, the first acknowledgment information acknowledges that the server 130 received the first transaction information. In some implementations, the first acknowledgment information includes the user ID, the module ID, the transaction ID, and (optionally) the authorization grant included in the transaction information (e.g., auth grant 1158, FIG. 24D).

After receiving the first acknowledgement information, the mobile device 150 sends (1214), via a short-range communication capability (e.g., BLE), the first acknowledgment information to the payment module 100.

After receiving the first acknowledgment information, the payment module 100 deletes (1216) the stored first transaction information.

Peripheral Expansion and Routing

Figure 26:
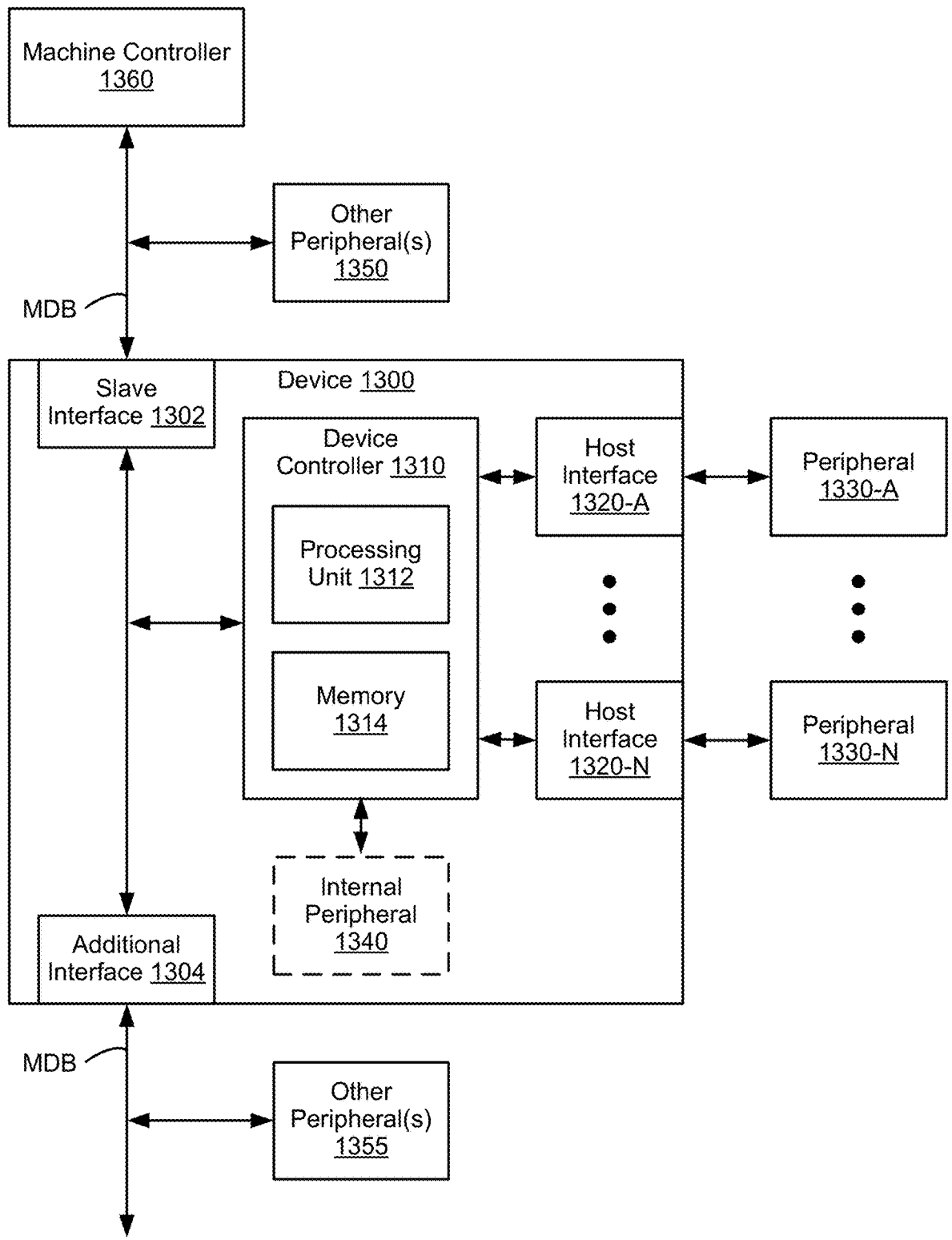
FIG. 26 is a block diagram of a device for retrofitting a payment accepting unit (e.g., machine 120) to accommodate a plurality of payment peripherals in accordance with some implementations.

FIG. 26 is a block diagram of an electronic device 1300 for retrofitting a machine 120 (also referred to herein as a payment accepting unit, vending machine, or retail machine) to accommodate a plurality of electronic peripheral devices 1330 (also referred to herein as peripherals) in accordance with some implementations. The device 1300 is similar to and adapted from adapter module 100 (also referred to herein as a payment module) as shown in FIG. 20 in that the device 1300 connects to a multi-drop bus (MDB) of a machine 120 and, optionally, provides the payment processing functionalities discussed in FIGS. 7, 8A-8G, 9A-9E, and 23 (e.g., via the internal peripheral 1340).

In some implementations, during normal operation, the machine 120 includes a multi-drop bus (MDB) connecting a machine controller 1360 (also referred to herein as a payment accepting unit controller) of the machine 120 with payment peripherals (e.g., other payment peripheral(s) 1350, 1355 including coin acceptors, bill acceptors, cashless payment devices such as a payment card reader, and/or the like). In some implementations, the device 1300 is connected in-line to the MDB as shown in FIGS. 17 and 18. In some implementations, the MDB protocol or the machine 120 is configured to support a limited number of payment peripherals or does not support particular payment peripherals. For example, in some circumstances, the machine 120 supports a maximum of two cashless payment devices, or the machine 120 only supports a bill acceptor and a coin acceptor but not cashless payment devices or other payment peripherals. The device 1300 expands the number of payment peripherals connected to the machine 120 beyond this limited number and enables support for a plurality of payment peripherals, which may or may not be compliant with the machine 120 and/or the MDB protocol.

In FIG. 26, the device 1300 is configured (i) to perform as a virtual payment peripheral of the machine controller 1360 of the machine 120 and (ii) to perform as a virtual machine controller (also referred to herein as a master, or a virtual master) for the one or more payment peripherals 1330. As such, in some implementations, the machine controller 1360 views the device 1300 as another payment peripheral connected to the MDB, where the device 1300 sends signals to the machine controller 1360 in a manner as if originated by a peripheral 1330. In some implementations, sending a signal to the machine controller 1360 in a manner as if originated by a peripheral 1330 includes labeling the signal, or including a label with the signal, wherein the label includes the peripheral device's registration information and/or identification information (e.g., an address of the peripheral device). Stated another way, the device 1300 identifies itself to the machine controller 1360 as a peripheral 1330 by using the peripheral device's registration or identification information. Moreover, in some implementations, the one or more payment peripherals 1330 view the device 1300 as the machine controller 1360, where signals are sent to the one or more payment peripherals 1330 in a manner as if originated by the machine controller 1360. In some implementations, sending a signal to a peripheral 1330 in a manner as if originated by the machine controller 1360 includes labeling the signal, or including a label with the signal, wherein the label includes the machine controller's identification information (e.g., an address of the machine controller). Stated another way, the device 1300 identifies itself to the peripheral device(s) 1330 as a machine controller 1360 by using the machine controller's identification information. To accomplish this, the device 1300 (in its role as a virtual machine controller) manages and hosts the one or more payment peripherals 1330. Additionally, the device 1300 translates addresses and modifies the communications as necessary to ensure the machine controller 1360 understands the traffic that is coming through to it as a singular virtual payment peripheral.

In FIG. 26, the device 1300 includes a slave interface 1302 (e.g., the male adapter 720, FIG. 20) and an additional interface 1304 (e.g., the female adapter 730, FIG. 20) for connecting the device 1300 to the MDB. The device 1300 also includes a device controller 1310 with a processing unit 1312 (e.g., including one or more processors, cores, microcontrollers, microprocessors, or the like) and memory 1314 storing one or more programs for execution by the processing unit 1312. In some implementations, the one or more programs cause the device 1300 to perform as a virtual payment peripheral of the machine controller 1360 and to perform as a virtual machine controller for the one or more payment peripherals 1330. In FIG. 26, the device 1300 also includes one or more host interfaces 1320 (e.g., MDB ports or non-MDB ports) for connecting the device 1300 with one or more payment peripherals 1330 (e.g., payment peripherals 1330-A to 1330-N).

In some implementations, the machine 120 further includes one or more other payment peripherals 1350, 1355 coupled with the MDB. Example payment peripherals of the one or more other payment peripherals include a bill acceptor, coin acceptor, or payment card reader. In these implementations, the device 1300 further includes an additional interface 1304 configured to couple the device with the one or more other payment peripherals 1355 of the machine. For example, with reference to FIG. 26, the other payment peripheral(s) 1350 (e.g., acceptors, coin acceptors, payment card readers, etc.) are connected to the MDB before the device 1300 (e.g., prior to the slave interface 1302) and the other payment peripheral(s) 1355 (e.g., acceptors, coin acceptors, payment card readers, etc.) are connected to the MDB after the device 1300 (e.g., after the additional interface 1304).

In some implementations, the device 1300 further includes a pass-through channel configured to pass through signals from the one or more other payment peripherals 1355 to the machine controller 1360. For example, with reference to FIG. 26, the device 1300 includes a pass-through channel to enable signals from the machine controller 1360 to reach the other payment peripheral(s) 1355 and to enable signals from the other payment peripheral(s) 1355 to reach the machine controller 1360.

In some implementations, the device 1300 optionally includes an internal payment peripheral 1340 with hardware, software, firmware, or a combination thereof for providing one or more of the payment processing functionalities described above with reference to FIGS. 7, 8A-8G, 9A-9E, and 23 (e.g., including the security unit 755 and the communications unit 770 shown in FIG. 20).

Figure 27:
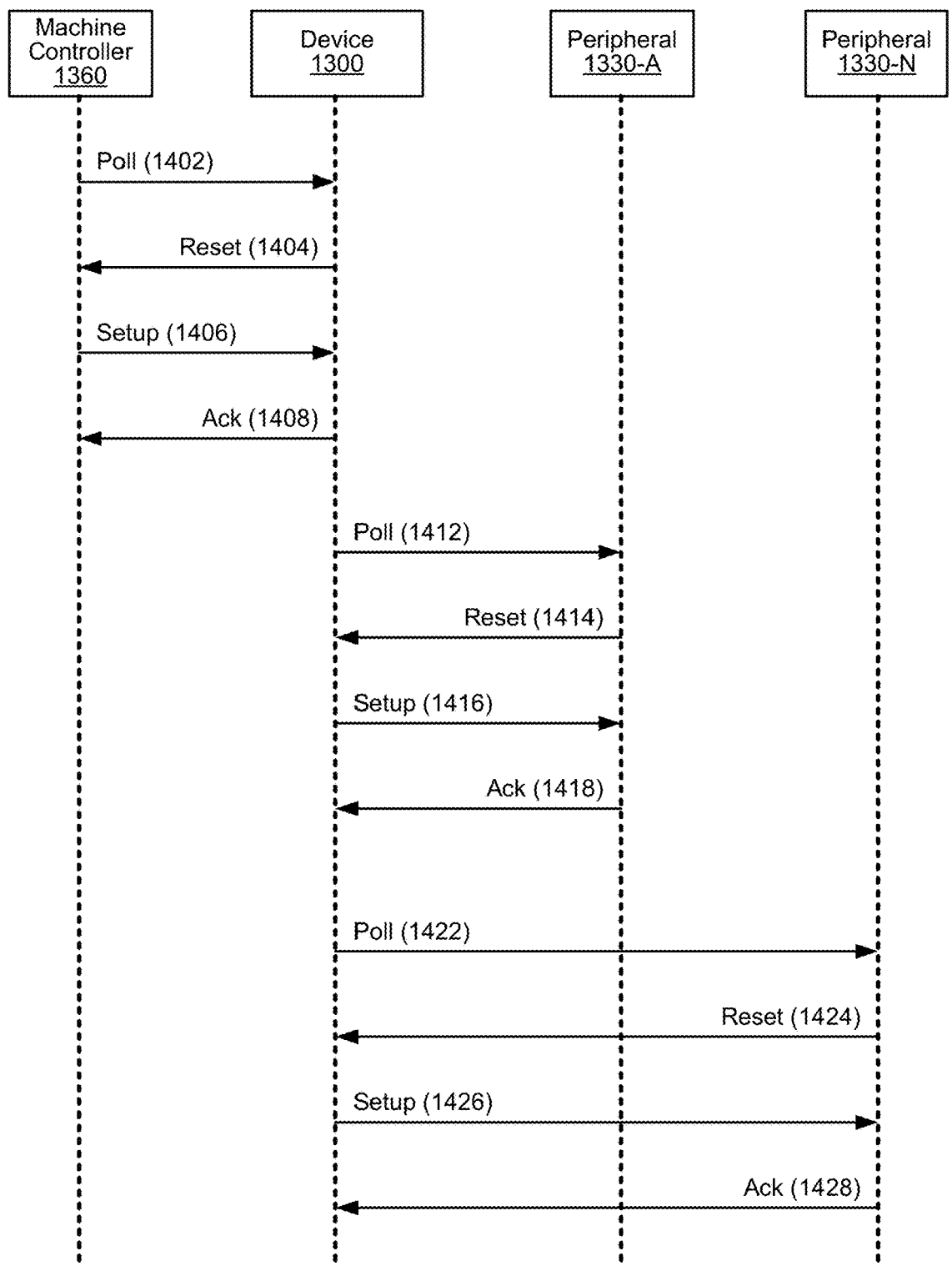
FIG. 27 is a schematic flow diagram of a payment peripheral registration process in accordance with some implementations.

FIG. 27 illustrates a schematic flow diagram of a payment peripheral registration process 1400 in accordance with some implementations. As a result of process 1400, the device 1300 is registered as a slave (e.g., as a payment peripheral) to the machine controller 1360, and the payment peripheral(s) 1330 are registered as slaves to the device 1300, for example, in accordance with MDB protocol. Stated another way, the device 1300 acts (i) as a slave to the machine controller 1360 (e.g., with respect to operations 1402-1408), and (ii) as a master (machine controller) to the payment peripheral(s) 1330 (e.g., with respect to operations 1412-1428).

In some implementations, the machine controller 1360 (FIG. 26) polls (1402) the device 1300. For example, the machine controller 1360 sends a poll command to the device 1300.

In some implementations, in response to the poll command, the device 1300 sends (1404) a reset signal to the machine controller 1360. For example, the device 1300 sends the reset signal to the machine controller 1360 if the device 1300 has not yet been registered as a slave (e.g., a payment peripheral). In another example, the device 1300 sends the reset signal to re-register itself as a slave. In some implementations, the device 1300 identifies itself as a coin acceptor, a bill acceptor, or a cashless payment device to the machine controller 1360 via the reset signal.

In some implementations, in response to the reset signal, the machine controller 1360 sends (1406) a setup signal to the device 1300. In some implementations, the setup signal includes an address assigned to the device 1300.

In some implementations, after receiving and processing the setup signal, the device 1300 sends (1408) an acknowledgement to the machine controller 1360 confirming registration as a slave.

Upon sending the acknowledgement, the device 1300 has been registered as a slave (e.g., a payment peripheral) to the machine controller 1360.

In some implementations, the device 1300 polls (1412) the payment peripheral 1330-A.

In some implementations, in response to the poll command, the payment peripheral 1330-A sends (1414) a reset signal to the device 1300. For example, the payment peripheral 1330-A sends the reset signal to the device 1300 if it has not yet been registered as a slave (e.g., a payment peripheral) to the device 1300. In another example, the payment peripheral 1330-A sends the reset signal to re-register itself as a slave. In some implementations, the payment peripheral 1330-A identifies itself as a coin acceptor, a bill acceptor, or a cashless payment device to the device 1300 via the reset signal.

In some implementations, in response to the reset signal, the device 1300 sends (1416) a setup signal to the payment peripheral 1330-A. In some implementations, the setup signal includes an address assigned to the payment peripheral 1330-A.

In some implementations, after receiving and processing the setup signal, the payment peripheral 1330-A sends (1418) an acknowledgement to device 1300 confirming registration as a slave.

In some implementations, the device 1300 polls (1422) the payment peripheral 1330-N.

In some implementations, in response to the poll command, the payment peripheral 1330-N sends (1424) a reset signal to the device 1300. For example, the payment peripheral 1330-N sends the reset signal to the device 1300 if it has not yet been registered as a slave (e.g., a payment peripheral). In another example, the payment peripheral 1330-N sends the reset signal to re-register itself as a slave. In some implementations, the payment peripheral 1330-N identifies itself as a coin acceptor, a bill acceptor, or a cashless payment device to the device 1300 via the reset signal.

In some implementations, in response to the reset signal, the device 1300 sends (1426) a setup signal to the payment peripheral 1330-N. In some implementations, the setup signal includes an address assigned to the payment peripheral 1330-N.

In some implementations, after receiving and processing the setup signal, the payment peripheral 1330-N sends (1428) an acknowledgement to the device 1300 confirming registration as a slave.

Figure 28A:
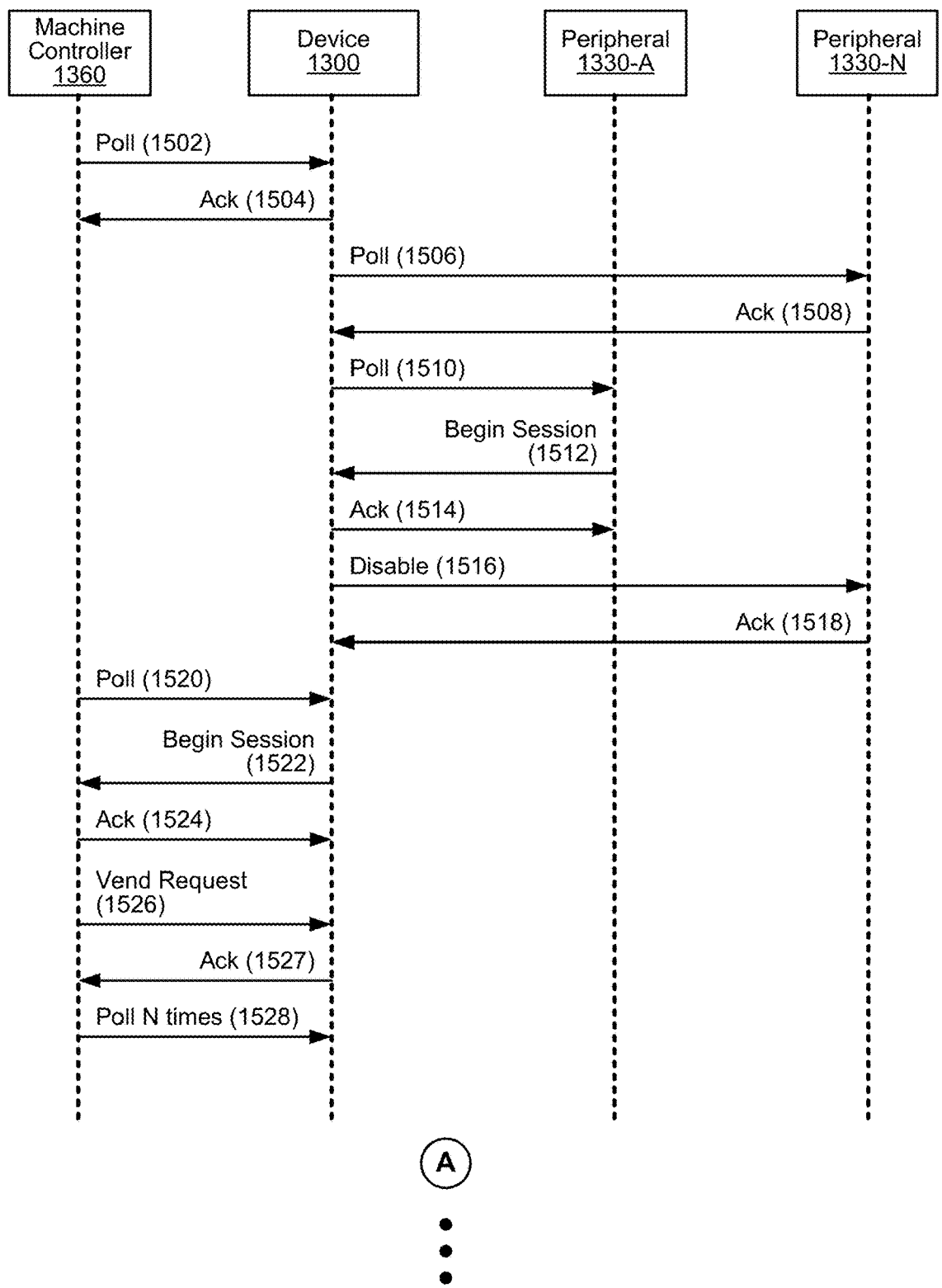
FIGS. 28A-28B illustrate a schematic flow diagram of a payment process in accordance with some implementations.
Figure 28B:
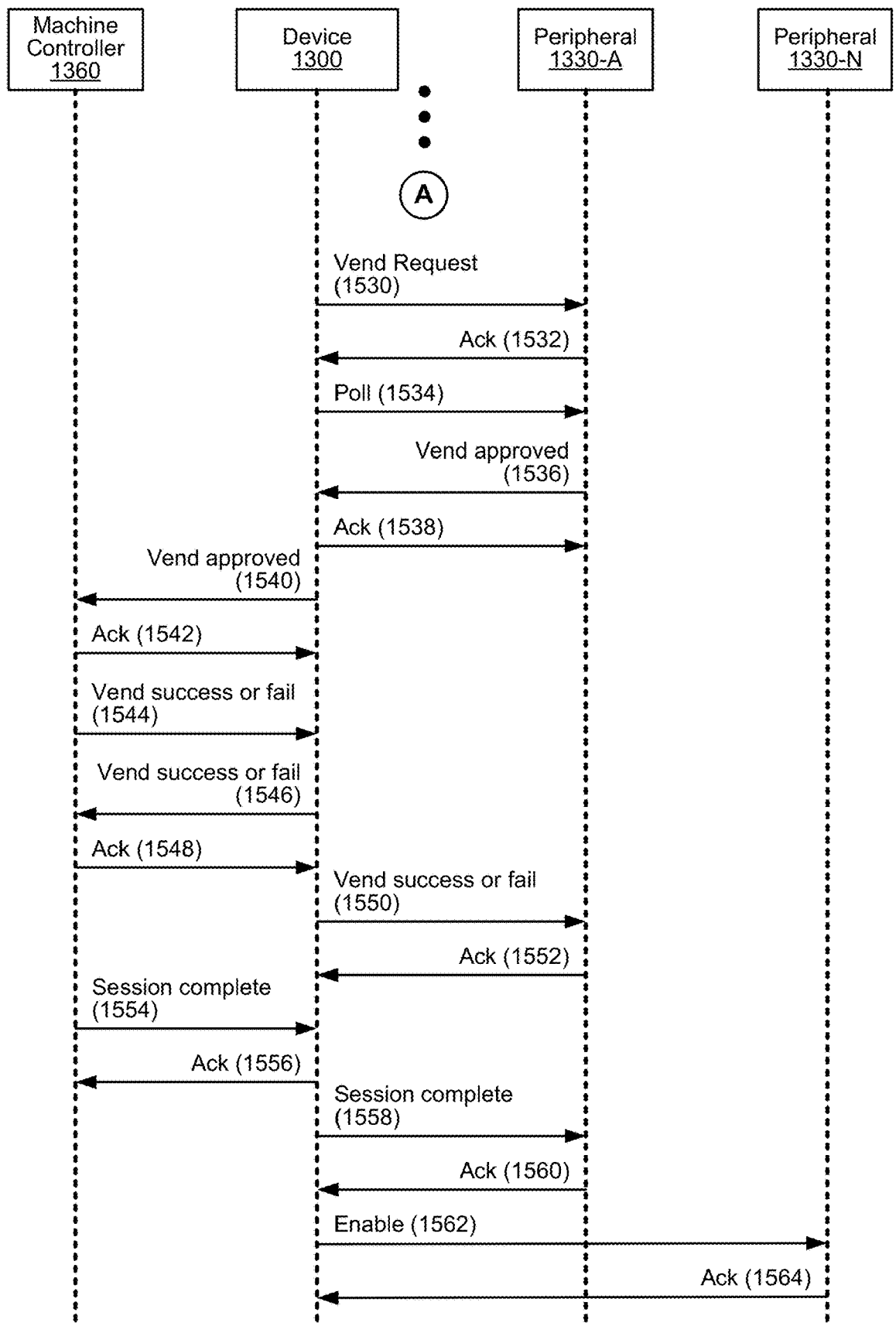

FIGS. 28A-28B illustrate a schematic flow diagram of a payment process 1500 in accordance with some implementations. In some implementations, (i) the device 1300 has already been registered as a slave (e.g., a payment peripheral) to the machine controller 1360, and (ii) the payment peripherals 1330-A, 1330-N have already been registered as slaves (e.g., as payment peripherals) to the device 1300 according to process 1400 (FIG. 27). Stated another way, the device 1300 acts (i) as a slave to the machine controller 1360 (e.g., with respect to operations 1502-1504, 1520-1528, 1540-1548, and 1554-1556), and (ii) as a master (machine controller) to the payment peripheral(s) 1330 (e.g., with respect to operations 1506-1518, 1530-1538, 1550-1552, and 1558-1564).

In some implementations, the machine controller 1360 polls the device 1300, along with other payment peripherals connected to the MDB and registered as slaves (e.g., other payment peripherals 1350, 1355 (FIG. 26)), according to a predetermined time period (e.g., 5 ms). For example, the predetermined time period is assigned by the MDB protocol or specification (e.g., versions 1.0 to 3.0 or higher), which is incorporated herein by reference in its entirety. In response to the poll commands, all slave devices (e.g., at least including the device 1300) respond with an acknowledgment (e.g., indicating that it is still present on the MDB) or with another signal (e.g., indicating another state). In some implementations, in response to a command from the machine controller 1360, the device 1300 immediately responds to the command and asynchronously relays the command to at least one of the payment peripheral(s) 1330.

In some implementations, in a manner similar to the machine controller 1360, the device 1300 also polls the payment peripheral(s) 1330 according to the predetermined time period (e.g., 5 ms). For example, the device 1300 polls the payment peripheral(s) 1330 whenever the device 1300 is polled by the machine controller 1360.

In some implementations, the machine controller 1360 polls (1502) the device 1300.

In response to the polling command in operation 1502, the device 1300 sends (1504) an acknowledgment to the machine controller 1360.

In response to or independent of the polling command in operation 1502, the device 1300 polls (1506) the payment peripheral 1330-N. In response to the polling command in operation 1506, the payment peripheral 1330-N sends (1508) an acknowledgment to the device 1300.

In response to or independent of the polling command in operation 1502, the device 1300 polls (1510) the payment peripheral 1330-A. In response to the polling command in operation 1510, the payment peripheral 1330-A sends (1512) a request to begin a payment session. For example, the request to begin the payment session is sent in response to a user inserting payment (e.g., a bill(s) or coin(s)) into the payment peripheral 1330-A prior to the polling command in operation 1510.

In response to the request to begin the payment session, the device 1300 sends (1514) an acknowledgment to the payment peripheral 1330-A.

In response to the request to begin the payment session, the device 1300 also sends (1516) a disable command to the payment peripheral 1330-N so as to disable the payment peripheral 1330-N while processing the payment session for the payment peripheral 1330-A. In response to the disable command, the payment peripheral 1330-N sends (1518) an acknowledgment to the device 1300.

The machine controller 1360 polls (1520) the device 1300.

In response to the polling command in operation 1520, the device 1300 sends (1522) a request to begin a payment session to the machine controller 1360. For example, the request to begin the payment session (sent to the machine controller 1360 in operation 1522) mirrors the request to begin the payment session (received from the payment peripheral 1330-A in operation 1512).

In response to the request to begin the payment session in operation 1522, the machine controller 1360 sends (1524) an acknowledgement to the device 1300 and also sends (1526) a vend request to the device 1300. In process 1500, vending of a service or product is taken as a non-limiting example.

In response to receiving the vend request, the device 1300 sends (1527) an acknowledgment to the machine controller 1360.

In some implementations, the machine controller 1360 polls (1528) the device 1300 N times prior to the device 1300 sending a vend approved signal in operation 1540. In some implementations, the device 1300 responds to the N polling commands with acknowledgments indicating that the device 1300 is still present and processing the vend request.

In response to receiving the vend request in operation 1526, the device 1300 relays (1530) the vend request to the payment peripheral 1330-A.

In response to the vend request in operation 1530, the payment peripheral 1330-A sends (1532) an acknowledgement to the device 1300.

Subsequently, the device 1300 polls (1534) the payment peripheral 1330-A. In response to the polling command in operation 1534, the payment peripheral 1330-A sends (1536) a vend approved signal to the device 1300. For example, the vend approved signal indicates that the payment inserted by the user was not refunded and was used to purchase a service or product.

In response to receiving the vend approved signal in operation 1536, the device 1300 sends (1538) an acknowledgment to the payment peripheral 1330-A and also relays (1540) the vend approved signal to the machine controller 1360.

In response to receiving the vend approved signal in operation 1540, the machine controller 1360 sends (1542) an acknowledgment to the device 1300 and also sends (1544) a request to the device 1300 to indicate whether the vend was a success or a failure.

In response to receiving the request in operation 1544, the device 1300 sends (1546) a response to the machine controller 1360 indicating that the vend was a success or a failure and also relays (1550) the request to the payment peripheral 1330-A to indicate whether the vend was a success or a failure.

In response to the request in operation 1550, the payment peripheral 1330-A sends (1552) an acknowledgement to the device 1300.

In response to receiving the response in operation 1546, the machine controller 1360 sends (1548) an acknowledgement to the device 1300 and also sends (1554) a command to end the payment session to the device 1300.

In response to receiving the command to end the payment session in operation 1554, the device 1300 sends (1556) an acknowledgment to the machine controller 1360 and relays (1558) the command to end the payment session to the payment peripheral 1330-A.

In response to the command to end the payment session in operation 1558, the payment peripheral 1330-A sends (1560) an acknowledgment to the device 1300.

After receiving the acknowledgment from the payment peripheral 1330-A in operation 1560, the device 1300 sends (1562) an enable command to the payment peripheral 1330-N so as to enable the payment peripheral 1330-N after completion of the payment session for the payment peripheral 1330-A. In response to the enable command received in operation 1562, the payment peripheral 1330-N sends (1564) an acknowledgment to the device 1300.

Figure 29:
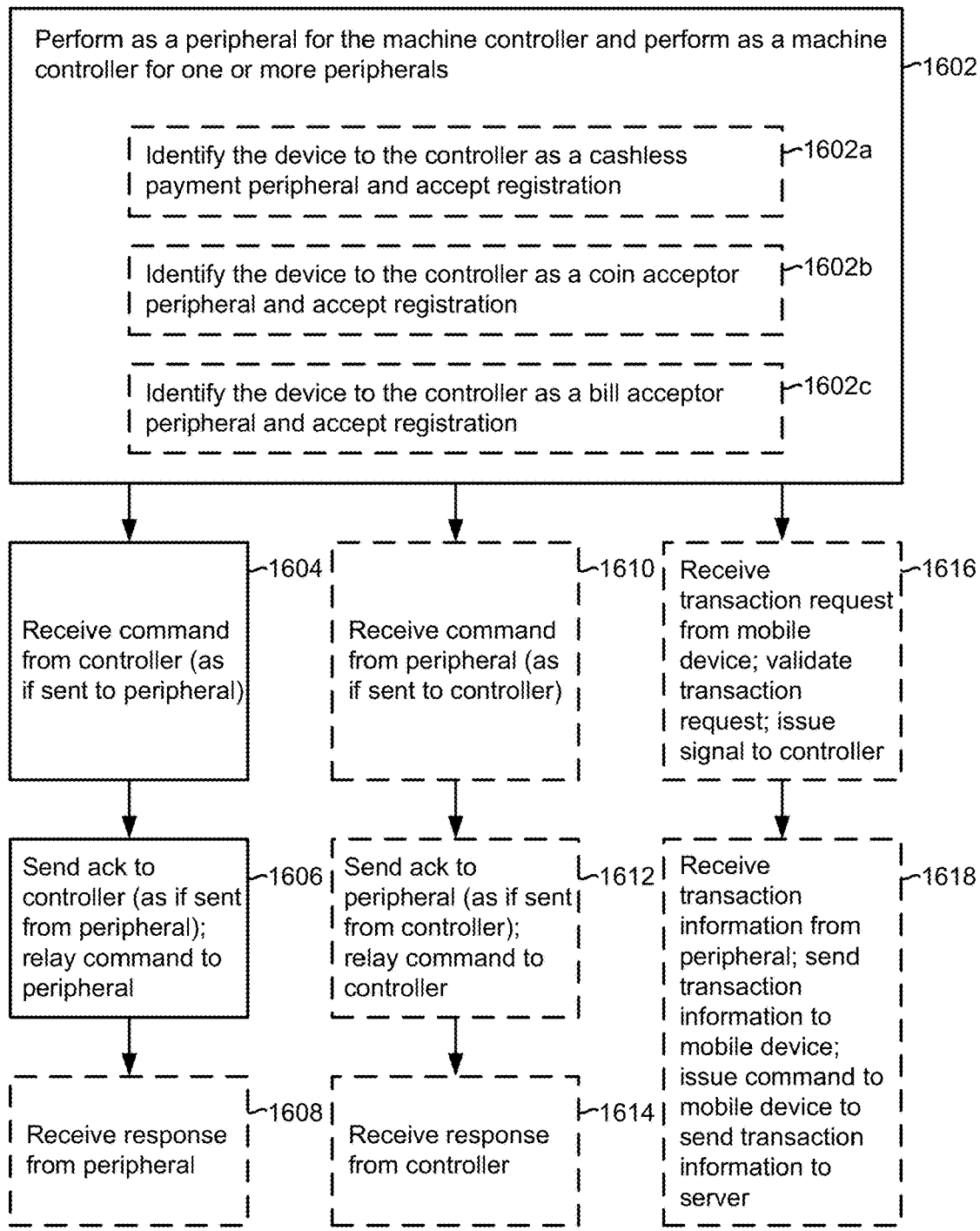
FIG. 29 illustrates a flowchart diagram of a method of retrofitting a payment accepting unit to accommodate a plurality of payment peripherals in accordance with some implementations.

FIG. 29 illustrates a flowchart diagram of a method 1600 of retrofitting a machine controller 1360 (also referred to herein as a payment accepting unit; vending machine; retail machine; and/or a processor or controller of a payment accepting unit, vending machine, or retail machine) to accommodate a plurality of payment peripherals 1330 (also referred to herein as electronic peripheral devices, peripheral devices, or peripherals) in accordance with some implementations. In some implementations, the method 1600 is performed at a device controller 1310 of an electronic device 1300 with one or more processing units 1312 (processors), memory 1314, a slave interface 1302 configured to couple the device 1300 with the machine controller 1360 via a multi-drop bus (MDB), and one or more host interfaces 1320 configured to couple the device 1300 with one or more payment peripherals 1330 (e.g., a coin acceptor, a bill acceptor, a cashless payment device such as a payment card reader, and the like), where a respective payment peripheral 1330 is decoupled from an MDB interface of the machine controller 1360 and coupled with a respective host interface 1320, and where the payment peripheral(s) 1330 are configured to communicate via MDB protocol. For example, in some implementations, the method 1600 is performed by the device 1300 or a component thereof (e.g., device controller 1310). In some implementations, the method 1600 is governed by instructions that are stored in a non-transitory computer readable storage medium (e.g., memory 1314) and the instructions are executed by one or more processors (e.g., processing unit(s) 1312) of the device. Optional operations are indicated by dashed lines (e.g., boxes with dashed-line borders).

The device 1300 performs (1602) as a virtual payment peripheral (slave) for the machine controller 1360 by registering itself as a slave to the machine controller 1360, and the device 1300 performs as a virtual machine controller (master) for the one or more payment peripherals 1330 by registering the one or more payment peripherals 1330 as slaves to the device 1300 using the MDB protocol. In some implementations, the MDB protocol supports a limited number of payment peripherals 1330. The device 1300 expands the number of payment peripherals 1330 that can be connected to the machine controller 1360 beyond this limited number by (i) emulating the machine controller 1360 to the payment peripheral(s) 1330 coupled with the host interface(s) 1320 and (ii) emulating a payment peripheral 1330 to the machine controller 1360. As such, in some implementations, the machine controller 1360 views the device 1300 as another payment peripheral 1330 connected to the MDB, where the device 1300 sends signals to the machine controller 1360 in a manner as if originated by the device 1300 that is functioning as a singular virtual payment peripheral 1330 (in other words, in a manner as if originated by a payment peripheral 1330). Moreover, in some implementations, the payment peripheral(s) 1330 view the device 1300 as the machine controller 1360, where the device 1300 sends signals to the payment peripheral(s) 1330 in a manner as if originated by the machine controller 1360.

In some implementations, registering the device 1300 as a slave to the machine controller 1360 further comprises (1602*a*): identifying the device 1300 to the machine controller 1360 as a cashless payment peripheral; and accepting registration of the device 1300 with the machine controller 1360 as a cashless payment peripheral. For example, the device 1300 identifies itself to the machine controller 1360 as a cashless payment device (e.g., a payment card reader) when sending the reset signal to the machine controller 1360 in operation 1404, and the device 1300 accepts registration as a cashless payment device when receiving the setup signal from the machine controller 1360 in operation 1406 (see FIG. 27).

In some implementations, registering the device 1300 as a slave to the machine controller 1360 further comprises (1602*b*): identifying the device 1300 to the machine controller 1360 as a coin acceptor peripheral; and accepting registration of the device 1300 with the machine controller 1360 as a coin acceptor peripheral. For example, the device 1300 identifies itself to the machine controller 1360 as a coin acceptor when sending the reset signal to the machine controller 1360 in operation 1404, and the device 1300 accepts registration as a coin acceptor when receiving the setup signal from the machine controller 1360 in operation 1406 (see FIG. 27).

In some implementations, registering the device 1300 as a slave to the machine controller 1360 further comprises (1602*c*): identifying the device 1300 to the machine controller 1360 as a bill acceptor peripheral; and accepting registration of the device 1300 with the machine controller 1360 as a bill acceptor peripheral. For example, the device 1300 identifies itself to the machine controller 1360 as a bill acceptor/validator when sending the reset signal to the machine controller 1360 in operation 1404, and the device 1300 accepts registration as a bill acceptor/validator when receiving the setup signal from the machine controller 1360 in operation 1406 (see FIG. 27).

The device 1300 receives (1604) a command (in the form of a signal) from the machine controller 1360 via the slave interface 1302, where signals from the machine controller 1360 are sent in a manner as if sent to a singular payment peripheral 1330. For example, with reference to process 1500, the machine controller 1360 sends a command to the device 1300 to end the payment session in operation 1554 (see FIG. 28B).

In response to receiving the command from the machine controller 1360, the device 1300 sends (1604) an acknowledgement to the command to the machine controller 1360 via the slave interface 1302, where signals are sent to the machine controller 1360 in a manner as if originated by the device 1300 that is functioning as a singular virtual payment peripheral 1330 (in other words, as if originated by a payment peripheral 1330); and relays the command to the respective payment peripheral 1330 via the respective host interface 1320 corresponding to the respective payment peripheral 1330, where the device 1300 sends signals to and receives signals from the machine controller 1360 asynchronous of the device 1300 sending signals to and receiving signals from the one or more payment peripherals 1330 (in other words, communications between the device 1300 and the machine controller 1360 are not necessarily synchronized to communications between the device 1300 and the payment peripheral(s) 1330). Continuing with the example above, with reference to process 1500, in response to receiving the command to end the payment session in operation 1554, the device 1300 sends an acknowledgment to the machine controller 1360 in operation 1556 in a manner as if originated by the device that is functioning as a singular virtual payment peripheral 1330 (in other words, in a manner as if originated by the payment peripheral 1330). Continuing with this example, in response to receiving the command to end the payment session in operation 1554, the device 1300 also asynchronously relays the command to end the payment session to the payment peripheral 1330-A in operation 1558. As such, the command is relayed to the payment peripheral 1330-A asynchronous of sending the acknowledgment to the machine controller 1360 (in other words, the signals 1556 and 1558 are not necessarily synchronized).

In some implementations, in response to relaying the command, the device 1300 receives (1608) via the respective host interface 1320 corresponding to the respective payment peripheral 1330 a response from the respective payment peripheral 1330. Continuing with the example above, with reference to process 1500, in response to the relayed complete session command in operation 1558, the payment peripheral 1330-A sends an acknowledgment to the device 1300 in operation 1560.

In some implementations, in response to receiving the response from the respective payment peripheral 1330, the device 1300: sends an acknowledgement to the respective payment peripheral 1330, where signals are sent to the one or more payment peripherals 1330 in a manner as if originated by the machine controller 1360; and relays the response to the machine controller 1360 via the slave interface 1302, where the device 1300 sends signals to and receives signals from the machine controller 1360 asynchronous of the device sending signals to and receiving signals from the one or more payment peripherals 1330 (in other words, communications between the device 1300 and the machine controller 1360 are not necessarily synchronized to communications between the device 1300 and the payment peripheral(s) 1330). In some implementations, in response to receiving the response from the respective payment peripheral 1330, the device forgoes the above steps (e.g., the device 1300 does not relay the acknowledgement 1560 to the machine controller 1360 because the device 1300 had already acknowledged the machine controller 1360's session complete command in operation 1556).

In some implementations, the device 1300 receives (1610) a command from a respective payment peripheral 1330 via the respective host interface 1320 corresponding to the respective payment peripheral 1330, where signals from the payment peripheral(s) 1330 are sent to the device 1300 in a manner as if sent to the machine controller 1360, and, in response to receiving the command from the respective payment peripheral 1330, the device 1300 sends (1612) an acknowledgement to the command to the respective payment peripheral 1330, where signals are sent from the device 1300 to the payment peripheral(s) 1330 in a manner as if originated by the machine controller 1360; and relays the command to the machine controller 1360 via the slave interface 1302, where the device 1300 sends signals to and receives signals from the machine controller 1360 asynchronous of the device 1300 sending signals to and receiving signals from the payment peripheral(s) 1330 (in other words, communications between the device 1300 and the machine controller 1360 are not necessarily synchronized to communications between the device 1300 and the payment peripheral(s) 1330). For example, with reference to process 1500, when polled in operation 1534, the payment peripheral 1330-A sends a vend approved signal to the device 1300 in a manner as if sent to the machine controller 1360 in operation 1536. Continuing with this example, in response to receiving the vend approved signal in operation 1536, the device 1300 sends an acknowledgement to the payment peripheral 1330-A in a manner as if originated by the machine controller 1360 in operation 1538. Continuing with this example, in response to receiving the vend approved signal in operation 1536, the device 1300 also asynchronously relays the vend approved signal to the machine controller 1360 in operation 1540. As such, the command is relayed to the machine controller 1360 asynchronous of sending the acknowledgment to the payment peripheral 1330-A (in other words, the signals 1538 and 1540 are not necessarily synchronized).

In some implementations, in response to relaying the command, the device 1300 receives (1614) via the slave interface 1302 a response from the machine controller 1360. Continuing with the example above, with reference to process 1500, in response to the relayed vend approved signal in operation 1540, the machine controller 1360 sends an acknowledgment to the device 1300 in operation 1542.

In some implementations, the device 1300 further includes an internal payment peripheral 1340 including a short-range communication capability corresponding to a short-range communication protocol, where the short-range communication capability is configured to communicate with one or more mobile devices, and where each of the one or more mobile devices is configured with (i) a complimentary short-range communication capability and (ii) a long-range communication capability corresponding to a long-range communication protocol. For example, with reference to FIG. 26, the device 1300 includes the internal payment peripheral 1340 which includes hardware, software, firmware, or a combination thereof for providing the payment processing functionalities discussed in FIGS. 7, 8A-8G, 9A-9E, and 23 (e.g., the security unit 755 and the communications unit 770 as shown in FIG. 20). For example, the respective mobile device corresponds to mobile device 150 (FIG. 21) with long-range communication capability 872 and short-range communication capability 876.

In some implementations, the device 1300 receives (1616) a transaction request via the short-range communication capability from a respective mobile device to perform a transaction with the machine controller 1360, the device 1300 validates the transaction request, where validation of the transaction request indicates that the respective mobile device is authorized to initiate payment for the transaction by a remote server via the respective mobile device's long-range communication capability, and, in accordance with a determination that the transaction request is valid, the device 1300 causes the machine controller 1360 to perform the requested transaction by, for example, issuing a signal to perform the transaction to the machine controller 1360 via the slave interface 1302. In some implementations, the device 1300 or a component thereof (e.g., internal payment peripheral 1340, FIG. 26) receives a transaction request via the short-range communication capability (e.g., BLE, NFC, or the like) from the respective mobile device 150 (FIGS. 7, 8A-8G, 9A-9E, and 21), and the device 1300 or a component thereof (e.g., internal payment peripheral 1340, FIG. 26; or the device controller 1310, FIG. 26) validates the transaction request from the respective mobile device 150 by determining whether an AuthGrant or authorization grant token associated with the transaction request includes a valid authorization code. In some implementations, in accordance with a determination that the transaction request is associated with a valid authorization code, the device 1300 or a component thereof (e.g., internal payment peripheral 1340, FIG. 26; or the device controller 1310, FIG. 26) issues a command to the machine controller 1360 to perform the requested transaction via the slave interface 1302 in a manner as if originated by the device 1300 that is functioning as a singular virtual payment peripheral 1330 or 1340 (in other words, in a manner as if originated by a payment peripheral 1330 or 1340).

In some implementations, in accordance with a determination that a command received from the respective payment peripheral 1330 corresponds to a transaction, the device 1300 stores (1618) transaction information at least including an amount of the transaction associated with an identifier for the respective payment peripheral 1330; after storing the transaction information, the device 1300 sends the transaction information to the respective mobile device via the short-range communication capability; and issues a command to the respective mobile device to send the transaction information to the remote server via the respective mobile device's long-range communication capability.

In some implementations, the device 1300 or a component thereof (e.g., the internal payment peripheral 1340, FIG. 26; or the device controller 1310, FIG. 26) monitors commands and signals from the one or more payment peripherals 1330 that are relayed to the machine controller 1360 and, in accordance with a determination that a command or signal is associated with a transaction, stores transaction information such as the transaction amount and the respective payment peripheral 1330 associated with the transaction. For example, the device 1300 stores transaction information for each of the one or more payment peripherals 1330 in a table that associates the transaction information with a payment peripheral type (e.g., bill acceptor, coin acceptor, payment card reader, etc.). In some implementations, the device 1300 or a component thereof (e.g., the internal payment peripheral 1340, FIG. 26; or the device controller 1310, FIG. 26) sends the table of transaction information or a portion thereof to the respective mobile device 150 that sent the transaction request (or another mobile device 150 that performs a transaction with the device 1300) via the short-range communication capability. In some implementations, the device 1300 or a component thereof (e.g., the internal payment peripheral 1340, FIG. 26; or the device controller 1310, FIG. 26) commands the respective mobile device 150 to send the table of transaction information or the portion thereof to the server 130 via the mobile device's long-range communication capability. As such, the device 1300 uses the respective mobile device 150 as a communication bridge to the server 130.

In some implementations, the device 1300 or a component thereof (e.g., the internal payment peripheral 1340, FIG. 26; or the device controller 1310, FIG. 26) also monitors the commands and signals from the one or more payment peripherals 1330 that are relayed to the machine controller 1360 and, in accordance with a determination that a command or signal is associated with an error code (e.g., a coin jam, low coin or bill count, etc.) or other information associated with the operation of the one or more payment peripherals 1330, stores corresponding operation information. In some implementations, the device 1300 also sends the operation information along with the table of transaction information or the portion thereof to the server 130 using the respective mobile device 150 as a communication bridge to the server 130.

The particular order in which the operations in FIG. 29 have been described is merely exemplary and is not intended to indicate the only order in which the operations could be performed. One of ordinary skill in the art would recognize various ways to reorder the operations described herein. Additionally, details of other processes described herein with respect to other methods described herein are also applicable in an analogous manner to the method 1600 described above with respect to FIG. 29.

Providing External Access to Peripherals

In some implementations, the electronic device 1300 receives, from a mobile device 150 via the short-range communication capability of the internal peripheral 1340, a request to access one or more of the peripherals 1330. In response to this request, the device 1300 intercepts signals received from peripheral(s) 1330 via respective host interface(s) 1320 (e.g., a payment signal reporting an amount of money received at a bill acceptor peripheral or a coin acceptor peripheral). Instead of relaying the signals to the machine controller 1360, the device 1300 relays the signals (or data based on the signals) to the mobile device 150 through the internal peripheral 1340. While the device 1300 is intercepting signals received from the peripheral(s) 1330 (i.e., relaying the signals to the internal peripheral 1340 instead of the machine controller 1360), the device 1300 responds to commands that are addressed to the peripheral(s) 1330 (e.g., poll commands sent from the machine controller 1360) with acknowledgements (e.g., merely reporting presence), rather than relaying the commands to the peripheral(s) 1330.

By intercepting signals as described herein, the device 1300 can provide external access to the peripheral(s) 1330 (also referred to as providing peripheral access to an external device). More specifically, the device 1300 may be configured to enable an external device (e.g., a mobile device 150, or any device that is physically external to the machine 120 and in communication with the device 1300) to access functionality provided by the peripheral(s) 1330 of the machine 120. As used herein, the term "access" may refer to provision of data based on functionality of a peripheral 1330, but does not require direct communication between the external device and the peripheral 1330 being accessed. By providing an external device with access to a peripheral 1330, the external device is provided with the benefit of functionality of the peripheral 1330. For example, if the peripheral 1330 is a bill collector, an external device with access to functionality of the bill collector may be provided with data indicating a state of the bill collector or any other data associated with functionality of the bill collector (e.g., an indication that the bill collector has just received a $1 bill).

In one example scenario, an application executing on a mobile device 150 in communication with the device 1300 may be provided access to a bill accepter peripheral 1330 of a machine 120, thereby providing a way for the application to accept cash payments. As such, capabilities of the mobile device 150 (and, therefore, applications executing on the mobile device 150) are augmented when given access to functionality provided by the peripheral(s) 1330 of a machine 120 as described herein. Such an application executing on a mobile device 150 (referred to herein as a mobile application) may be configured to sell products and/or services that are not necessarily stocked by the machine 120 of the peripheral 1330 being accessed, but benefit from the availability of the option to pay for the product and/or service with cash. For example, an application executing on a mobile device 150 may sell lottery tickets, which, according to the laws of some jurisdictions, can only be purchased using cash. Example products may include physical products that are available at a location associated with the machine 120 (e.g., provided by a store attendant or bank teller), or may include virtual products that are not required to be picked up or otherwise physically delivered (e.g., lottery tickets associated with virtual lottery applications that do not require delivery or use of a physical scratch card). Example services include banking (e.g., using a bill acceptor peripheral 1330 of a machine 120 to deposit cash to an account of a bank or credit union, regardless of whether the bank or credit union has a physical location), or any other service requiring or otherwise providing the option to deposit cash to an account (e.g., a gaming service with add-on functionality purchasable with cash, a peer-to-peer money transfer service enabling a sender to deposit cash into the bill acceptor of a machine 120 and a receiver to withdraw cash by accessing the cash return module of another machine 120, or any other service accepting cash payments). Such products and/or services may be related to products and/or services vended or advertised by the machine 120, or they may be independent of products and/or services vended or advertised by the machine 120 (e.g., functionality of the bill acceptor of a soda machine may be accessed by a mobile application selling lottery tickets, or functionality of the coin acceptor of a laundry machine may be accessed by a mobile gaming application configured to accept payments in return for in-game add-on features).

Figure 30A:
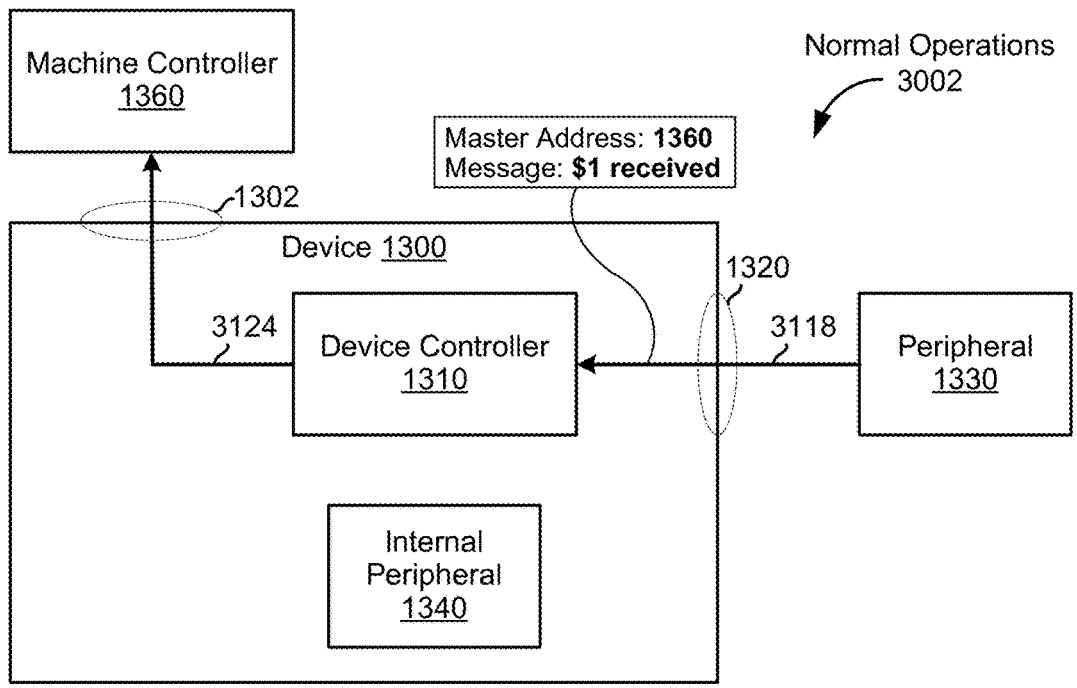
FIG. 30A-30B illustrate a block diagram of normal and intercept operations of a device for retrofitting a payment accepting unit (e.g., machine 120) to provide external access to an electronic peripheral device in accordance with some implementations.
Figure 30B:
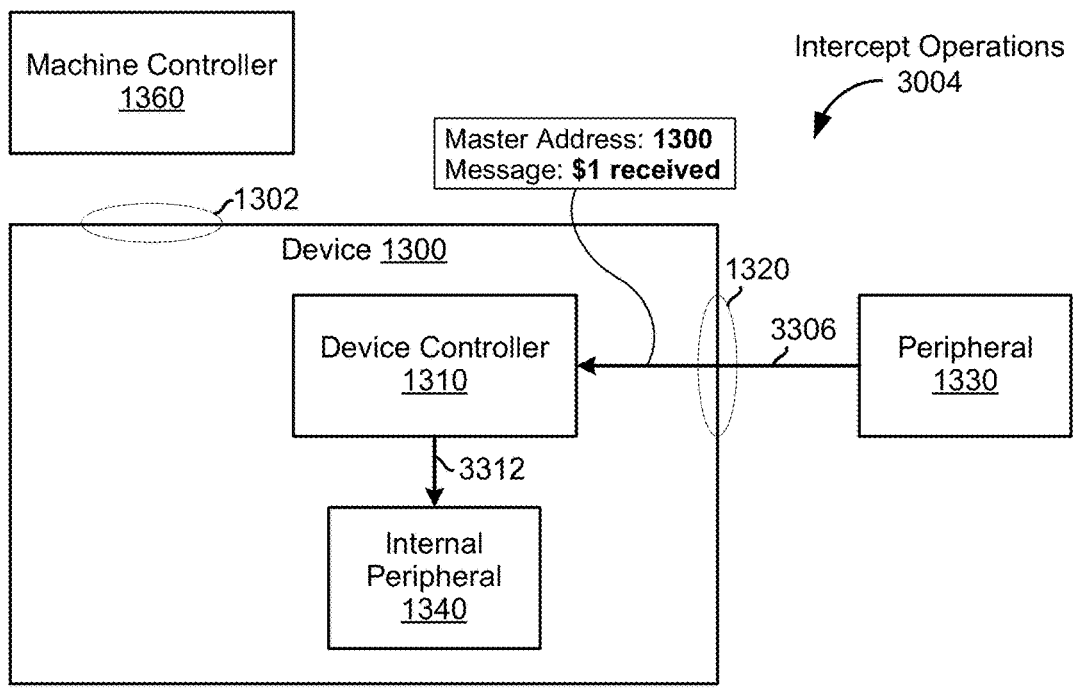

FIG. 30A-30B illustrate block diagrams of normal operations 3002 and intercept operations 3004 of a device 1300 for retrofitting a machine 120 to provide external access to an electronic peripheral 1330 in accordance with some implementations. The device 1300 and related components (1302-1360) correspond to similarly numbered features as described above with reference to FIG. 26, and some are not further discussed for purposes of brevity. Further, while some features depicted in FIG. 26 are not depicted in FIGS. 30A-30B (for purposes of clarity), each of the concepts described above with regard to FIGS. 26-29 equally apply to the implementations recited herein with regard to FIGS. 30A-30B, 31-34, and 35A-35B.

In FIG. 30A, the device 1300 is configured to relay signals between the machine controller 1360 and the peripheral 1330. For example, the device 1300 receives a payment received signal (3118) from the peripheral 1330 (e.g., upon receiving a $1 bill) and relays the signal (3124) to the machine controller 1360. Regarding polling in normal operations, the device 1300 is configured to respond to polls received from the machine controller 1360 and asynchronously send polls to the peripheral 1330. As described above with reference to FIGS. 28A-28B, the device 1300 responds to polls received from the machine controller 1360 based on poll responses received from the peripheral 1330. As such, while performing normal operations, the device 1300 acts as a signal router bridging the peripheral 1330 and the machine controller 1360 as described above with reference to FIGS. 28A-28B and as described in more detail below with reference to FIGS. 31-32.

In FIG. 30B, the device 1300 is configured to acknowledge signals received from the machine controller 1360 (e.g., acknowledge polls), but not relay those signals (or otherwise send any signals based on those received signals) to the peripheral 1330. Further, instead of relaying signals received from the peripheral 1330 (e.g., a payment received signal 3306) to the machine controller 1360, the device 1300 instead relays signals received from the peripheral 1330 (or sends signals based on the received signals, such as a transmit transaction signal 3312) to an external device (e.g., a mobile device 150) via the internal peripheral 1340. For example, the device 1300 receives a payment received signal 3306 from the peripheral 1330 (e.g., upon receiving a $1 bill), and relays the payment received signal 3306, or a signal based on the payment received signal (e.g., a transmit transaction signal 3312), to a mobile device 150 via the internal peripheral 1340. This disclosure refers to the operation of relaying a signal received from the peripheral 1330 to an external device, instead of to the machine controller 1360, as intercepting the signal, or as an intercept operation. While performing intercept operations, the device 1300 acts as a signal router bridging the peripheral 1330 and an external device (e.g., a mobile device 150) as described in more detail below with reference to FIG. 33-34.

In some implementations, signals received at the device controller 1310 include at least (i) a destination address, and (ii) message data. More specifically, signals received at the device 1300 from a peripheral 1330 include the address of a specified master (referred to herein as a master address), and signals received at the device 1300 from the machine controller 1360 include the address of a specified peripheral 1330 (referred to herein as a peripheral address). The master and peripheral addresses may be identified or otherwise assigned during a registration process (e.g., during setup operations 1406, 1416, and 1426 in FIG. 27, setup operations 3102 and 3106 in FIG. 31, setup operation 3208 in FIG. 32, and setup operation 3416 in FIG. 34). The message data may include a representation of the state of the originating module (e.g., a signal received from a particular peripheral 1330 may include a representation of a state of the particular peripheral 1330), or any other data related to a function of the originating module. As used herein, the term "originating module" refers to the module (e.g., peripheral 1330 or machine controller 1360) that sent the signal including the destination address or message data being described.

For example, when a signal sent by the peripheral 1330 to the device 1300 specifies the address of the machine controller 1360 as the master address, the device controller 1310 relays the signal, including the signal's message (e.g., indicating receipt of a $1 bill) to the machine controller 1360 as depicted in FIG. 30A. On the other hand, when a signal sent by the peripheral 1330 to the device 1300 specifies the address of the device 1300 as the master address, the device controller 1310 relays the signal, including the signal's message (e.g., indicating receipt of a $1 bill), or processes the signal and sends a signal with a message based at least in part on the originally received message (e.g., indicating a $1 bill was received and not refunded within a threshold amount of time) to an external device (e.g., a mobile device 150) as depicted in FIG. 30B.

Figure 31:
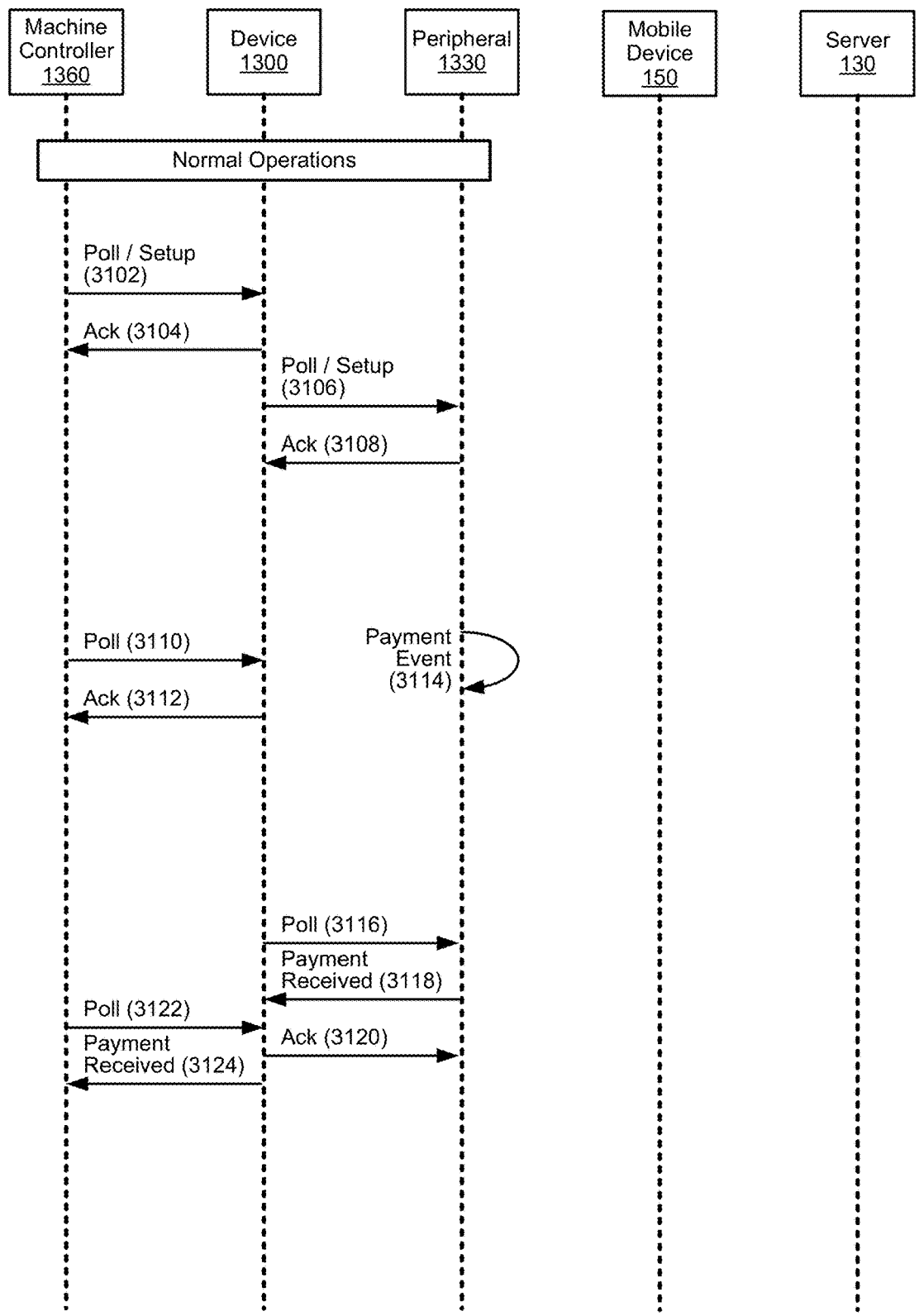
FIGS. 31-34 illustrate schematic flow diagrams of a process for providing external access to an electronic peripheral device in accordance with some implementations.
Figure 32:
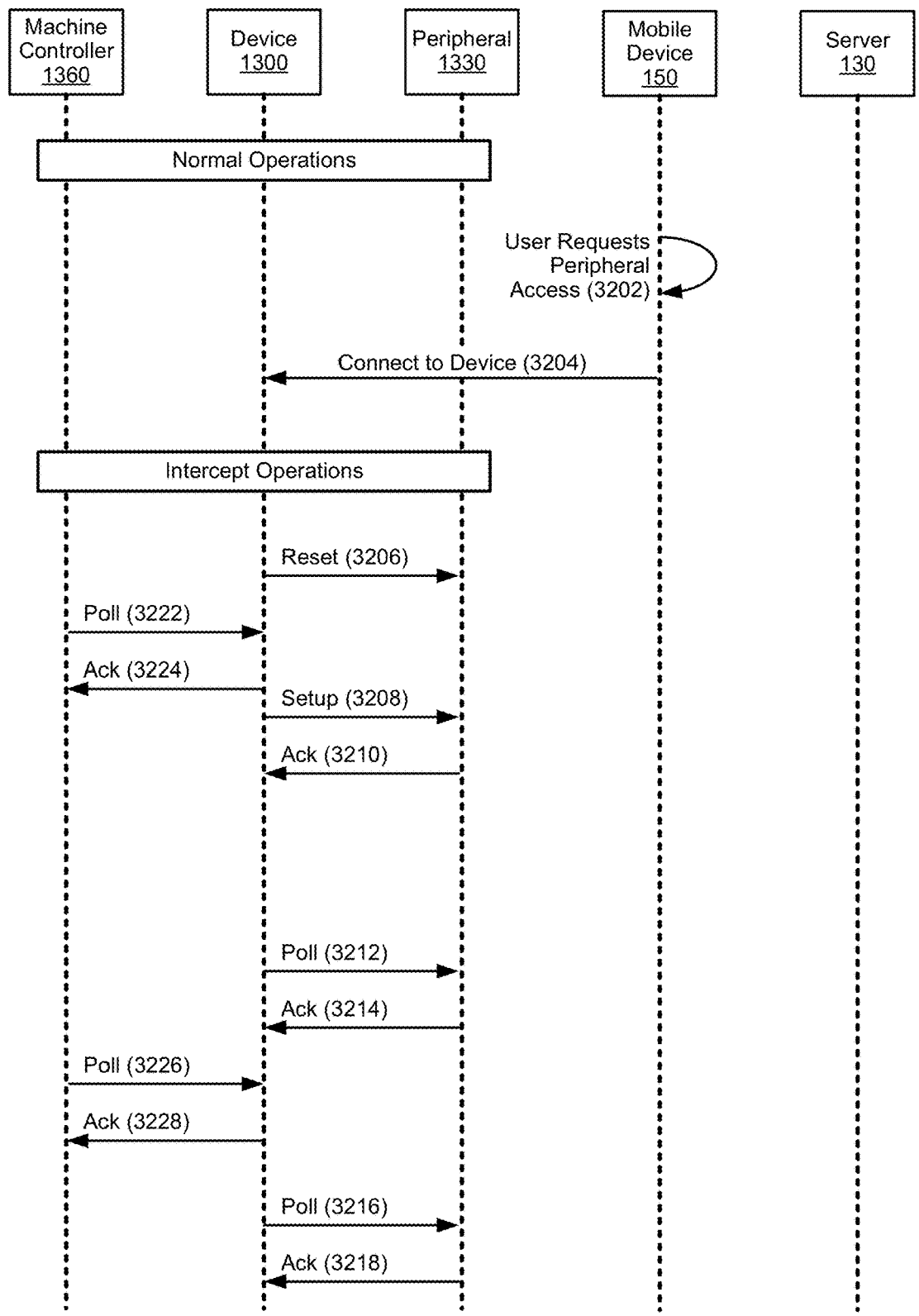
Figure 33:
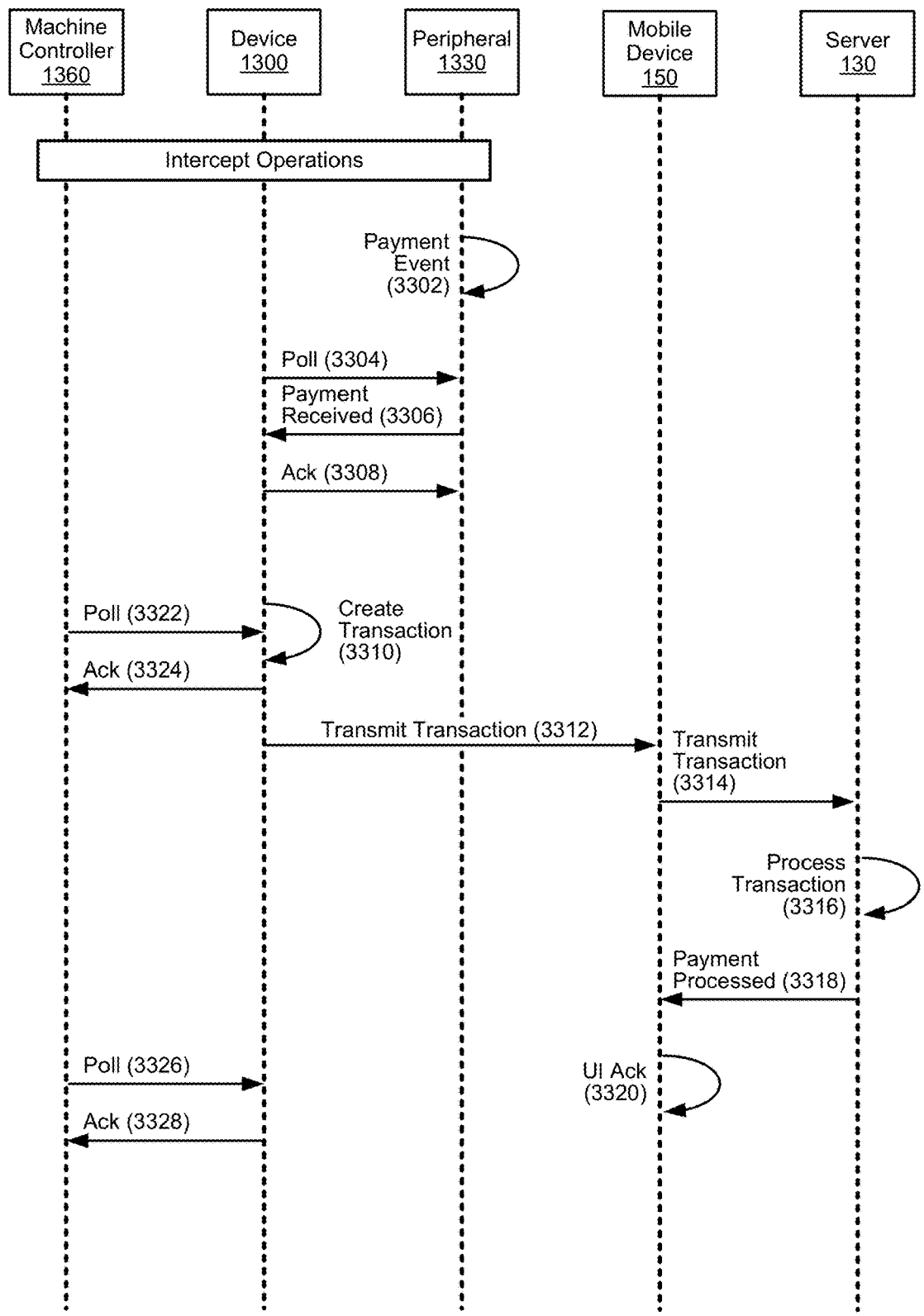
Figure 34:
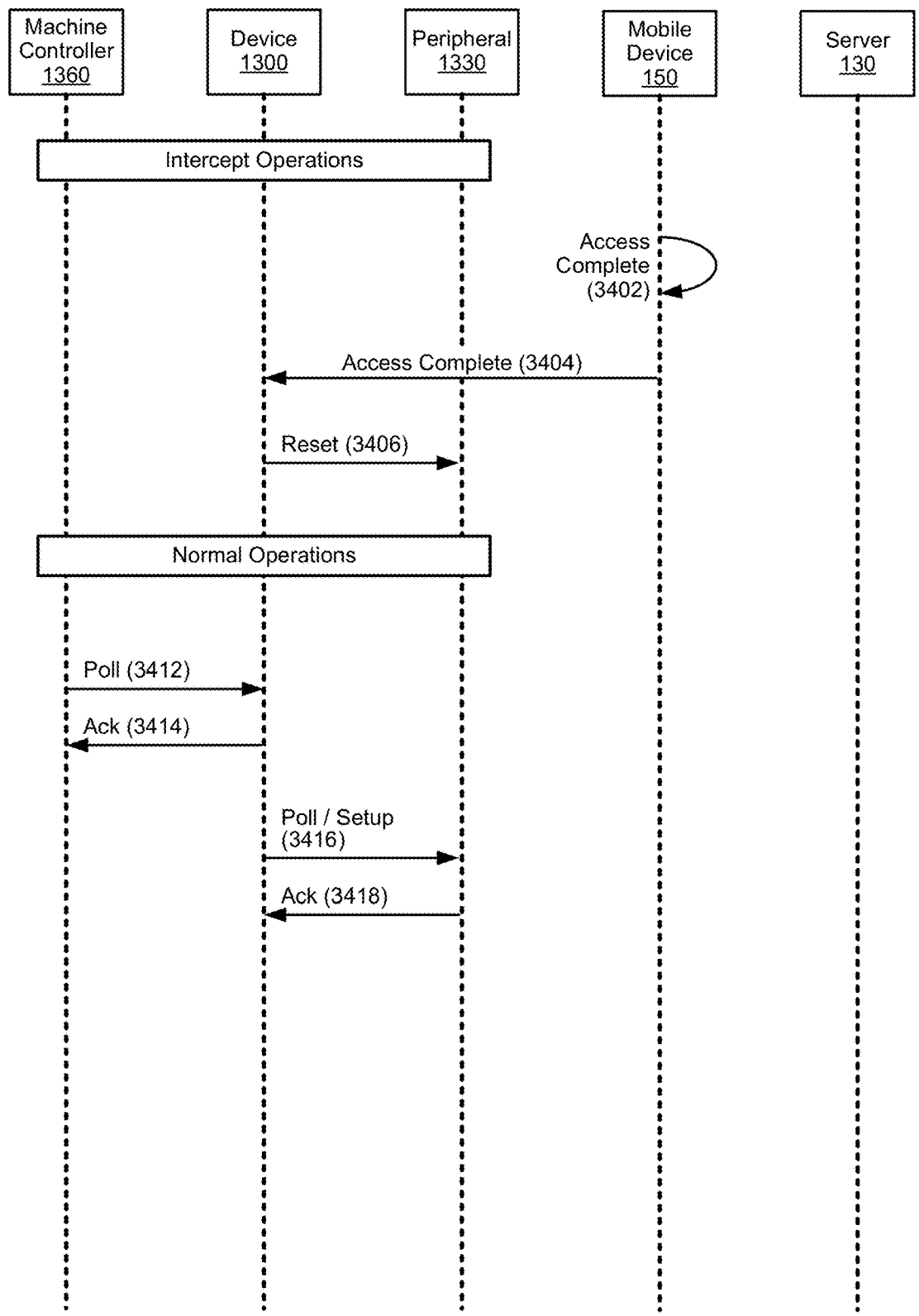

FIGS. 31-34 illustrate schematic flow diagrams of a process for providing external access to an electronic peripheral 1330 of a machine 120 in accordance with some implementations. FIG. 31 depicts a method 3100 of normal operations (e.g., 3002 in FIG. 30A), FIG. 32 depicts a method 3200 of a transition from normal operations to intercept operations (e.g., 3004 in FIG. 30B), FIG. 33 depicts a method 3300 of intercept operations, and FIG. 34 depicts a method 3400 of a transition from intercept operations to normal operations.

The operations in FIGS. 31-34 are governed by instructions that are stored in a computer memory or non-transitory computer readable storage medium of any combination of a machine controller 1360, an electronic device 1300 (e.g., memory 1314 in FIG. 26), an electronic peripheral 1330, a mobile device 150, and a server 130. The instructions are executed by one or more processors of any combination of the machine controller 1360, the electronic device 1300 (e.g., processing unit 1312 in FIG. 26), the electronic peripheral 1330, the mobile device 150, and the server 130. Each computer readable storage medium may include a magnetic or optical disk storage device, solid state storage devices such as Flash memory, or other non-volatile memory device or devices. The instructions stored on each computer readable storage medium may include one or more of: source code, assembly language code, object code, or other instruction format that is interpreted by one or more processors. Some operations in FIGS. 31-34 may be combined and/or the order of some operations in FIGS. 31-34 may be changed.

While the methods 3100-3400 depict an implementation including one peripheral 1330 (for purposes of brevity and clarity of the concepts described herein), the concepts described herein also apply to implementations including a plurality of peripherals 1330 (for example, peripherals 1330-A through 1330-N as described above with reference to FIGS. 26-29). Specifically, for implementations in which a machine 120 includes a plurality of peripherals 1330, the device 1300 (i) polls each of the plurality of peripherals 1330, (ii) processes a signal received from a particular peripheral 1330 of the plurality of peripherals 1330 as described in methods 3100-3400, and (iii) responds to the particular peripheral 1330 from which the signal was received as described in methods 3100-3400. For example, a machine 120 may include a bill acceptor as a first peripheral 1330 and a coin acceptor as a second peripheral 1330. In such a scenario, a mobile device 150 would be provided with data related to signals received from the bill acceptor according to the concepts described in methods 3100-3400, and signals received from the coin acceptor according to the concepts described in methods 3100-3400.

Further, while the methods 3100-3400 refer to the peripheral 1330 as a bill acceptor, the concepts described herein also apply to other types of peripherals 1330. As described above, example peripherals 1330 include bill acceptors, coin acceptors, and cashless payment devices such as payment card readers. Example peripherals 1330 may also include any other type of electronic peripheral device related to or unrelated to accepting payments.

Lastly, the operations of methods 3100-3400 are depicted in a particular order, and at particular vertical offsets (spacing) with respect to each other. Regarding the particular order, unless the description for a particular operation states otherwise, the operations may be implemented out of the order depicted in the figures, especially with respect to operations in different columns, and especially with respect to operations described as being asynchronous. For example, the acknowledgement in operation 3104 is described (in more detail below) as being sent in response to the poll signal sent in operation 3102; as such, this pair of operations and those similarly described must be implemented in the order depicted in the figures. However, the poll signal in operation 3106 may be sent before, at the same time as, or after the poll signal sent in operation 3102, since the description of these operations does not state a particular order or include any temporal limitations. Regarding the particular vertical offsets with respect to the operations, these offsets are provided for purposes of clarity and are not to temporal scale. As such, relative spacing sizes between operations have no effect on relative amounts of time that must pass between execution of such operations.

As described above with reference to FIG. 30A, normal operations may be characterized by the device 1300 relaying signals between the peripheral 1330 and the machine controller 1360. FIG. 31 depicts example normal operations in accordance with some implementations. Referring to FIG. 31, the machine controller 1360 polls (3102) the device 1300, which responds (3104) with an acknowledgement. Asynchronously (compared to operations 3102 and 3104), the device 1300 polls (1306) the peripheral 1330, which responds (3108) with an acknowledgement. If the device 1300 is not registered as a slave to the machine controller 1360 when being polled in operation 3102, the machine controller 1360 registers the device 1300 with a setup signal as described above with reference to FIG. 27 (operations 1404-1408). Similarly, if the peripheral 1330 is not registered as a slave to the device 1300 when being polled in operation 3106, the device 1300 registers the peripheral 1330 with a setup signal as described above with reference to FIG. 27 (operations 1414-1418).

The machine controller 1360 continues to poll the device 1300 at a frequency determined by the particular implementation of the MDB protocol, and the device 1300 proceeds to poll the peripheral 1330 at a frequency determined either by the particular implementation of the MDB protocol, or at any other predetermined frequency. Eventually, a payment event (3114) occurs at the peripheral 1330 (e.g., a $1 bill is received). Until the device 1300 receives a signal indicating the payment event from the peripheral 1330, the device 1300 responds to polls from the machine controller 1360 with acknowledgements. As such, when the machine controller 1360 polls (3110) the device 1300 again, the device 1300 responds (3112) with an acknowledgement. Subsequent to the payment event, the device 1300 polls (3116) the peripheral 1330, and the peripheral 1330 responds (3118) with a payment received signal, indicating the payment event 3114. For example, the payment received signal is addressed to the machine controller 1360 and includes a message indicating a $1 bill was received at the peripheral 1330 (as depicted in FIG. 30A).

In response to receiving the payment received signal from the peripheral 1330, the device 1300 (i) responds (3120) to the peripheral 1330 with an acknowledgement, and after receiving (3122) the next poll from the machine controller 1360, (ii) sends (3124) a payment received signal to the machine controller 1360 (e.g., including the $1 received message). As described above with reference to FIGS. 28A-28B, the device 1300 may respond to the peripheral 1330 with the acknowledgement in operation 3120 without waiting for any other operations or events to take place, but the device 1300 must wait for the next poll to be received (depicted in operation 3122) before having an opportunity to send the payment received signal to the machine controller 1360 in operation 3124.

As described above with reference to FIG. 30B, intercept operations may be characterized by the device 1300 relaying signals between the peripheral 1330 and an external device (e.g., a mobile device 150) via the internal peripheral 1340 (rather than between the device 1300 and the machine controller 1360). FIG. 32 depicts a transition from normal operations to intercept operations in accordance with some implementations. Referring to FIG. 32, an application executing on the mobile device 150 may require access to an electronic peripheral device (e.g., peripheral 1330) in order to perform a function requested by a user. For example, the application receives (3202) a user request to process a cash transaction (e.g., in order to pay for a product or service, in order to deposit money into an account, or for any of the other reasons described above). In response to the user request, the mobile device 150 establishes (3204) a connection with the device 1300 (e.g., via the internal peripheral 1340 as described above). In some implementations, as part of the connection process, the mobile device 150 sends to the device 1300 a request to access functionality associated with the peripheral 1330. In some implementations, as part of the connection process, the device 1300 validates the request, wherein validation of the request indicates that the mobile device 150 is authorized, by a remote server (e.g., server 130) via a communication capability of the mobile device (e.g., a long-range communication capability), to access the signals generated by the peripheral 1330. Features of the implementations of the device validation process and the connection process (between a mobile device 150 and the device 1300) are described in more detail above with reference to FIGS. 7, 8A-8G, 9A-9E, and 23 (e.g., including the security unit 755 and the communications unit 770 shown in FIG. 20).

In response to connecting to the mobile device 150 and/or to the request to access functionality associated with the peripheral 1330, the device 1300 sends a reset signal (3206) and/or a setup signal (3208) to the peripheral 1330 in order to reconfigure the peripheral 1330 to communicate with the device 1300 (rather than with the machine controller 1360). As described above, the device 1300 reconfigures the peripheral 1330 to communicate with the device 1300 by resetting the master address (the signal destination address) of the peripheral 1330 to be the address of the device 1300. Upon resetting the master address of the peripheral 1330 to the address of the device 1300, the device 1300 effectively becomes the master to the peripheral 1330. As a result, the machine controller 1360 is no longer the master to the peripheral 1330 (see FIG. 30B). By becoming the master to the peripheral 1330, the device 1300 appears to be the machine 120. In other words, the peripheral 1330 communicates with the device 1300 as if the device 1300 were the machine 120 or the machine controller 1360 (e.g., the peripheral 1330 addresses signals to the device 1300 instead of to the machine controller 1360). For example, upon receiving $1 bill, a bill collector peripheral 1330 reports the receipt of the $1 bill to the device 1300 rather than to the machine controller 1360. As a result, the machine controller 1360 never receives any indications that a $1 bill was inserted into the bill collector of the machine 120, and therefore does not proceed with internal vending operations (does not allow a person to purchase any products stocked in the machine or otherwise apply a credit for purchasing any products, even though the person inserted money into the machine). Stated another way, any signals reporting the receipt of the $1 bill at the bill collector are intercepted by the device 1300 and are not relayed to the machine controller 1360. Following the reset and/or setup signals, the device 1300 receives (3210) an acknowledgement from the peripheral 1330.

Once the signal destination address of the peripheral 1330 is updated to be that of the device 1300, the device 1300 continues to poll the peripheral 1330 (3212, 3216) and receive acknowledgements from the peripheral 1330 (3214, 3218). Polls received at the device 1300 from the machine controller 1360 (3222, 3226) during this time are not relayed to the peripheral 1330. Instead, the device 1300 merely acknowledges (3224, 3228) the polls so that the machine controller 1360 does not remove the device 1300 from its list of registered devices. Stated another way, the device 1300 normally passes signals received from the machine controller 1360 to the peripheral 1330, but while performing intercept operations (as a result of the mobile device 150 connecting to the device 1300 and the device 1300 resetting the peripheral 1330), the device 1300 still responds to polls received from the machine controller 1360, but does not pass any messages through to the peripheral 1330. Instead, the device 1300 just acknowledges messages received from the machine controller 1360. Accordingly, the device 1300 remains registered with the machine controller 1360 and appears to be in an idle state (from the point of view of the machine controller 1360). While performing intercept operations, communications between (i) the device 1300 and the machine controller 1360 and (ii) the device 1300 and the peripheral 1330 continue to be asynchronous. The device 1300 continues to perform intercept operations until transitioning back to normal operations (described in more detail below with reference to FIG. 34).

FIG. 33 depicts intercept operations in accordance with some implementations. Referring to FIG. 33, a payment event (3302) occurs at the peripheral 1330 (e.g., a $1 bill is inserted into a bill acceptor peripheral 1330). In response to the next poll (3304) received from the device 1300, the peripheral 1330 sends a payment received signal (3306) to the device 1300 with a message indicating or otherwise associated with the payment event (e.g., $1 received). The device 1300 acknowledges (3308) the payment received signal and creates (3310) a transaction based on the payment received signal. The transaction may include the same message as that included in the payment received signal (e.g., $1 received) and/or any related message optionally including additional information (e.g., $1 received and not refunded).

The device 1300 transmits (3312) the transaction (more specifically, a signal including a message describing or otherwise associated with the transaction) to the mobile device 150. The mobile device 150 forwards (3314) the transaction to the server 130 for further processing. The server 130 processes (3316) the transaction. For example, the server 130 adds an amount of funds to the user's account in accordance with the amount of cash that was deposited as part of the payment event 3302 (e.g., adds $1 to the user's account). As another example, the server 130 sends an amount of funds to a recipient in accordance with the amount of cash that was deposited as part of the payment event 3302 (e.g., sends $1 to the recipient). As another example, the server 130 associates a specified product or service with the user's account in accordance with a requested purchase (e.g., associates a virtual lottery ticket with the user's account in return for an amount of funds associated with the amount of cash that was deposited as part of the payment event 3302).

As a result of the processing of the transaction, the server 130 sends (3318) a notification to the mobile device 150 indicating the payment was processed and/or a result of the payment being processed (e.g., a purchase confirmation or a deposit confirmation). In some implementations, the mobile device 150 (more specifically, an application executing on the mobile device) displays information related to the received notification (e.g., an alert indicating a successful purchase or deposit, or an updated user interface indicating a new account balance).

Returning to the bill collector example, in some implementations, operations 3302 through 3312 are repeated each time a person inserts a bill into the peripheral 1330. Optionally, the mobile device 150 groups successive transactions (e.g., successive $1 insertions) into a single transaction message and sends the transaction message in operation 3314 for processing at the server 130. Alternatively, the mobile device 150 sends transaction messages in operation 3314 for processing at the server 130 for each successive transaction (e.g., successive $1 insertions). In such implementations, operations 3302 through 3316 (or operations 3302 through 3318, or operations 3302 through 3320) are repeated each time a person inserts a bill into the peripheral 1330.

As the device 1300 performs the intercept operations described above with reference to FIG. 33, the device 1300 responds to polls (3322, 3326) received from the machine controller 1360 with acknowledgements (3324, 3328) in order to remain registered with the machine controller 1360 as described above with reference to FIG. 32.

FIG. 34 depicts a transition from intercept operations back to normal operations in accordance with some implementations. Referring to FIG. 34, the mobile device 150 receives or otherwise obtains (3402) an indication (e.g., via user input on the application executing on the mobile device 150) that the mobile device 150 no longer requires access to the peripheral 1330 (or functionality provided by the peripheral 1330). For example, the user selects an affordance on a user interface of the application indicating that the transaction or deposit is complete (e.g., the user selects a "no" option when asked if the user would like to purchase any more lottery tickets, or when asked if the user would like to make any more deposits). In response to the access complete notification 3402, the mobile device sends (3404) an access complete notification to the device 1300 indicating that the mobile device 150 no longer requires access to the peripheral 1330 (or functionality provided by the peripheral 1330).

In response to receiving the access complete notification, the device 1300 sends (3406) a reset signal to the peripheral 1330, thereby causing the peripheral to no longer address signals to the device 1300. The device 1300 proceeds to reset the signal destination address of the peripheral 1330 to be that of the machine controller 1360, for example, by sending (3416) a setup signal. As a result, subsequent messages sent by the peripheral 1330 to the device 1300 are addressed to the machine controller 1360. Stated another way, the machine controller 1360 once again functions as the master and the device 1300 once again functions as a router of messages between the machine controller 1360 (master) and the peripheral 1330 (slave).

As a result of the signal destination address of the peripheral 1330 being reset to that of the machine controller 1360, the device 1300 proceeds with normal operations as described above with reference to FIGS. 30A, 31, and 32. For example, the device 1300 acknowledges (3414) polls (3412) received from the machine controller 1360, and asynchronously polls (3416) the peripheral 1330. The device 1300 receives acknowledgements (3418) from the peripheral 1330 and relays messages received from the peripheral 1330 to the machine controller 1360.

Figure 35A:
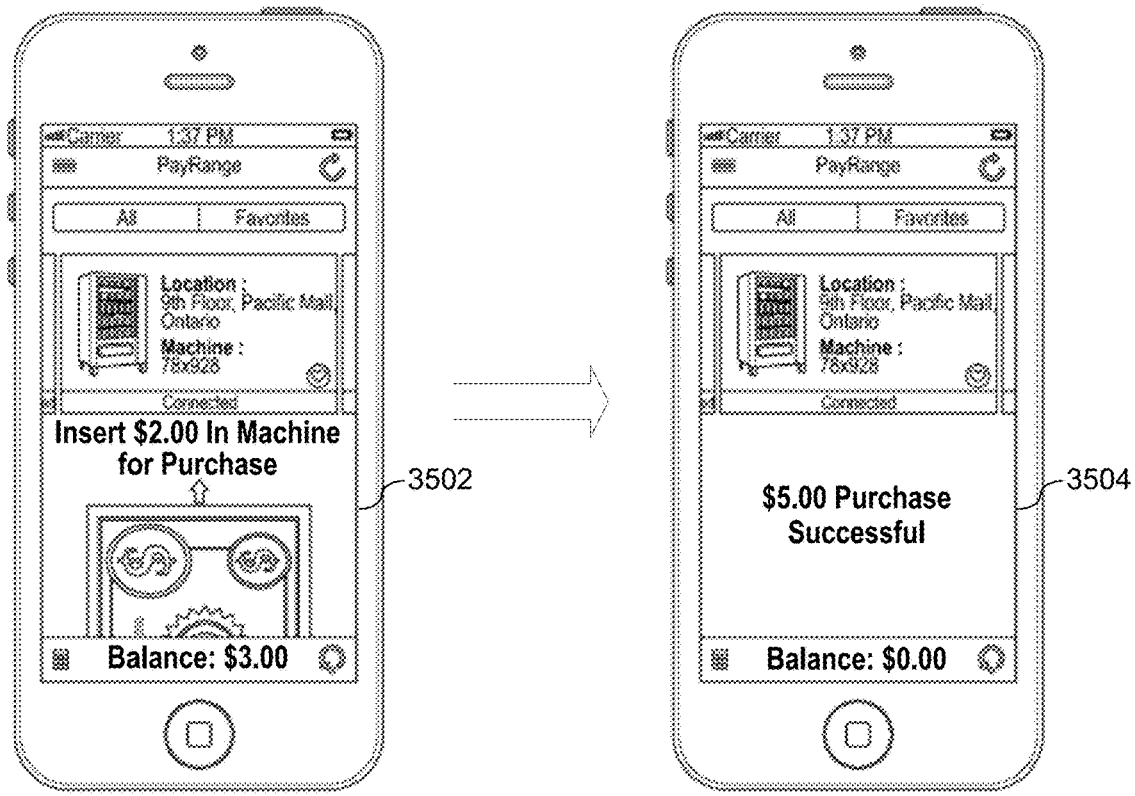
FIGS. 35A-35B show a mobile device with a graphical representation of a mobile application shown thereon, the mobile application being used as part of a peripheral access system in accordance with some implementations.
Figure 35B:
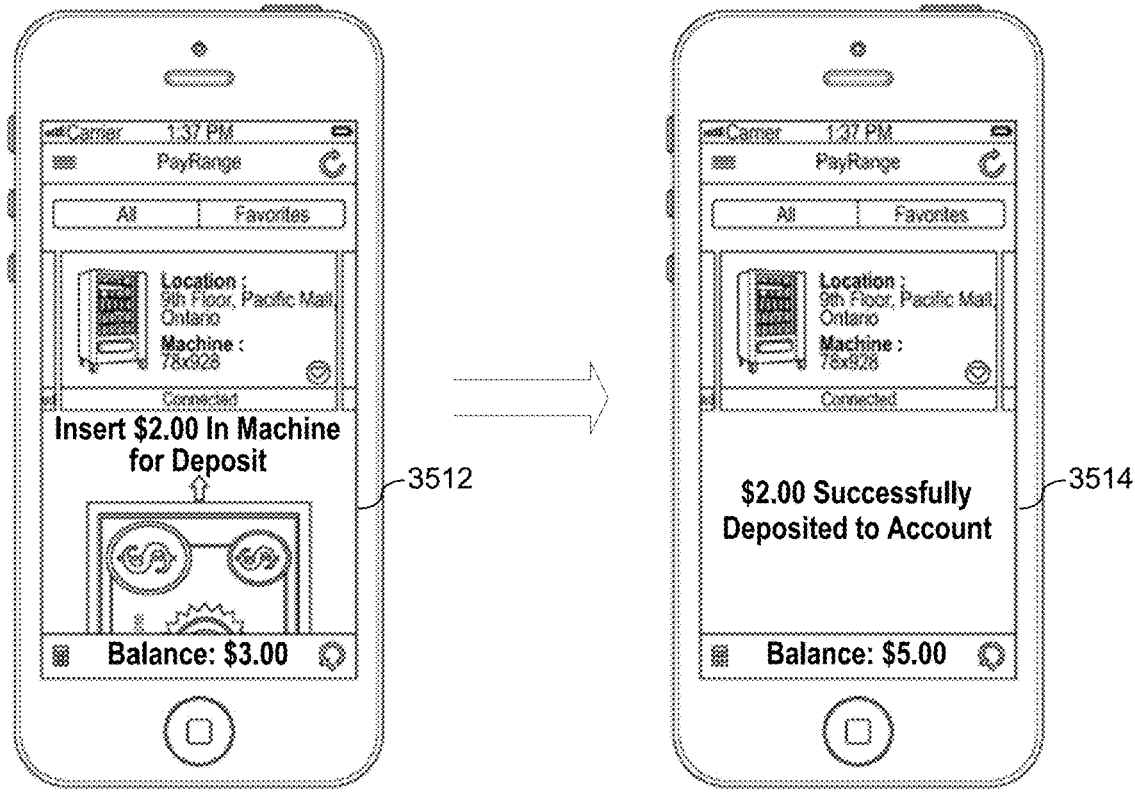

FIGS. 35A-35B show a mobile device 150 with a graphical representation of a mobile application shown thereon, the mobile application being used as part of a peripheral access system in accordance with some implementations.

FIG. 35A depicts an example scenario in which the mobile device 150 accesses a peripheral 1330 of a machine 120 in order to accept a cash payment for the purchase of a virtual product (e.g., a lottery ticket) unrelated to any products stocked in the machine 120. In this example, the user's account has a balance of $3, and a user interface 3502 of the mobile application prompts the user to insert $2 into the machine 120 (e.g., after having connected to the machine 120 as a result of operation 3204, FIG. 32) in order to make a $5 purchase. When the user inserts $2 into the machine 120 and the transaction is processed as described above with reference to operations 3302-3320 (FIG. 33), a user interface 3504 of the mobile application notifies the user that the $5 purchase was successful, and the new balance is $0. The notification corresponds with the acknowledgement in operation 3320 (FIG. 33).

FIG. 35B depicts an example scenario in which the mobile device 150 accesses a peripheral 1330 of a machine 120 in order to accept a cash payment for a deposit into the user's account. In this example, the user's account has a balance of $3, and a user interface 3512 of the mobile application prompts the user to insert $2 into the machine 120 (e.g., after having connected to the machine 120 as a result of operation 3204, FIG. 32) as a result of the user selecting an option to deposit $2. When the user inserts $2 into the machine 120 and the transaction is processed as described above with reference to operations 3302-3320 (FIG. 33), a user interface 3514 of the mobile application notifies the user that the $2 was successfully deposited, and the new balance is $5. The notification corresponds with the acknowledgement in operation 3320 (FIG. 33).

The implementations described with reference to FIGS. 30A-35B use specific examples for illustration (e.g., the peripheral 1330 being a bill acceptor, and the peripheral 1330 being accessed in order to support cash purchases or deposits). Other scenarios may be implemented by providing a mobile application access to an electronic peripheral device of a machine, the machine being otherwise unrelated to a device executing the mobile application. For example, a mobile application may access a cash return peripheral of a machine 120 (e.g., a module for processing refunds at a vending machine 120 using, for example, a quarter return slot to provide quarter(s) or the bill acceptor to output $1 bill(s)) in order to support a function of the mobile application that makes cash available to a user (e.g., receiving a peer-to-peer cash payment, withdrawing cash from an account, receiving a cash refund for a product or service provided by the mobile application, receiving a cash reward as a result of an accomplishment in a gaming application, receiving a cash payment as a result of a winning virtual lottery ticket, and so forth).

Further, implementations need not be limited to scenarios involving cash transactions. Other types of electronic peripheral devices may be accessed from a machine 120 in order to extend functionality of a mobile application that would not otherwise have direct access to the hardware necessary to support such functionality. Stated another way, the device 1300 enables a mobile device 150 to access functionality provided by an electronic peripheral device 1300 of a machine 120 by providing wireless communications between an application executing on the mobile device 150 and the electronic peripheral device 1330, by (i) communicatively decoupling the electronic peripheral device 1300 from the machine controller 1360 which normally would function as the master of the electronic peripheral device 1330, and (ii) communicatively coupling the electronic peripheral device 1300 with the mobile application which functions as the master of the electronic peripheral device until the mobile application no longer requires access to the functionality provided by the electronic peripheral device 1330.

Miscellaneous

The foregoing description has been described with reference to specific implementations. However, the illustrative discussions above are not intended to be exhaustive or to limit the claims to the precise forms disclosed. Many variations are possible in view of the above teachings. The implementations were chosen and described in order to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations. Lastly, as used herein, the terms "master" and "host" are synonymous unless clearly stated otherwise.

What is claimed is:

1. An electronic device for retrofitting a machine to provide external access to one or more electronic peripheral devices of the machine, the electronic device comprising:
   a slave interface configured to couple the electronic device to a machine controller of the machine via a communication bus;
   a host interface configured to couple the electronic device to a first peripheral device of the one or more electronic peripheral devices of the machine, wherein the first peripheral device is decoupled from the communication bus of the machine;
   a wireless transceiver;
   one or more processors; and
   non-transitory memory storing one or more programs to be executed by the one or more processors, the one or more programs comprising instructions for:
      registering the electronic device as a slave to the machine controller;
      registering the first peripheral device as a slave to the electronic device;
      receiving, from a mobile device via the wireless transceiver, a request to communicate with the first peripheral device;
      validating the request, wherein validation of the request indicates that the mobile device is authorized, by a remote server, to communicate with the first peripheral device; and 'sending a first reset command to the first peripheral device via the host interface, wherein the first reset command includes a directive to update a signal destination address of the first peripheral device from an address of the machine controller to a device address of the electronic device.

2. The electronic device of claim 1, wherein the one or more programs further comprise instructions for:
   receiving, at the host interface of the electronic device, a first signal from the first peripheral device, wherein the first signal is directed to the electronic device in accordance with the updated signal destination address;
   in response to receiving the first signal from the first peripheral device:
      sending an acknowledgement to the first peripheral device via the host interface;
      transmitting a second signal to the mobile device via the wireless transceiver for forwarding to the remote server via a long-range communication capability of the mobile device, wherein the second signal includes data associated with the first signal received from the first peripheral device; and
      forgoing provision of the first signal to the machine controller.

3. The electronic device of claim 1, wherein the one or more programs further comprise instructions for:
   receiving, from the mobile device via the wireless transceiver, a notification to cease interaction with the mobile device;
   in response to receiving the notification to cease interaction with the mobile device:
      sending a second reset command to the first peripheral device via the host interface, wherein the second reset command includes a directive to update the signal destination address of the first peripheral device to a controller address of the machine controller.

4. The electronic device of claim 1, wherein the one or more programs further comprise instructions for:
   receiving, at the host interface of the electronic device, a third signal from the first peripheral device, wherein the third signal is directed to the machine controller; and
   in response to receiving the third signal from the first peripheral device:
      sending an acknowledgement to the first peripheral device via the host interface in a manner as if originated from the machine controller; and
      relaying the third signal to the machine controller via the slave interface.

5. The electronic device of claim 1, wherein the instructions for registering the electronic device as a slave to the machine controller comprise instructions for:
   identifying the electronic device to the machine controller as the first peripheral device; and
   accepting registration of the electronic device as the first peripheral device.

6. The electronic device of claim 1, wherein the first peripheral device is a coin acceptor, a bill acceptor, or a payment card reader.

7. The electronic device of claim 1, wherein the machine is a vending machine, a parking meter, a laundromat washer or dryer, an arcade game, a kiosk, a photo booth, a toll booth, or a transit ticket dispensing machine.

8. A method of retrofitting a machine to provide external access to one or more electronic peripheral devices of the machine, the method comprising:
   at an electronic device including a wireless transceiver, one or more processors, non-transitory memory, a slave interface configured to couple the electronic device to a machine controller of the machine via a communication bus, and a host interface configured to couple the electronic device to a first peripheral device of the one or more electronic peripheral devices of the machine, wherein the first peripheral device is decoupled from the communication bus of the machine:
      registering the electronic device as a slave to the machine controller;
      registering the first peripheral device as a slave to the electronic device;
      receiving, from a mobile device via the wireless transceiver, a request to communicate with the first peripheral device;
      validating the request, wherein validation of the request indicates that the mobile device is authorized, by a remote server, to communicate with the first peripheral device; and
      sending a first reset command to the first peripheral device via the host interface, wherein the first reset command includes a directive to update a signal destination address of the first peripheral device from an address of the machine controller to a device address of the electronic device.

9. The method of claim 8, further comprising:
   receiving, at the host interface of the electronic device, a first signal from the first peripheral device, wherein the first signal is directed to the electronic device in accordance with the updated signal destination address;
   in response to receiving the first signal from the first peripheral device:
      sending an acknowledgement to the first peripheral device via the host interface;
      transmitting a second signal to the mobile device via the wireless transceiver for forwarding to the remote server via a long-range communication capability of the mobile device, wherein the second signal includes data associated with the first signal received from the first peripheral device; and forgoing provision of the first signal to the machine controller.

10. The method of claim 8, further comprising:

receiving, from the mobile device via the wireless transceiver, a notification to cease interaction with the mobile device;

in response to receiving the notification to cease interaction with the mobile device:

sending a second reset command to the first peripheral device via the host interface, wherein the second reset command includes a directive to update the signal destination address of the first peripheral device to a controller address of the machine controller.

11. The method of claim 8, further comprising:

receiving, at the host interface of the electronic device, a third signal from the first peripheral device, wherein the third signal is directed to the machine controller; and in response to receiving the third signal from the first peripheral device:

sending an acknowledgement to the first peripheral device via the host interface in a manner as if originated from the machine controller; and relaying the third signal to the machine controller via the slave interface.

12. The method of claim 8, wherein registering the electronic device as a slave to the machine controller includes:

identifying the electronic device to the machine controller as the first peripheral device; and accepting registration of the electronic device as the first peripheral device.

13. The method of claim 8, wherein the first peripheral device is a coin acceptor, a bill acceptor, or a payment card reader.

14. The method of claim 8, wherein the machine is a vending machine, a parking meter, a laundromat washer or dryer, an arcade game, a kiosk, a photo booth, a toll booth, or a transit ticket dispensing machine.

15. A non-transitory computer readable storage medium storing one or more programs, the one or more programs comprising instructions, which, when executed by an electronic device including a wireless transceiver, one or more processors, non-transitory memory, a slave interface configured to couple the electronic device to a machine controller of a machine via a communication bus, and a host interface configured to couple the electronic device to a first peripheral device of one or more electronic peripheral devices of the machine, wherein the first peripheral device is decoupled from the communication bus of the machine, cause the electronic device to perform operations including:

registering the electronic device as a slave to the machine controller;

registering the first peripheral device as a slave to the electronic device;

receiving, from a mobile device via the wireless transceiver, a request to communicate with the first peripheral device;

validating the request, wherein validation of the request indicates that the mobile device is authorized, by a remote server, to communicate with the first peripheral device; and sending a first reset command to the first peripheral device via the host interface, wherein the first reset command includes a directive to update a signal destination address of the first peripheral device from an address of the machine controller to a device address of the electronic device.

16. The non-transitory computer readable storage medium of claim 15, wherein the instructions further cause the electronic device to perform operations including:

receiving, at the host interface of the electronic device, a first signal from the first peripheral device, wherein the first signal is directed to the electronic device in accordance with the updated signal destination address;

in response to receiving the first signal from the first peripheral device:

sending an acknowledgement to the first peripheral device via the host interface;

transmitting a second signal to the mobile device via the wireless transceiver for forwarding to the remote server via a long-range communication capability of the mobile device, wherein the second signal includes data associated with the first signal received from the first peripheral device; and forgoing provision of the first signal to the machine controller.

17. The non-transitory computer readable storage medium of claim 15, wherein the instructions further cause the electronic device to perform operations including:

receiving, from the mobile device via the wireless transceiver, a notification to cease interaction with the mobile device;

in response to receiving the notification to cease interaction with the mobile device:

sending a second reset command to the first peripheral device via the host interface, wherein the second reset command includes a directive to update the signal destination address of the first peripheral device to a controller address of the machine controller.

18. The non-transitory computer readable storage medium of claim 15, wherein the instructions further cause the electronic device to perform operations including: receiving, at the host interface of the electronic device, a third signal from the first peripheral device, wherein the third signal is directed to the machine controller; and in response to receiving the third signal from the first peripheral device: sending an acknowledgement to the first peripheral device via the host interface in a manner as if originated from the machine controller; and relaying the third signal to the machine controller via the slave interface.

19. The non-transitory computer readable storage medium of claim 15, wherein the instructions causing the electronic device to perform operations including registering the electronic device as a slave to the machine controller comprise instructions causing the electronic device to perform operations including:

identifying the electronic device to the machine controller as the first peripheral device; and accepting registration of the electronic device as the first peripheral device.

20. The non-transitory computer readable storage medium of claim 15, wherein:

the first peripheral device is a coin acceptor, a bill acceptor, or a payment card reader; and the machine is a vending machine, a parking meter, a laundromat washer or dryer, an arcade game, a kiosk, a photo booth, a toll booth, or a transit ticket dispensing machine.

* * * * *